United States Patent
Ueno et al.

(10) Patent No.: US 9,300,573 B2
(45) Date of Patent: Mar. 29, 2016

(54) RECORDING MEDIUM HAVING STORED THEREIN A TRANSFER PROGRAM, TRANSFER APPARATUS, AND TRANSFER METHOD

(71) Applicant: FUJITSU LIMITED, Kawasaki-shi, Kanagawa (JP)

(72) Inventors: Hitoshi Ueno, Kawasaki (JP); Makoto Kubota, Kawasaki (JP); Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/082,307

(22) Filed: Nov. 18, 2013

(65) Prior Publication Data
US 2014/0198792 A1 Jul. 17, 2014

(30) Foreign Application Priority Data
Jan. 11, 2013 (JP) .................................. 2013-003141

(51) Int. Cl.
*H04L 12/721* (2013.01)
(52) U.S. Cl.
CPC ...................................... *H04L 45/34* (2013.01)
(58) Field of Classification Search
None
See application file for complete search history.

(56) References Cited

U.S. PATENT DOCUMENTS

| | | | | |
|---|---|---|---|---|
| 7,647,422 B2* | 1/2010 | Singh et al. | .................... | 709/238 |
| 2003/0007451 A1 | 1/2003 | Ochiai et al. | | |
| 2003/0212821 A1* | 11/2003 | Gillies et al. | .................. | 709/238 |
| 2006/0002368 A1* | 1/2006 | Budampati et al. | ........... | 370/351 |
| 2014/0036729 A1* | 1/2014 | Thubert et al. | ................ | 370/255 |

FOREIGN PATENT DOCUMENTS

| | | |
|---|---|---|
| JP | 3-222094 | 10/1991 |
| JP | 2003-018199 | 1/2003 |

* cited by examiner

*Primary Examiner* — Benjamin H Elliott, IV
(74) *Attorney, Agent, or Firm* — Fujitsu Patent Center

(57) ABSTRACT

A non-transitory computer-readable recording medium has stored therein a program for causing a computer to execute a process, the process includes transferring communication data, transmitted from a first apparatus, which includes data and a first attribute regarding the data, to a second apparatus, receiving a notification that includes a second attribute regarding the data and a transfer destination of the communication data inclusive of the second attribute, transferring the communication data inclusive of the second attribute to a third apparatus of the transfer destination included in the notification; and transferring the notification to other transfer apparatus.

14 Claims, 29 Drawing Sheets

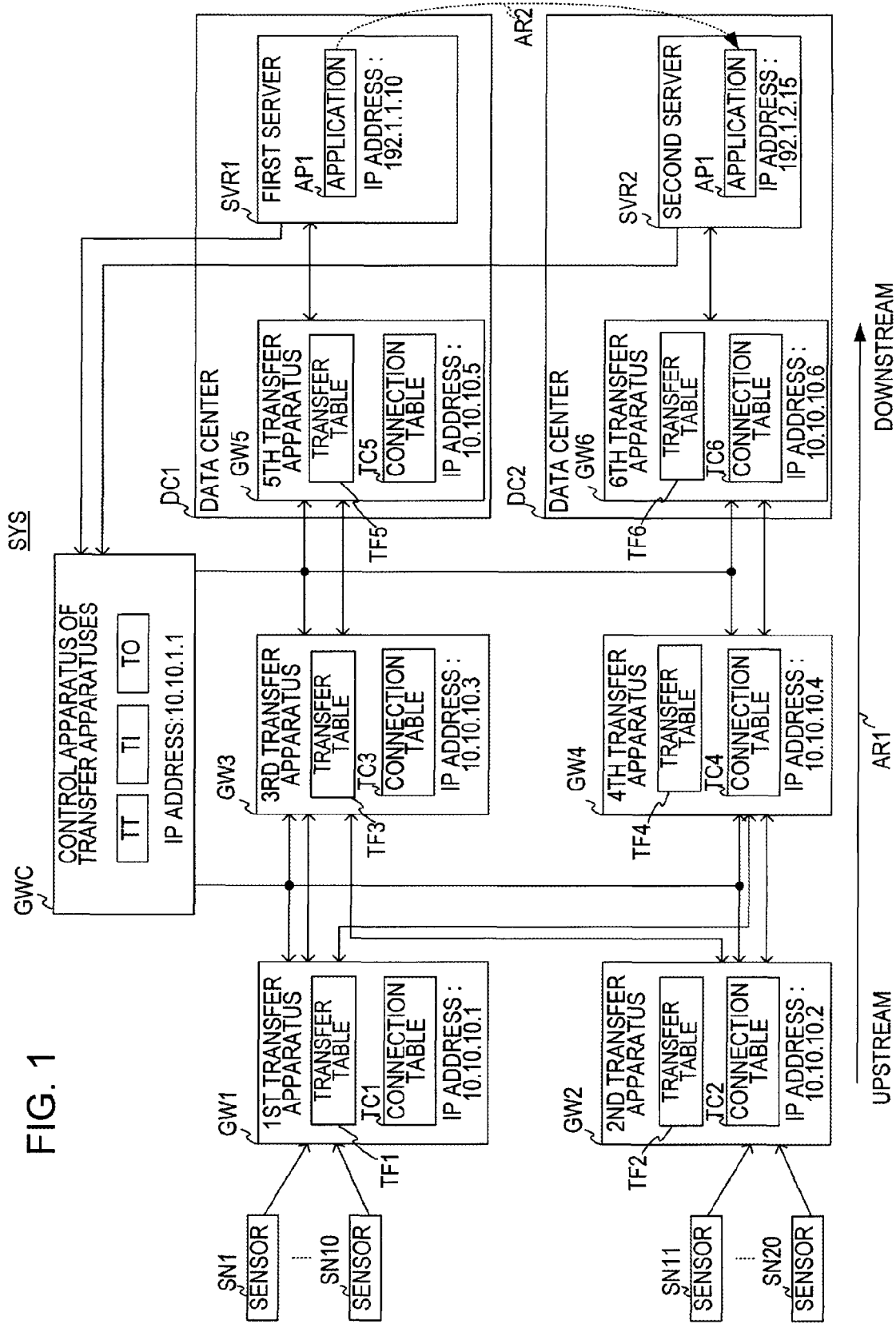

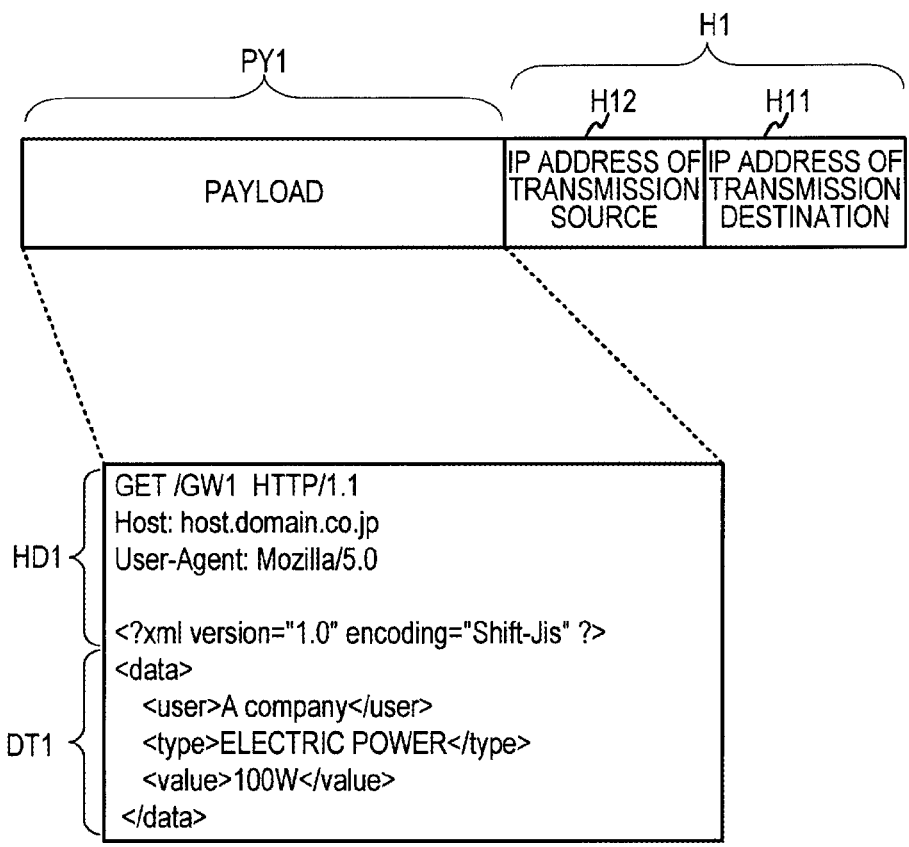

| DISCRIMINATION PARAMETER | | IP ADDRESS OF THE FOLLOWING TRANSFER DESTINATION |
|---|---|---|
| TYPE | USER | |
| ELECTRONIC POWER | A COMPANY | 10.10.10.5 |

| DISCRIMINATION PARAMETER | | IP ADDRESS OF THE FOLLOWING TRANSFER DESTINATION |
|---|---|---|
| TYPE | USER | |
| ELECTRONIC POWER | A COMPANY | 192.1.1.10 |

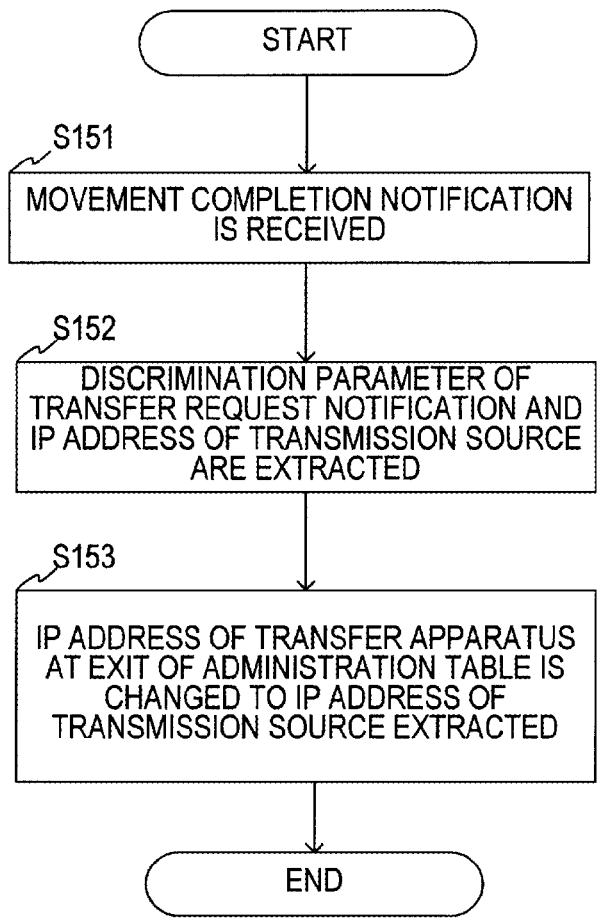

FIG. 26

| START TIME | DISCRIMINATION PARAMETER | | IP ADDRESS OF THE FOLLOWING TRANSFER DESTINATION |
|---|---|---|---|
| | TYPE | USER | |
| 13:12:45 | ELECTRONIC POWER | A COMPANY | 10.10.10.6 |

| DISCRIMINATION PARAMETER || IP ADDRESS OF THE FOLLOWING TRANSFER DESTINATION |
|---|---|---|
| TYPE | USER | |
| ELECTRONIC POWER | A COMPANY | localhost |

TF5a

| DISCRIMINATION PARAMETER | | IP ADDRESS OF THE FOLLOWING TRANSFER DESTINATION |
|---|---|---|
| TYPE | USER | |
| ELECTRONIC POWER | A COMPANY | 10.10.10.1 |

RECORDING MEDIUM HAVING STORED THEREIN A TRANSFER PROGRAM, TRANSFER APPARATUS, AND TRANSFER METHOD

CROSS-REFERENCE TO RELATED APPLICATION

This application is based upon and claims the benefit of priority of the prior Japanese Patent Application No. 2013-003141, filed on Jan. 11, 2013, the entire contents of which are incorporated herein by reference.

FIELD

The present invention relates to a recording medium having stored therein a transfer program, a transfer apparatus, and a transfer method.

BACKGROUND

In recent years, there has been proposed a system in which data measured by diverse sensors provided at various places (also referred to as fields) is collected and analyzed, and various services are provided based on the analyzed results. For example, the aforementioned system includes a plurality of sensors and a server that collects the data measured by the sensors, analyzes the data, and executes information processing of providing various services based on the analyzed results. Furthermore, the aforementioned system includes a plurality of transfer apparatuses that are provided between the plurality of sensors and the server, and a control apparatus to control the plurality of transfer apparatuses.

The plurality of sensors transmits a communication packet that includes the measurement data indicating the measurement results, to the transfer apparatus. The control apparatus of the transfer apparatuses generates a transfer table (also referred to as a routing table) inclusive of the transfer path information of the communication packet and transmits the transfer table to the plurality of transfer apparatuses. The plurality of transfer apparatuses receive the transfer table and store the transfer table in their own apparatus. Then, the plurality of transfer apparatuses receive the communication packet and transfer the communication packet received to other apparatus based on the transfer table of their own. An application executed by the server receives the communication packet, collects the measurement data of the communication packet received, analyzes the measurement data, and executes information processing of providing various services based on the analyzed results.

RELATED ART

Japanese Laid-open Patent Publication No. 1991-222094:
Japanese Laid-open Patent Publication No. 2003-18199:

In the aforementioned system, there is a case where the application that executes the information processing (hereinafter, appropriately referred to as an application) is moved from a first server that executes the application to a second server, which is another server, for example, due to the maintenance and inspection for the server. For example, a system administrator stops the first server for the purpose of the maintenance and inspection for the first server and activates the application that has been executed by the first server, by means of the second server, which is different from the first server, thereby executing the application. Herein, an IP (Internet Protocol) address set in the first server is different from an IP address set in the second server.

In this case, it is requisite to change the final transfer destination of the communication packet transmitted by the plurality of sensors from the first server to the second server. Accordingly, the control apparatus of the transfer apparatuses recalculates the transfer path of the communication packet leading from the plurality of sensors to the second server. Then, the control apparatus of the transfer apparatuses newly generates the transfer tables of the plurality of transfer apparatuses based on the transfer path recalculated and transmits the transfer tables to the plurality of transfer apparatuses. Subsequently, the plurality of transfer apparatuses execute the transfer processing of the communication packet based on the transfer table received.

Herein, when a multitude of applications are moved, the amount of processing regarding the recalculation of the transfer path corresponding to the movement of a multitude of applications is increased in the control apparatus of the transfer apparatuses. As a result, the control apparatus of the transfer apparatuses falls into an overload state, which causes a delay in terms of the recalculation of the transfer path, the generation of the transfer table, and the transmission processing. Consequently, there occurs a delay in the start time of the transfer processing of the communication packet based on the transfer table after the change in the plurality of transfer apparatuses.

SUMMARY

According to an aspect of the embodiments, a non-transitory computer-readable recording medium has stored therein a program for causing a computer to execute a process, the process includes: transferring communication data, transmitted from a first apparatus, which includes data and a first attribute regarding the data, to a second apparatus; receiving a notification that includes a second attribute regarding the data and a transfer destination of the communication data inclusive of the second attribute; transferring the communication data inclusive of the second attribute to a third apparatus of the transfer destination included in the notification; and transferring the notification to other transfer apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram to describe one example of a system that includes transfer apparatuses of the embodiment of the present invention.

FIG. 2 is a diagram schematically illustrating one example of the communication packet that is transmitted and received in the system in FIG. 1.

FIG. 3 is a diagram illustrating one example of the transfer table TF1 stored in the first transfer apparatus GW1 in FIG. 1.

FIG. 4 is a diagram illustrating one example of the transfer table TF3 stored in the third transfer apparatus GW3 in FIG. 1.

FIG. 5 is a diagram illustrating one example of the transfer table TF5 stored in the fifth transfer apparatus GW5 in FIG. 1.

FIG. 23 is a flowchart illustrating one example to describe the flow of the processing executed by the control apparatus GWC of the transfer apparatuses that receives the movement completion notification.

FIG. 24 is a diagram illustrating a state where the exit transfer apparatus administration table TO in FIG. 11 is changed.

FIG. 26 is a flowchart illustrating one example of a timer administration table TM that the sixth transfer apparatus GW6 includes.

DESCRIPTION OF EMBODIMENTS

First Embodiment

Figure 6:
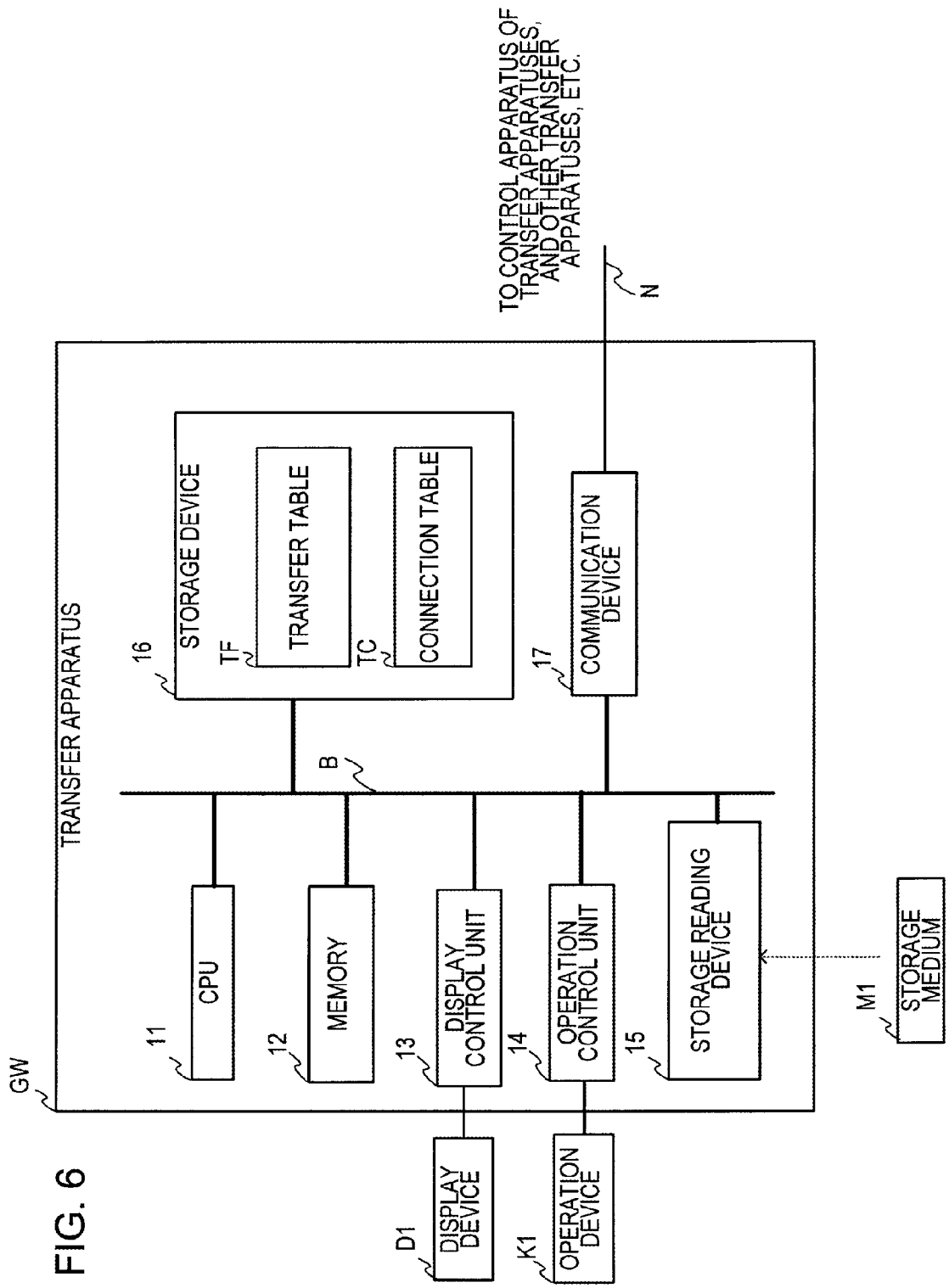
FIG. 6 is a block diagram illustrating one example of the constitution of hardware of a transfer apparatus GW.

FIG. 1 is a diagram to describe one example of a system that includes transfer apparatuses of the embodiment of the present invention. In the description below, the same reference numbers are applied to elements having the same functions, and the description of the elements is appropriately omitted.

An entire system SYS includes sensors inclusive of a first sensor SN1 to a 20th sensor SN20, transfer apparatuses inclusive of a first transfer apparatus GW1 to a sixth transfer apparatus GW6, a first server SVR1, a second server SVR2, and a control apparatus GWC of the transfer apparatuses. Also, a first data center DC1 includes the fifth transfer apparatus GW5 and the first server SVR1, and a second data center DC2 includes the sixth transfer apparatus GW6 and the second server SVR2. The first data center DC1 and the second data center DC2 are facilities that execute various data processing, for example, which are provided at a location geographically apart.

The first sensor SN1 to the 20th sensor SN20 are one example of a generation apparatus that generates communication data inclusive of data and an attribute regarding the data. This data, for example, represents data (also referred to as measurement data), which indicates the result that the sensor measures a measuring object. One example of the communication data is communication packets that are described in FIG. 2. The first server SVR1 and the second server SVR2 are one example of first and second processing apparatuses that perform the processing of the data included in the communication data.

The first transfer apparatus GW1 to the sixth transfer apparatus GW6 are arranged between the generation apparatus and the first and second processing apparatuses. The first transfer apparatus GW1 to the sixth transfer apparatus GW6 are one example of a plurality of transfer apparatuses that transfer communication data that includes data and a first attribute regarding the data and that is transmitted from a first apparatus, to a second apparatus. The first apparatus is exemplified by the first sensor SN1 to the 20th sensor SN20, or other transfer apparatus. Also, the second apparatus is exemplified by the first server SVR1, the second server SVR2, and other transfer apparatus. It is noted that the transfer apparatus is also referred to as a data relay apparatus, a data reception-and-transmission apparatus, or a gateway.

In FIG. 1, the number of sensors, the number of transfer apparatuses, and the number of servers are mere exemplification. In the description below, words "upstream" and "downstream" are appropriately used. The upstream means a left side in the diagram where each sensor is provided, as is illustrated with an arrow AR1. The downstream means a right side in the diagram where the server is provided, as is illustrated with an arrow AR1.

Also, the transfer apparatus that directly connects to the sensors without intervention of the other transfer apparatus is appropriately referred to as the transfer apparatus on the uppermost stream. It is noted that connection is also referred to as communication. In the example of FIG. 1, the transfer apparatuses on the uppermost stream are the first transfer apparatus GW1 and the second transfer apparatus GW2. The transfer apparatus that directly connects to the servers without intervention of the other transfer apparatus is appropriately referred to as the transfer apparatus on the lowermost stream. In the example of FIG. 1, the transfer apparatuses on the lowermost stream are the fifth transfer apparatus GW5 and the sixth transfer apparatus GW6. Also, the transfer apparatus that is arranged between the transfer apparatus on the uppermost stream and the transfer apparatus on the lowermost stream and is not directly connected to the servers or the sensors is appropriately referred to as the transfer apparatus on the midstream. In the example of FIG. 1, the transfer apparatuses on the midstream are the third transfer apparatus GW3 and the fourth transfer apparatus GW4.

In the description below, communication between the sensor and the transfer apparatus, communication between the transfer apparatuses, and communication between the transfer apparatus and the server are performed via a network. Then, the aforementioned communication, for example, is carried out based on TCP/IP (Transmission Control Protocol/Internet Protocol).

The first sensor SN1 to the 20th sensor SN20, for example, are power measurement sensors embedded in a power source tap arranged on every floor of a building or humidity measurement sensors arranged in every room of the building. Furthermore, the sensors are exemplified by sensors that measure the sales performance (for example, a name of a product purchased, a time at which the product is purchased) in a bending machine. After the measurement of a measuring object, the first sensor SN1 to the 20th sensor SN20 transmit a communication packet, which includes the measurement data indicating the measurement result and an attribute regarding the measurement data, to a transfer apparatus of a connection destination. It is noted that the communication packet is described in FIG. 2.

The first sensor SN1 to the 10th sensor SN10 communicate with the first transfer apparatus GW1, and the 11th sensor SN11 to the 20th sensor SN20 communicate with the second transfer apparatus GW2. Also, the first sensor SN1, for example, measures electric power consumption of electrical devices arranged in a certain company (for example, A company). The first sensor SN1 transmits the communication packet, which includes data indicating the measurement result and an attribute regarding the data, to the first transfer apparatus GW1. Furthermore, the 10th sensor SN10, for example, measures humidity in a room of a certain company (for example, B company) and transmits the communication packet, which includes data indicating the measurement result and an attribute regarding the data, to the first transfer apparatus GW1.

Identifiers to identify apparatuses on the network are set in advance in the first transfer apparatus GW1 to the sixth transfer apparatus GW6, the first server SVR1, the second server SVR2, and the control apparatus GWC of the transfer apparatuses. The identifiers, for example, are IP (Internet Protocol) addresses. In the diagram, a state where IP addresses are set in the transfer apparatuses and servers is schematically illustrated as "IP address: x, y, z, w" ($x$, $y$, $z$, and $w$ are integers).

Figure 14:
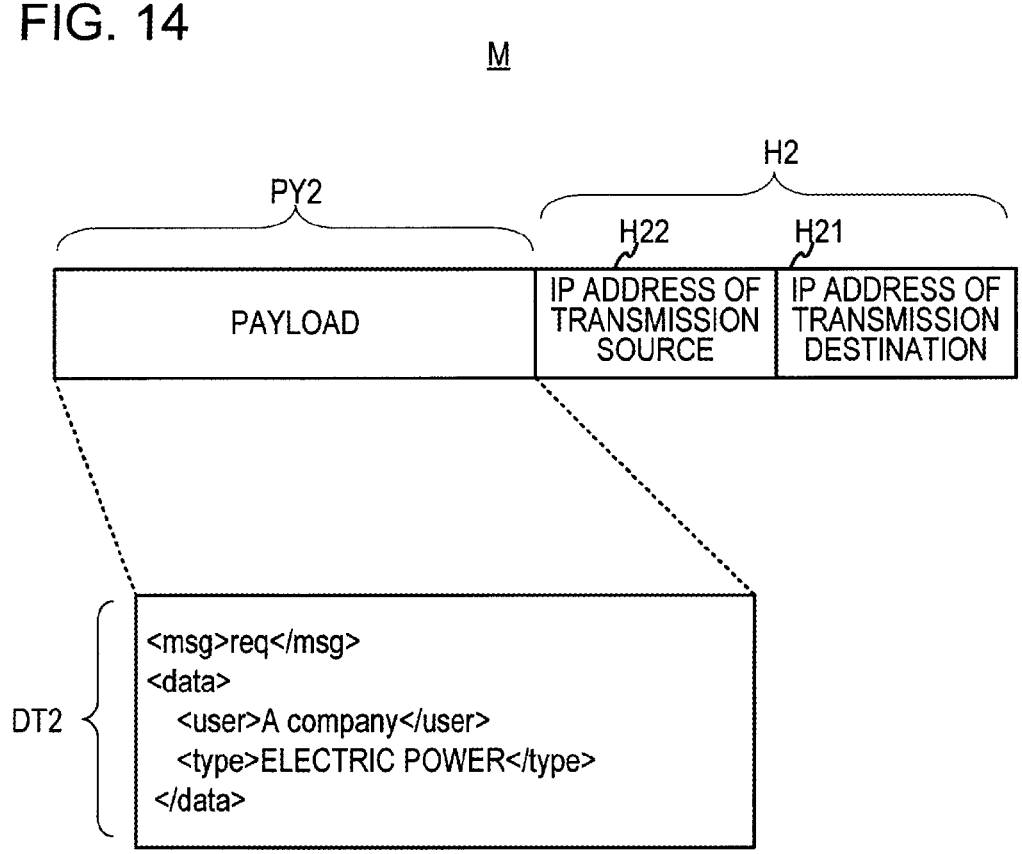
FIG. 14 is a diagram schematically illustrating one example of a transfer request notification M of the communication packet generated by the Application AP.

Each transfer apparatus receives a notification that includes a second attribute regarding data and a transfer destination of the communication packet inclusive of the second attribute. The notification is also referred to as a first notification. A transfer request notification M described in FIG. 14 is one example of this notification. Each transfer apparatus transfers the received communication packet inclusive of the second attribute to a third apparatus, which is a transfer destination included in the notification. The third apparatus, for example, is the second server SVR2 or other transfer apparatuses.

Then, each transfer apparatus transfers the notification received to other transfer apparatus. Each transfer apparatus stores an identifier to identify other transfer apparatus to which the notification is transferred, in a storage device (see FIG. 16), and transfers the notification to other transfer apparatus based on the identifier. It is noted that the identifier, for example, is the IP address.

Each transfer apparatus includes a transfer table and a connection table. The transfer table is a table that stores and correlates the attribute of the measurement data included in the communication packets with the IP address indicating the apparatus of a transfer destination of the communication packet. The transfer apparatus transfers the communication packet received based on the transfer table. The connection table is a table that stores the IP address set in the transfer apparatus that is provided on the upstream side and requests the transfer processing of the communication packet. The connection table stores the identifier to identify other transfer apparatus that transfers the aforementioned notification.

The control apparatus GWC of the transfer apparatuses calculates the transfer path of the communication packet, generates the transfer table inclusive of the calculation results, and transmits the transfer table to the first transfer apparatus GW1 to the sixth transfer apparatus GW6. Also, the control apparatus GWC of the transfer apparatuses generates the connection table and transmits the connection table to the first transfer apparatus GW1 to the sixth transfer apparatus GW6. The control apparatus GWC of the transfer apparatuses includes a topology table represented by a reference number TT, an entry transfer apparatus administration table represented by a reference number TI, and an exit transfer apparatus administration table represented by a reference number TO, wherein an IP address "10. 10. 1. 1" is set.

The first transfer apparatus GW1 includes a transfer table TF1 and a connection table TC1, wherein an IP address "10. 10. 10. 1" is set. The first transfer apparatus GW1 is not directly connected to the transfer apparatus that performs the transfer request of the communication packet, so that the content of the connection table TC1 is blank. The transfer table TF1 is described in FIG. 3.

The second transfer apparatus GW2 includes a transfer table TF2 and a connection table TC2, wherein an IP address "10. 10. 10. 2" is set. The second transfer apparatus GW2 is not directly connected to the transfer apparatus that performs the transfer request of the communication packet, so that the content of the connection table TC2 is blank.

The third transfer apparatus GW3 includes a transfer table TF3 and a connection table TC3, wherein an IP address "10. 10. 10. 3" is set. The third transfer apparatus GW3 receives the communication packets transferred from the first transfer apparatus GW1 and the second transfer apparatus GW2, which are provided on the upstream side. Accordingly, the connection table TC3 stores the IP address "10. 10. 10. 1" set in the first transfer apparatus GW1 and the IP address "10. 10. 10. 2" set in the second transfer apparatus GW2. The transfer table TF3 is described in FIG. 4.

The fourth transfer apparatus GW4 includes a transfer table TF4 and a connection table TC4, wherein an IP address "10. 10. 10. 4" is set. The fourth transfer apparatus GW4 receives the communication packets transferred from the first transfer apparatus GW1 and the second transfer apparatus GW2, which are provided on the upstream side. Accordingly, the connection table TC4 stores the IP address "10. 10. 10. 1" set in the first transfer apparatus GW1 and the IP address "10. 10. 10. 2" set in the second transfer apparatus GW2. The transfer table TF4 is described in FIG. 19.

The fifth transfer apparatus GW5 includes a transfer table TF5 and a connection table TC5, wherein an IP address "10. 10. 10. 5" is set. The fifth transfer apparatus GW5 receives the communication packet transferred from the third transfer apparatus GW3 which is provided on the upstream side. Accordingly, the connection table TC5 stores the IP address "10. 10. 10. 3" set in the third transfer apparatus GW3. The transfer table TF5 is described in FIG. 5.

The sixth transfer apparatus GW6 includes a transfer table TF6 and a connection table TC6, wherein an IP address "10. 10. 10. 6" is set. The sixth transfer apparatus GW6 receives the communication packet transferred from the fourth transfer apparatus GW4 which is provided on the upstream side. Accordingly, the connection table TC6 stores the IP address "10. 10. 10. 4" set in the fourth transfer apparatus GW4. The transfer table TF6 is described in FIG. 17.

The first server SVR1 is an information processing apparatus that executes an application AP1, wherein an IP address "192. 1. 1. 10" is set.

The application AP1 executes various information processing with respect to measurement data included in the communication packet received and outputs the results of the processing. For example, the application AP1 receives a plurality of communication packets, which are transmitted by the first sensor SN1, from the fifth transfer apparatus GW5 and visualizes time-series variation in the measurement data included in the plurality of communication packets received. One example of the visualization is a graph representation.

The second server SVR2 is an information processing apparatus that executes the application AP1, wherein an IP address "192. 1. 2. 15" is set.

It is noted that the first transfer apparatus GW1 terminates the connections made up of 10 units established between the sensors inclusive of the first sensor SN1 to the 10th sensor SN10, consolidates the connections into one connection (also referred to as reloading on another connection), and communicates with the next-stage third transfer apparatus GW3 and fourth transfer apparatus GW4. Also, the second transfer apparatus GW2 terminates the connections made up of 10 units established between the sensors inclusive of the 11th sensor SN11 to the 20th sensor SN20, consolidates the connections into one connection, and communicates with the next-stage third transfer apparatus GW3 and fourth transfer apparatus GW4.

The third transfer apparatus GW3 terminates the connections made up of 2 units established between the first transfer apparatus GW1 and the second transfer apparatus GW2, consolidates the connections into one connection, and communicates with the next-stage fifth transfer apparatus GW5. The fourth transfer apparatus GW4 terminates the connections made up of 2 units established between the first transfer apparatus GW1 and the second transfer apparatus GW2, consolidates the connections into one connection, and communicates with the next-stage sixth transfer apparatus GW6.

When the application AP1 of the first server SVR1 directly communicates with 20 sets of sensors inclusive of the first sensor SN1 to the 20th sensor SN20 without the intervention of the transfer apparatuses, the application AP1 needs to establish the connections made up of 20 units. However, the transfer apparatuses are provided in multiple stages between the first sensor SN1 to the 20th sensor SN20 and the first server SVR1, so that the application AP1 of the first server SVR1 only has to establish the connection made up of one unit. That is, the application AP1 of the first server SVR1 can reduce the number of connections in a case where the communication packets are received from the first sensor SN1 to the 20th sensor SN20. Accordingly, the first server SVR1 can restrain the consumption of physical resources in its own device, which is attributed to establishment of the magnitude of connections. Similarly, the second server SVR2 can restrain the consumption of physical resources in its own device, which is attributed to establishment of the magnitude of connections between the transfer apparatuses.

(Communication Packet)

FIG. 2 is a diagram schematically illustrating one example of the communication packet that is transmitted and received in the system in FIG. 1. A communication packet P includes a header H1 and a payload PY1.

The header H1 includes an IP address H11 of a transmission destination, which is an IP address set in the apparatus of a transmission destination (also referred to as a transfer destination) for the communication packet P, and an IP address H12 of a transmission source, which is an IP address set the apparatus of a transmission source (also referred to as a transfer source) for the communication packet P.

The payload PY1 includes data indicating the measurement results, and in the example of FIG. 1, the measurement data of the sensor and the attribute of the measurement data. Specifically, the payload PY1 includes a header HD1 of the payload PY1 and data DT1. The header HD1 is made up of character strings indicating additional information on the payload PY1. The character strings are represented by "GET / GW1 HTTP/1.1 Host: host.domain.co.jp
User-Agent: Mozilla/5.0
<?xml version="1.0" encoding="Shift-Jis"?>"

in the example of FIG. 2. The content of the character strings is not related to the transfer processing described in the embodiment of the present invention, and the description of the content will be omitted.

The data DT1 is data represented with a portion caught between a tag <data> and a tag </data>. A case is assumed where payload PY1 of the communication packet P includes electric power consumption, which is measured by the first sensor SN1, of an electrical device arranged in a building of the A company. When the electric power consumption measured by the first sensor SN1 is "100 W" ("W" is watt), the measurement data is "100 W". Also, the attribute of the measurement data, for example, is "electric power" indicating a type of the measurement data, and "A company" that utilizes the measurement data, which is represented as a discrimination parameter illustrated in FIG. 3. It is noted that a user "A company" is also an owner of the aforementioned electrical device.

In FIG. 2, the measurement data is represented as "100 W" caught between a tag <value> and a tag </value>. "A company" of the attribute of the measurement data is represented as "A company" caught between a tag <user> and a tag </user>. Then, "electric power" of the aforementioned attribute is represented as "electric power" caught between a tag <type> and a tag </type>. It is noted that "electric power" may be represented as "power". Also, the data DT1 may store hour, date, month, and year at a time when the measurement data is generated, between the tag <value> and the tag </value>, in addition to the measurement data. For example, the data DT1 may store "100 W (YYYY_MM_DD_H:M:S)", in place of "100 W". This represents that the first sensor SN1 generates the measurement data ("100 W") at H hours: M minutes: S seconds on DD date, MM month, YYYY year.

Furthermore, the header H1 of the communication packet P includes a port number of a transmission destination, which is a number to specify an application that serves as a transmission destination of the communication packet P, and a port number of a transmission source, which is a number to specify an application that serves as a transmission source of the communication packet P, but these descriptions are omitted.

(Establishment of Transfer Path of Communication Packet)

The establishment of the transfer path of the communication packet will be described referring to FIGS. 1 to 5. FIG. 3 is a diagram illustrating one example of the transfer table TF1 stored in the first transfer apparatus GW1 in FIG. 1. FIG. 4 is a diagram illustrating one example of the transfer table TF3 stored in the third transfer apparatus GW3 in FIG. 1. FIG. 5 is a diagram illustrating one example of the transfer table TF5 stored in the fifth transfer apparatus GW5 in FIG. 1.

The aforementioned tables include a discrimination parameter column and an IP address column of a following (in other word, next) transfer destination. The discrimination parameter column includes a type column and a user column. The discrimination parameter column is one example of the attribute of the measurement data, and for example, includes "type" indicating a type of the measurement data and "user" indicating a user who utilizes the measurement data. It is noted that the following transfer destination is also referred to as "Nexthop".

The application AP1 of the first server SVR1, for example, requests the control apparatus GWC of the transfer apparatuses in such a manner that the communication packet P transmitted by the first sensor SN1 is transferred to the first server SVR1. In response to the request from the application AP1 of the first server SVR1, the control apparatus GWC of the transfer apparatuses calculates the transfer path of the communication packet P. In this case, the control apparatus GWC of the transfer apparatuses calculates a path leading to the first sensor SN1, the first transfer apparatus GW1, the third transfer apparatus GW3, the fifth transfer apparatus GW5, and the first server SVR1 as a shortest transfer path leading form the first sensor SN1 to the first server SVR1.

Hereinafter, the shortest transfer path is appropriately referred to as "shortest transfer path".

Then, the control apparatus GWC of the transfer apparatuses generates a transfer table, which is referred to in a case where the transfer apparatuses transfer the communication packet P through the aforementioned shortest transfer path, and transmits the transfer table to the first transfer apparatus GW1, the third transfer apparatus GW3, and the fifth transfer apparatus GW5 on the shortest transfer path.

Specifically, the control apparatus GWC of the transfer apparatuses generates the transfer table TF1 of FIG. 3 as a transfer table. The transfer table TF1 stores "electric power" as a type in the type column, "A company" as a user in the user column, and an IP address "10. 10. 10. 3" set in the third transfer apparatus GW3 in the IP address column of the following transfer destination. It is noted that "humidity" in the type column, "B company" in the user column, and the IP address "10. 10. 10. 4" in the IP address column of the following transfer destination are not related to the transfer processing described in the embodiment of the present invention, and the content of these descriptions is omitted.

The control apparatus GWC of the transfer apparatuses transmits the transfer table TF1 generated to the first transfer apparatus GW1. The first transfer apparatus GW1 receives the transfer table TF1 and stores the transfer table TF1 in a storage device of its own.

The control apparatus GWC of the transfer apparatuses generates the transfer table TF3 in FIG. 4 as a transfer table. The transfer table TF3 stores "electric power" as a type in the type column, "A company" as a user in the user column, and the IP address "10. 10. 10. 5" set in the fifth transfer apparatus GW5 in the IP address column of the following transfer destination. The control apparatus GWC of the transfer apparatuses transmits the transfer table TF3 generated to the third transfer apparatus GW3. The third transfer apparatus GW3 receives the transfer table TF3 and stores the transfer table TF3 in a storage device of its own.

Furthermore, the control apparatus GWC of the transfer apparatuses generates the transfer table TF5 in FIG. 5 as a transfer table. The transfer table TF5 stores "electric power" as a type in the type column, "A company" as a user in the user column, and the IP address "192. 1. 1. 10" set in the first server SVR1 of the transfer destination in the IP address column of the following transfer destination. The control apparatus GWC of the transfer apparatuses transmits the transfer table TF5 generated to the fifth transfer apparatus GW5. The fifth transfer apparatus GW5 receives the transfer table TF5 and stores the transfer table TF5 in a storage device of its own.

(Transfer of Communication Packet)

The transfer processing of the communication packet will be described referring to FIGS. 1 to 5. The first sensor SN1 transmits the communication packet P to the first transfer apparatus GW1. As is described in FIG. 2, the communication packet P includes a header portion to specify a transmission source and a transmission destination and includes the measurement data and an attribute regarding the measurement data.

The first sensor SN1 includes an IP address (arbitrary) of a transmission source and the IP address "10. 10. 10. 1" of a transmission destination in the header portion of the communication packet P. The IP address H12 of a transmission source, for example, is an IP address set in the first sensor SN1.

The first transfer apparatus GW1 receives the communication packet P, analyzes the communication packet P received, and extracts a type and a user from the payload PY1 of the communication packet P. The first transfer apparatus GW1 searches the transfer table TF1 based on the type (electric power in the example in FIG. 2) and the user (A company in the example in FIG. 2) extracted in FIG. 3 as a search key and obtains "10. 10. 10. 3" as the IP address for the following transfer destination corresponding to the type and the user extracted. The IP address for the following transfer destination is the IP address set in the third transfer apparatus GW3.

The first transfer apparatus GW1 provides the IP address H12 of the transmission source of the communication packet P received with an IP address of its own apparatus, and further provides the IP address H11 of the transmission destination of the communication packet P received with an IP address obtained. Then, the first transfer apparatus GW1 transfers the communication packet P, in which IP addresses are replaced, to the third transfer apparatus GW3. The processing, in which the transfer apparatus replaces the IP address H12 of the transmission source of the communication packet P received with the IP address of its own apparatus and replaces the IP address H11 of the transmission destination of the communication packet P received with an IP address obtained from the transfer table of its own apparatus, is appropriately referred to as an IP address replacement.

The third transfer apparatus GW3 receives the communication packet P transferred from the first transfer apparatus GW1, analyzes the communication packet P received, and extracts the type and the user from the payload PY1 of the communication packet P. The third transfer apparatus GW3 searches the transfer table TF3 based on the type (electric power in the example in FIG. 2) and the user (A company in the example in FIG. 2) extracted in FIG. 4 as the search key and obtains "10. 10. 10. 5" as the IP address for the following transfer destination corresponding to the type and the user extracted. The IP address for the following transfer destination is the IP address set in the fifth transfer apparatus GW5.

The third transfer apparatus GW3 performs the aforementioned IP address replacement and transfers the communication packet P, in which the IP addresses are replaced, to the fifth transfer apparatus GW5.

The fifth transfer apparatus GW5 receives the communication packet P transferred from the third transfer apparatus GW3, analyzes the communication packet P received, and extracts the type and the user from the payload PY1 of the communication packet P. The fifth transfer apparatus GW5 searches the transfer table TF5 based on the type (electric power in the example in FIG. 2) and the user (A company in the example in FIG. 2) extracted in FIG. 5 as the search key and obtains "192. 1. 1. 10" as the IP address for the following transfer destination corresponding to the type and the user extracted. The IP address for the following transfer destination is the IP address set in the first server SVR1.

The fifth transfer apparatus GW5 performs the aforementioned IP address replacement and transfers the communication packet P, in which the IP addresses are replaced, to the application AP1 of the first server SVR1.

The application AP1 of the first server SVR1 receives the communication packet P transferred from the fifth transfer apparatus GW5, analyzes the communication packet P received, and extracts the measurement data, the type, and the user from the payload PY1 of the communication packet P. Then, the application AP1 executes the information processing for the measurement data extracted. In the aforementioned example, the application AP1 displays the variation in electric power consumption with regard to the A company in time series in the form of a graph.

(Movement of Application)

Incidentally, there is a case where an administrator of the first data center DC1 in FIG. 1 stops the supply of power of the first server SVR1. The reasons for the stoppage of the supply of power, for example, are that the administrator performs maintenance and inspection for the first server SVR1 of the first data center DC1, the rearrangement of the first server SVR1, and maintenance and inspection for a server rack that retains the first server SVR1.

When the supply of power of the first server SVR1 is stopped, the application AP1 stops. In contrast, the first sensor SN1 continues to transmit the communication packet P. As a result, the application AP1 fails to receive the communication packet P at least in a period ranging from the stop to the start and fails to perform the information processing for the measurement data included in the communication packet P. That is, the quality of service provided for the user is reduced.

Then, after the stoppage of the application AP1, for example, the administrator of the second data center DC2 allows the second server SVR2, which is different from the first server SVR1, to newly activate and execute the application AP1. The new activation and execution of the application AP1 in the second server SVR2 are illustrated with an arrow AR2 in FIG. 1. Then, the administrator of the second data center DC2 allows the application AP1 activated in the second server SVR2 to receive the communication packet P and execute the information processing for the measurement data included in the communication packet P. Hereinafter, the processing, in which a certain server stops the application during execution, and a server which is different from the certain server executes this application, is appropriately referred to as movement of an application. Furthermore, there is a case where the application is moved from the server, which currently executes the application, to another server, in order to adjust processing load between the servers.

Herein, the IP address (192. 1. 1. 10) of the first server SVR1 is different from the IP address (192. 1. 2. 15) of the second server SVR2. Accordingly, in order to receive the communication packet P, the application AP1 of the second server SVR2 transmits the transfer request, which requests in such a manner that the communication packet P is transferred to the second server SVR2, to the control apparatus GWC of the transfer apparatuses.

In response to the transfer request, the control apparatus GWC of the transfer apparatuses recalculates the shortest transfer path leading from the first sensor SN1 to the second server SVR2. In this case, the control apparatus GWC of the transfer apparatuses, for example, recalculates a path leading to the first sensor SN1, the first transfer apparatus GW1, the fourth transfer apparatus GW4, the sixth transfer apparatus GW6, and the second server SVR2, as the shortest transfer path leading form the first sensor SN1 to the second server SVR2.

Then, the control apparatus GWC of the transfer apparatuses generates a transfer table, which is referred to by the transfer apparatuses in a case where the transfer apparatuses transfer the communication packet P through the aforementioned shortest transfer path. The control apparatus GWC of the transfer apparatuses transmits the transfer table to the first transfer apparatus GW1, the fourth transfer apparatus GW4, and the sixth transfer apparatus GW6 on the shortest transfer path.

Incidentally, at the first data center DC1, for example, when the administrator performs maintenance and inspection for a multitude of servers, or the rearrangement of the multitude of servers, or maintenance and inspection for a server rack that retains the multitude of servers, the multitude of servers are stopped. The multitude of servers are servers that receive the communication packet (see FIG. 2), which includes the measurement data measured by the first sensor SN1 et cetera and the attribute regarding the measurement data, and execute the applications that execute various information processing for the measurement data.

The administrator of the second data center DC2 allows the multitude of servers provided in the second data center DC2 to execute the multitude of applications, thereby executing various information processing for the aforementioned measurement data. At this time, the multitude of applications simultaneously make the transfer request to the control apparatus GWC of the transfer apparatuses in such a manner as to request that the communication packet transmitted by the first sensor SN1 et cetera is transferred to the application of its own. The control apparatus GWC of the transfer apparatuses receives a multitude of transfer requests transmitted from the multitude of applications.

In response to each transfer request received, the control apparatus GWC of the transfer apparatuses recalculates each shortest transfer path corresponding to each transfer request. Then, the control apparatus GWC of the transfer apparatuses generates a multitude of transfer tables, which are referred to by the transfer apparatuses in a case where the transfer apparatuses transfer the communication packet transmitted by the first sensor SN1 through the aforementioned shortest transfer path. Then, the control apparatus GWC of the transfer apparatuses transmits the multitude of transfer tables generated to the transfer apparatuses on the shortest transfer path.

With respect to a series of processes of the recalculation of the shortest transfer path, the generation and transmission of the transfer table, the processing load of the control apparatus GWC of the transfer apparatuses is increased, whereby the amount of processing per unit time with regard to the control apparatus GWC of the transfer apparatuses is substantially reduced.

Accordingly, the delay in transmission of the transfer table occurs in the control apparatus GWC of the transfer apparatuses. As a result, a start time of receiving the communication packet transmitted by the first sensor SN1 is delayed to a great degree in the second data center DC2. Furthermore, the start time of information processing for the measurement data is delayed to a great degree, the quality of service provided for the user is decreased. Accordingly, in order to shorten the aforementioned delay time, the transfer apparatus changes the transfer paths of the communication packet without using the control apparatus of the transfer apparatuses. Next, the transfer apparatuses, the control apparatus of the transfer apparatuses, and the servers of the embodiment of the present invention will be described in detail.

(Transfer Apparatus)

FIG. 6 is a block diagram illustrating one example of the constitution of hardware of a transfer apparatus GW. The first transfer apparatus GW1 to the sixth transfer apparatus GW6 described in FIG. 1 have the same constitution as that of the transfer apparatus GW described in FIGS. 6 and 7.

The transfer apparatus GW includes a CPU (Central Processing Unit) 11, a memory 12, a display control unit 13, an operation control unit 14, a storage reading device 15, a storage device 16, and a communication device 17, each of which is connected with each other via a bus B.

The CPU 11 is a computer (control unit) to control the entire transfer apparatus GW. The memory 12 temporarily stores various control information and data calculated in various information processing executed by the CPU 11.

The display control unit 13 executes the processing of displaying various images on a display device D1. The display device D1, for example, is a liquid crystal display.

Upon the reception of the operational instruction inputted from an operation device K1, the operation control unit 14 executes various processing in response to the operational instruction. The operation device K1, for example, is a keyboard or a mouse.

The storage reading device 15 is a device to read data recorded in a storage medium M1. The storage medium M1 is exemplified by portable storage media such as CD-ROM (Compact Disc Read Only Memory), DVD (Digital Versatile Disc), and USB (Universal Serial Bus). It is noted that programs described in FIG. 7 may be stored in the storage medium M1.

The storage device 16, for example, is made up of a magnetic storage device such as HDD (Hard Disk Drive) and a non-volatile memory. The storage device 16, for example, stores a transfer table TF and connection table TC. Furthermore, the storage device 16 stores programs described in FIG. 7. When the transfer apparatus GW in FIG. 6 is the first transfer apparatus GW1 in FIG. 1, the transfer table TF corresponds to the transfer table TF1, and the connection table TC corresponds to the connection table TC1.

The communication device 17 is exemplified by NIC (Network Interface Card), which is a dedicated circuit board specialized for network communication. The communication device 17 connects to other apparatuses via a network N. It is noted that other apparatuses, for example, are the control apparatus of the transfer apparatuses, the servers, and other transfer apparatuses.

Figure 7:
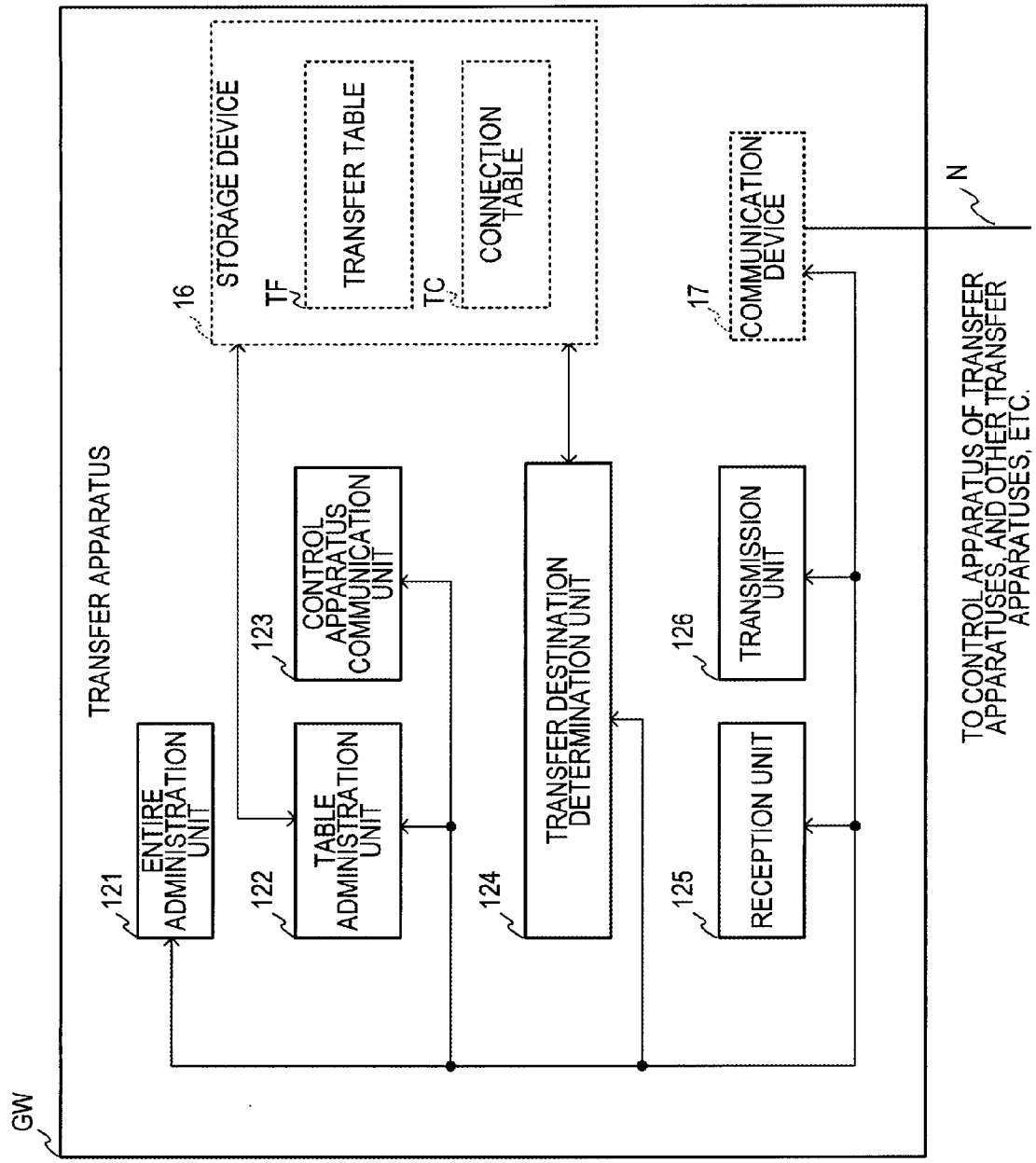
FIG. 7 is a block diagram illustrating one example of the constitution of a software module of the transfer apparatus.

FIG. 7 is a block diagram illustrating one example of the constitution of a software module of the transfer apparatus. The transfer apparatus GW includes an entire administration unit 121, a table administration unit 122, a control apparatus communication unit 123, a transfer destination determination unit 124, a reception unit 125, and a transmission unit 126. In FIG. 7, the storage device 16 and the communication device 17, which are hardware elements, are illustrated in a dotted line.

The entire administration unit 121 administrates various processing executed by the transfer apparatus GW. For example, the entire administration unit 121 administrates the table administration unit 122, the control apparatus communication unit 123, the transfer destination determination unit 124, the reception unit 125, and the transmission unit 126. Furthermore, the entire administration unit 121 receives an IP address of its own apparatus, which is inputted through the administrator's operation of the operation device K1 (see FIG. 6), via the operation control unit 14 and stores the IP address in the storage device 16. The IP address memorized is set in the transfer apparatus GW.

The table administration unit 122 administrates the transfer table TF and the connection table TC and executes the storage processing and change processing of each table. The control apparatus communication unit 123 executes various processing regarding communication with the control apparatus GWC of the transfer apparatuses. The transfer destination determination unit 124 determines the transfer destination of the communication packet based on the transfer table TF. The reception unit 125 receives the communication packet and later-described various notifications (the notification is also referred to as a message). The transmission unit 126 transmits the communication packet and later-described various notifications.

The entire administration unit 121, the table administration unit 122, the control apparatus communication unit 123, the transfer destination determination unit 124, the reception unit 125, and the transmission unit 126 are programs (also referred to as software). These programs, for example, are stored in the storage device 16. Upon the activation, the CPU 11 in FIG. 6 reads out these programs from the storage device 16 and expands the programs in the memory 12, thereby functioning these programs as a software module.

(Control Apparatus of Transfer Apparatuses)

Figure 8:
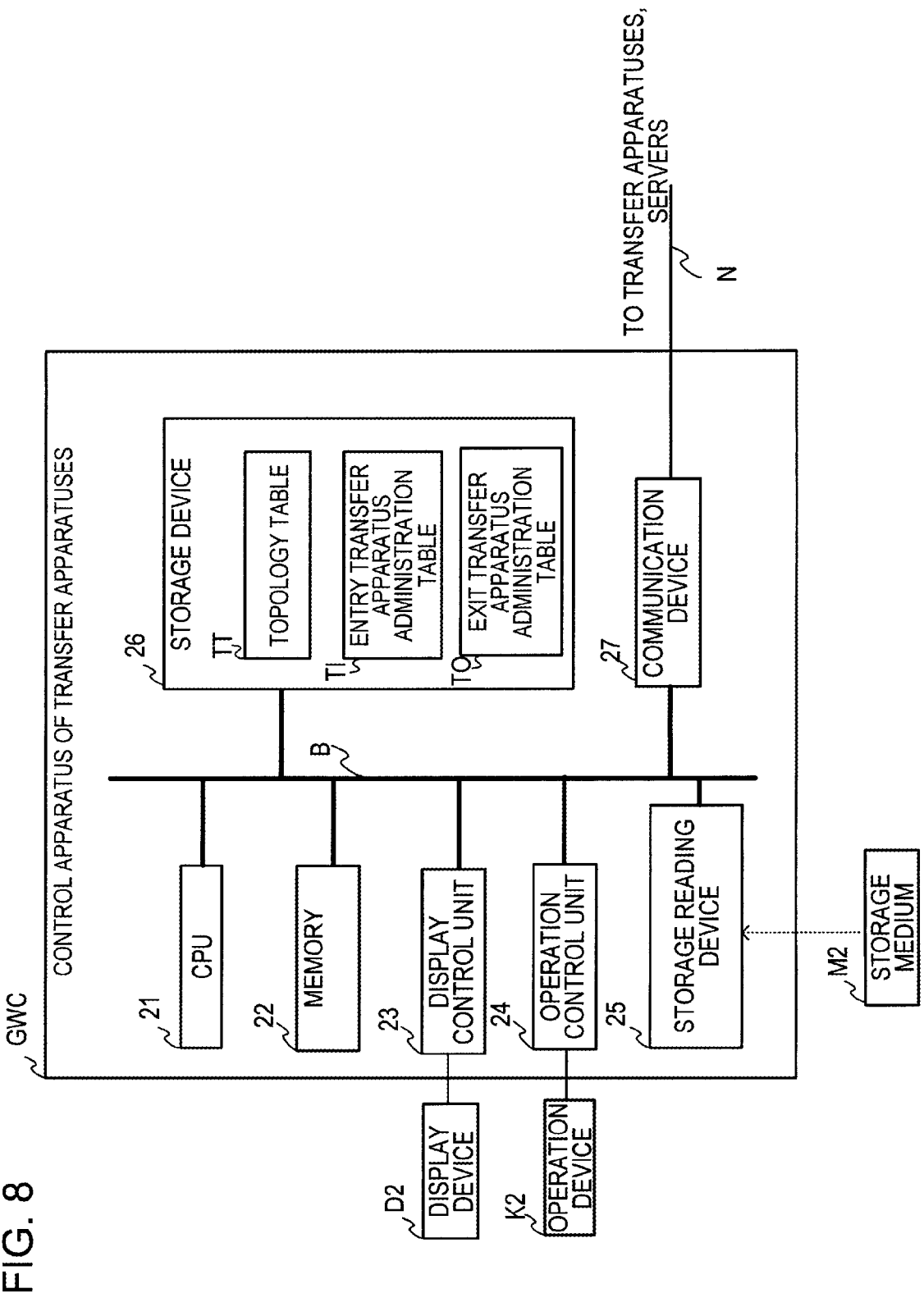
FIG. 8 is a block diagram illustrating one example of the constitution of hardware of the control apparatus GWC of the transfer apparatuses.

FIG. 8 is a block diagram illustrating one example of the constitution of hardware of the control apparatus GWC of the transfer apparatuses. The control apparatus GWC of the transfer apparatuses includes a CPU 21, a memory 22, a display control unit 23, an operation control unit 24, a storage reading device 25, a storage device 26, and a communication device 27, each of which is connected with each other via a bus B.

The CPU 21 is a computer (control unit) to control the entire control apparatus GWC of the transfer apparatuses. The memory 22 stores various control information and data calculated in various information processing executed by the CPU 21.

The display control unit 23 executes the processing of displaying various images on a display device D2. The display device D2, for example, is a liquid crystal display.

Upon the reception of the operational instruction inputted from an operation device K2, the operation control unit 24 executes various processing in response to the operational instruction. The operation device K2, for example, is a keyboard or a mouse.

The storage reading device 25 is a device to read data recorded in a storage medium M2. The storage medium M2 is exemplified by portable storage media such as CD-ROM, DVD, and USB. It is noted that programs described later may be stored in the storage medium M2.

The storage device 26, for example, is made up of a magnetic storage device such as HDD and a non-volatile memory. The storage device 26, for example, stores a topology table TT and an entry transfer apparatus administration table TI, and an exit transfer apparatus administration table TO. Furthermore, the storage device 26 stores programs described later.

The communication device 27 is exemplified by Network Interface Card, which is a dedicated circuit board specialized for network communication. The communication device 27 connects to other apparatuses via the network N. It is noted that other apparatuses, for example, are the transfer apparatuses and the servers.

Figure 9:
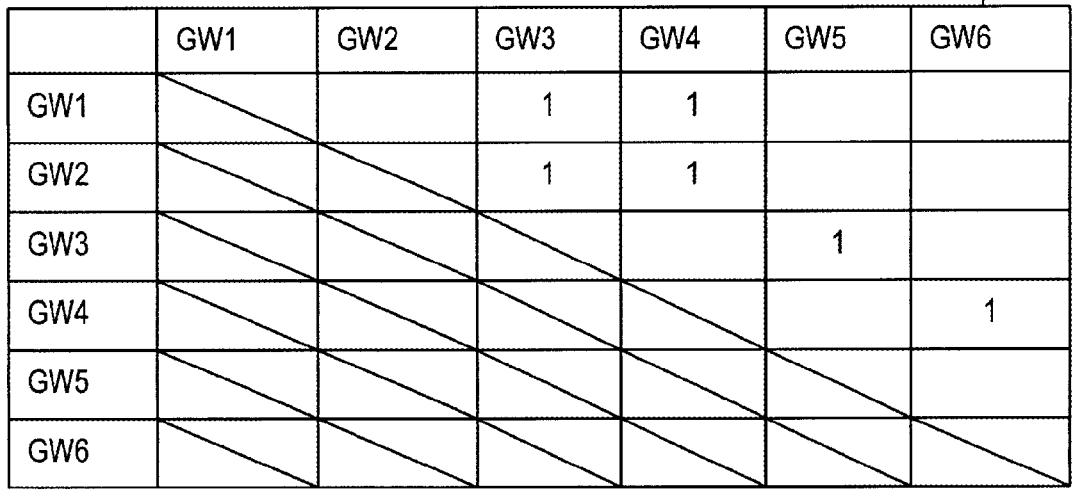
FIG. 9 is one example of a table illustrating the connection relation of each transfer apparatus.

FIG. 9 is one example of a table illustrating the connection relation of each transfer apparatus. The topology table U includes columns that represent a reference number of each transfer apparatus, in the uppermost line and the leftmost line. Then, the topology table U stores a symbol illustrating the connection relation between transfer apparatuses at a portion (also referred to as cell) where the column representing the reference number that identifies the transfer apparatus in the uppermost line and the column representing the reference number that identifies the transfer apparatus in the leftmost line are intersected. The connection relation is excluded with regards to the cell on which an oblique line is drawn.

The reference numbers to identify the transfer apparatuses are represented by GW1 to GW6. The GW1 to GW6 are the reference numbers added to the first transfer apparatus to the sixth transfer apparatus described in FIG. 1. Also, the GW1 to GW6 represent IP addresses set in the transfer apparatuses identified based on the reference numbers. For example, in the case of GW1, the GW1 represents the IP address "10. 10. 10. 1" set in the first transfer apparatus.

In the example of FIG. 1, the first transfer apparatus GW1, the third transfer apparatus GW3, and the fourth transfer apparatus GW4 are connected. Accordingly, the topology table U stores "1" as a symbol representing the connection relation at a portion where the columns of the third transfer apparatus GW3 and the fourth transfer apparatus GW4 in the uppermost line and the column of the first transfer apparatus GW1 in the leftmost line are intersected.

Also, in the example of FIG. 1, the second transfer apparatus GW2, the third transfer apparatus GW3, and the fourth transfer apparatus GW4 are connected. Accordingly, the topology table U stores "1" as a symbol representing the connection relation at a portion where the columns of the third transfer apparatus GW3 and the fourth transfer apparatus GW4 in the uppermost line and the column of the second transfer apparatus GW2 in the leftmost line are intersected.

Also, in the example of FIG. 1, the third transfer apparatus GW3 and the fifth transfer apparatus GW5 are connected. Accordingly, the topology table TT stores "1" as a symbol representing the connection relation at a portion where the column of the fifth transfer apparatus GW5 in the uppermost line and the column of the third transfer apparatus GW3 in the leftmost line are intersected.

Also, in the example of FIG. 1, the fourth transfer apparatus GW4 and the sixth transfer apparatus GW6 are connected. Accordingly, the topology table TT stores "1" as a symbol representing the connection relation at a portion where the column of the sixth transfer apparatus GW6 in the uppermost line and the column of the fourth transfer apparatus GW4 in the leftmost line are intersected.

Figure 10:
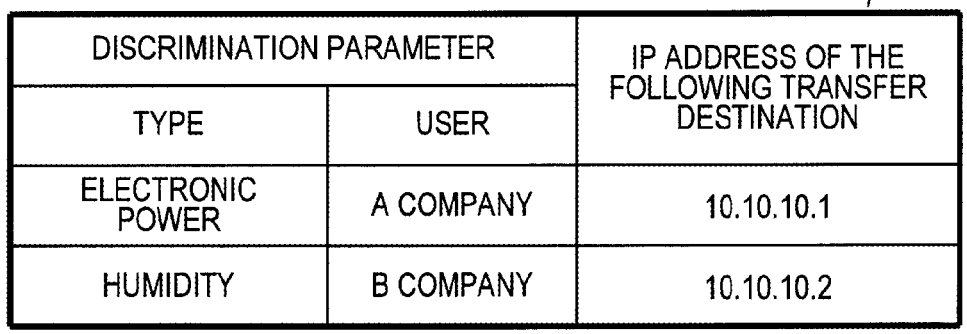
FIG. 10 is one example of a table that stores an IP address set in the transfer apparatus on the uppermost stream and a discrimination parameter of the communication packets that the transfer apparatus at the uppermost stream transfers to the transfer apparatuses on the lower stream side.

FIG. 10 is one example of a table that stores an IP address set in the transfer apparatus on the uppermost stream and a discrimination parameter of the communication packets that the transfer apparatus at the uppermost stream transfers to the transfer apparatuses on the lower stream side. The entry transfer apparatus administration table TI includes a discrimination parameter column and an IP address column set in the transfer apparatus at an entry. The transfer apparatus at the entry is synonymous with the transfer apparatus at the uppermost stream. The entry transfer apparatus administration table TI stores the discrimination parameter of the communication packet transferred by the first transfer apparatus GW1.

Figure 11:
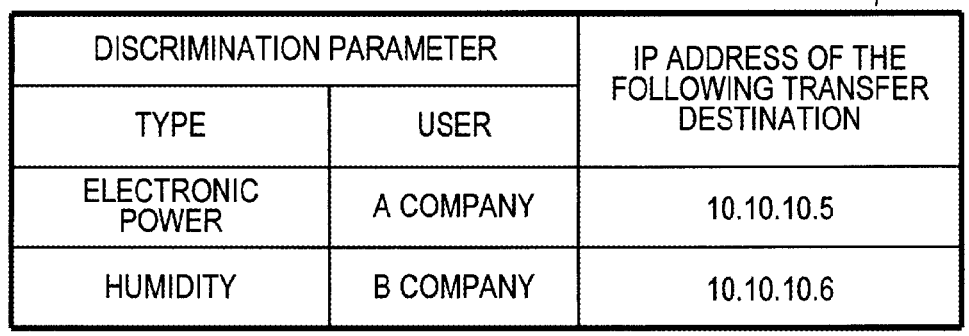
FIG. 11 is one example of a table that stores the IP address set in the transfer apparatus on the lowermost stream and a discrimination parameter of the communication packet that the transfer apparatus at the lowermost stream transfers to the servers.

FIG. 11 is one example of a table that stores the IP address set in the transfer apparatus on the lowermost stream and a discrimination parameter of the communication packet that the transfer apparatus at the lowermost stream transfers to the servers. The exit transfer apparatus administration table TO includes a discrimination parameter column and an IP address column set in the transfer apparatus at an exit. The transfer apparatus at the exit is synonymous with the transfer apparatus at the lowermost stream. The exit transfer apparatus administration table TO stores the discrimination parameter of the communication packet transferred by the fifth transfer apparatus GW5 and the sixth transfer apparatus GW6.

Figure 12:
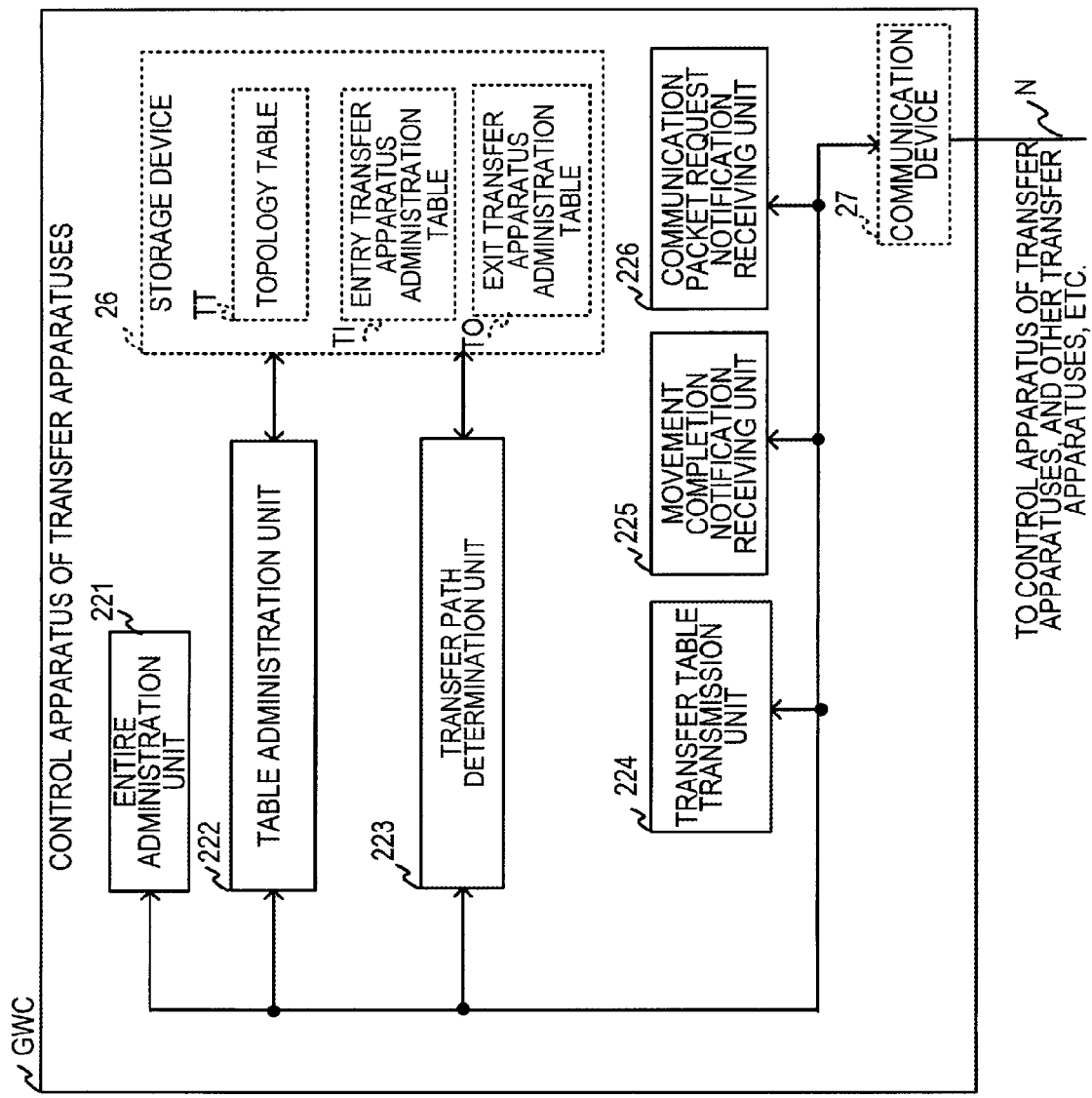
FIG. 12 is a block diagram illustrating one example of the constitution of a software module of the control apparatus GWC of the transfer apparatuses.

FIG. 12 is a block diagram illustrating one example of the constitution of a software module of the control apparatus GWC of the transfer apparatuses. The control apparatus GWC of the transfer apparatuses includes an entire administration unit 221, a table administration unit 222, a transfer path determination unit 223, a transfer table transmission unit 224, a movement completion notification receiving unit 225, and a communication packet request notification receiving unit 226. In FIG. 12, the storage device 26 and the communication device 27, which are hardware elements, are illustrated in a dotted line.

The entire administration unit 221 administrates various processing executed by the control apparatus GWC of the transfer apparatuses. For example, the entire administration unit 221 administrates the table administration unit 222, the transfer path determination unit 223, the transfer table transmission unit 224, the movement completion notification receiving unit 225, and the communication packet request notification receiving unit 226.

The table administration unit 222 administrates the topology table TT and the entry transfer apparatus administration table TI, and the exit transfer apparatus administration table TO and executes the storage processing and change processing of each table.

The transfer path determination unit 223 determines (also referred to as "calculate") the shortest transfer path based on the topology table TT. Then, the transfer path determination unit 223 generates a transfer table which is referred to in a case where the transfer apparatuses transfer the communication packet P through the aforementioned shortest transfer path.

The transfer table transmission unit 224 transmits the transfer table generated to the transfer apparatus on the shortest transfer path. The movement completion notification receiving unit 225 receives a movement completion notification transmitted by the transfer apparatus at the lowermost stream, which is connected to the server that executes the application after movement. The communication packet request notification receiving unit 226 receives a communication packet request notification transmitted by the transfer apparatus at the lowermost stream, which is connected to the server that executes the application after movement.

The entire administration unit 221, the table administration unit 222, the transfer path determination unit 223, the transfer table transmission unit 224, the movement completion notification receiving unit 225, and the communication packet request notification receiving unit 226 are programs. These programs, for example, are stored in the storage device 26. Upon the activation, the CPU 21 in FIG. 8 reads out these programs from the storage device 26 and expands the programs in the memory 22, thereby functioning these programs as a software module.

(Server)

Figure 13:
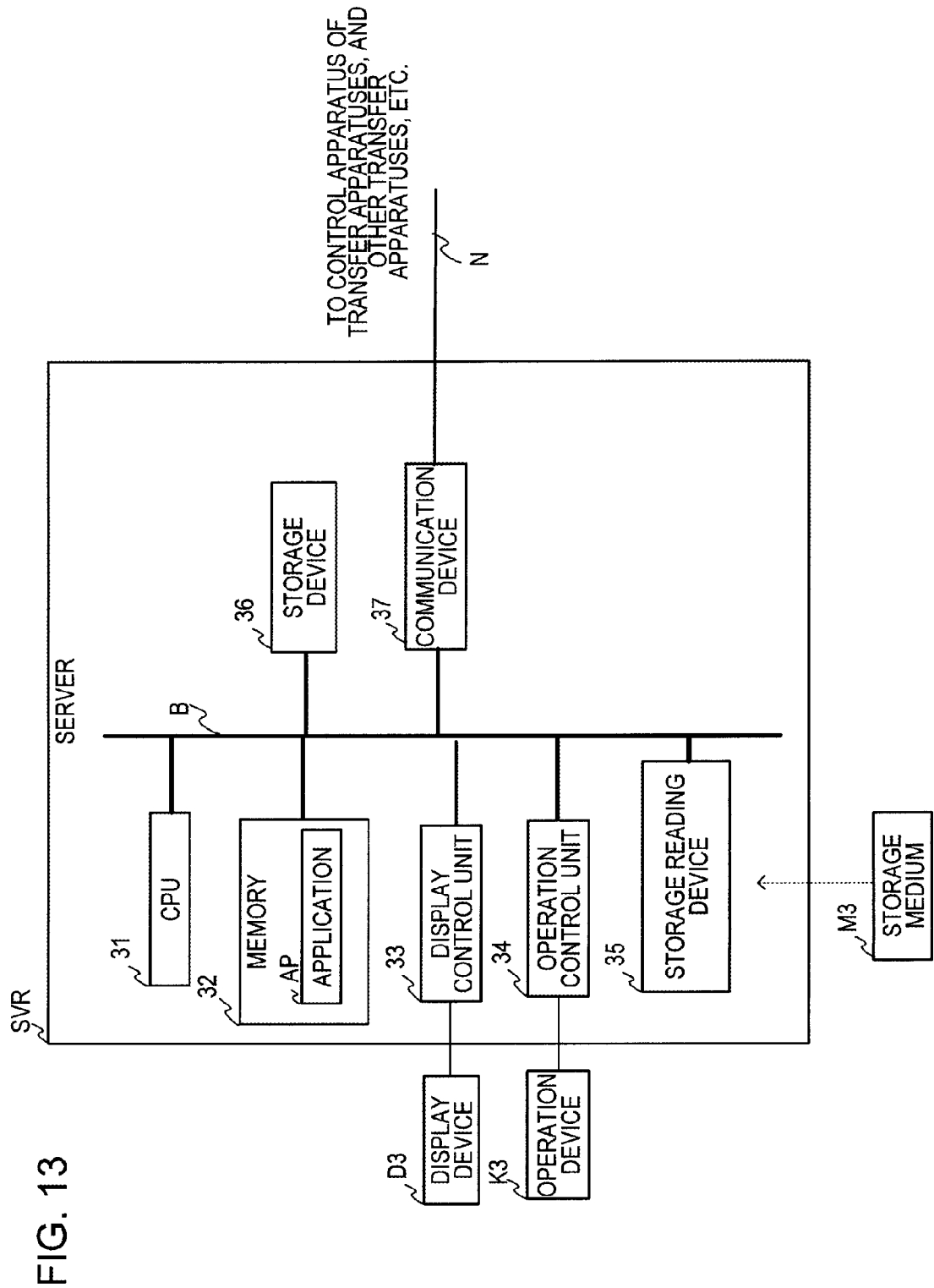
FIG. 13 is a block diagram illustrating one example of the constitution of hardware of a server SVR.

FIG. 13 is a block diagram illustrating one example of the constitution of hardware of a server SVR. The first server SVR1 and the second server SVR2 described in FIG. 1 have the same constitution as that of the server SVR described in FIG. 13.

The server SVR includes a CPU 31, a memory 32, a display control unit 33, an operation control unit 34, a storage reading device 35, a storage device 36, and a communication device 37, each of which is connected with each other via a bus B The CPU 31 is a computer (control unit) to control the entire server SVR. The memory 32 stores various control information and data calculated in various information processing executed by the CPU 31.

The display control unit 33 executes the processing of displaying various images on a display device D3. The display device D3, for example, is a liquid crystal display.

Upon the reception of the operational instruction inputted from an operation device K3, the operation control unit 34 executes various processing in response to the operational instruction. The operation device K3, for example, is a keyboard or a mouse.

The storage reading device 35 is a device to read data recorded in a storage medium M3. The storage medium M3 is exemplified by portable storage media such as CD-ROM, DVD, and USB. It is noted that programs described later may be stored in the storage medium M3.

The storage device 36, for example, is made up of a magnetic storage device such as Hard Disk Drive and a non-volatile memory. The storage device 36, for example, stores a program described later.

The communication device 37 is exemplified by Network Interface Card, which is a dedicated circuit board specialized for network communication. The communication device 37 connects to other apparatuses via the network N. It is noted that other apparatuses, for example, are the transfer apparatuses and the control apparatus of the transfer apparatuses.

The application AP of the memory 32 has the same function as that of the application AP1 described in FIG. 1. Also, when the administrator moves the application AP to other server, the application AP generates the transfer request notification of the communication packet and transmits the transfer request notification to the transfer apparatus at the lowermost stream, which is directly connected to the server that executes the application AP. The transfer request notification of the communication packet is described in FIG. 14.

The application AP is a program. This program, for example, is stored in the storage device 36. Upon the activation, the CPU 31 reads out the programs from the storage device 36 and expands the programs in the memory 32, thereby functioning the program as a software module.

FIG. 14 is a diagram schematically illustrating one example of a transfer request notification M of the communication packet generated by the Application AP. The transfer request notification M includes a header H2 and a payload PY2. The header H2 includes an IP address H21 of a transmission destination, which is an IP address set in the apparatus of a transmission destination (also referred to as a transfer destination) for the transfer request notification M, and an IP address H22 of a transmission source, which is an IP address set the apparatus of a transmission source (also referred to as a transfer source) for the transfer request notification M.

The payload PY2 includes an identifier indicating the transfer request and the attribute of the data indicating the measurement result. Specifically, the payload PY2 includes data DT2.

The data DT2 is data that is indicated by an identifier "req" caught between a tag <msg> and a tag </msg> and by a portion caught between a tag <data> and a tag </data>. The data indicated by the portion caught between the tag <data> and the tag </data> represents data that the application AP requests to be transferred and corresponds to the discrimination parameter. In the example of FIG. 14, "A company" of the attribute of the measurement data, which is caught between the tag <user> and the tag </user>, is represented as an attribute of the measurement data indicating the measurement result. Then, "electric power" of the attribute, which is caught between a tag <type> and a tag </type>, is represented.

It is noted that the data DT2 may include "<?xml version="1.0" encoding="Shift-Jis"?>" described in FIG. 2. Also, the payload PY2 may include the header HD1 of the payload described in FIG. 2.

The transfer request notification M described above is one example of a notification that includes a second attribute regarding data and a transfer destination of the communication packet P inclusive of the second attribute. The transfer destination of the communication packet P included in the transfer request notification M is represented by an identifier to identify a third apparatus which is the transfer destination of the communication packet P after the movement of the application. The identifier is the IP address H22 of the transmission source of the header H2 described later.

The transmission unit 126 of the transfer apparatus GW (see FIG. 7) transfers the communication packet inclusive of the second attribute to the third apparatus based on the identifier.

The transfer request notification M that the application AP generates and transmits to the transfer apparatus on the lowermost stream is one example of the notification transmitted from another transfer apparatus based on an opportunity for which the processing apparatus of the final transfer destination, to which the communication packet is conclusively transferred, is changed to other processing apparatus. For example, other transfer apparatus is the second server SVR2.

(Flow of Processing Executed by Transfer Apparatus)

Figure 15:
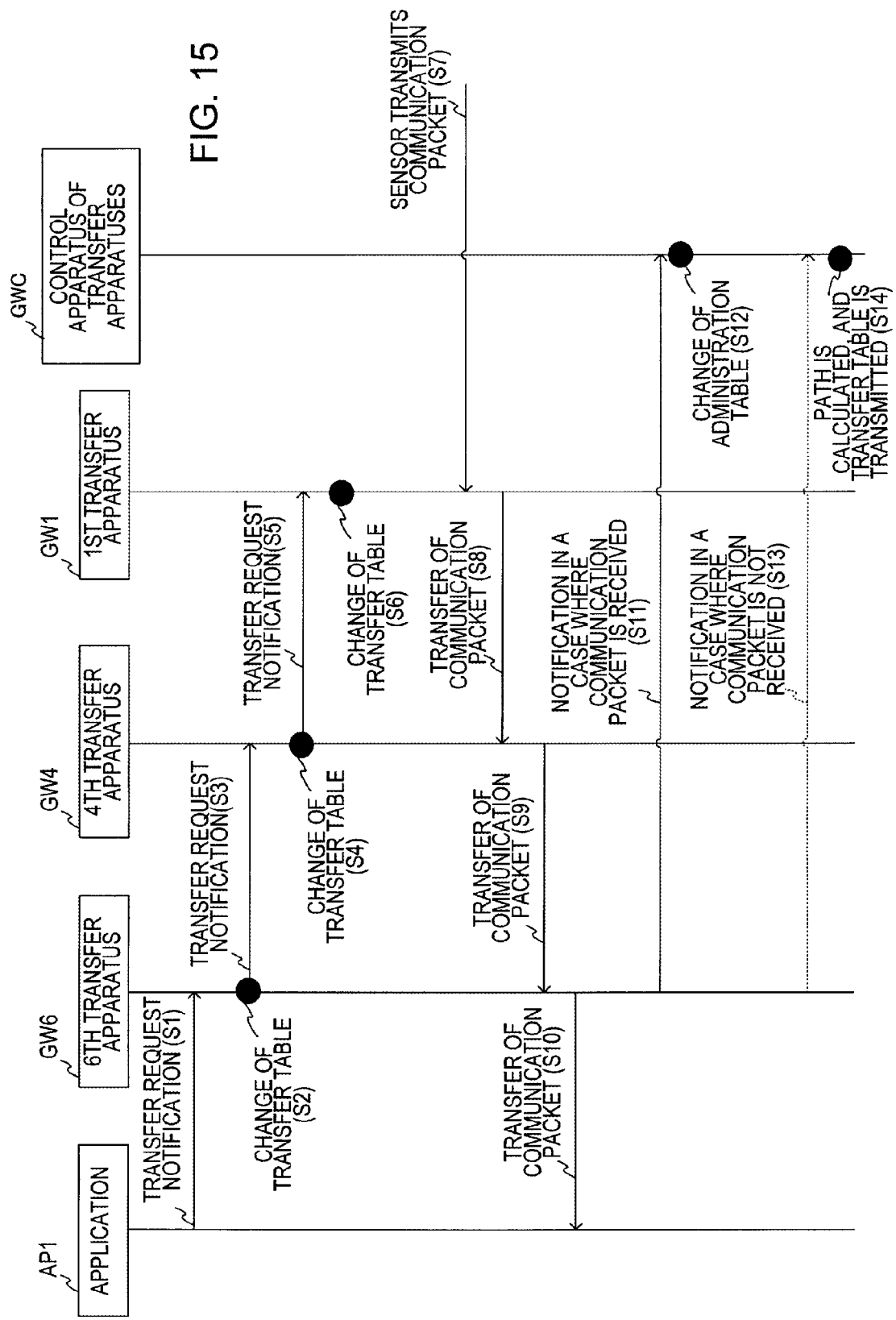
FIG. 15 is a sequence diagram illustrating one example of the flow of the processing of the transfer apparatus, the control apparatus of the transfer apparatuses, and the application in the entire system SYS in FIG. 1.

FIG. 15 is a sequence diagram illustrating one example of the flow of the processing of the transfer apparatus, the control apparatus of the transfer apparatuses, and the application in the entire system SYS in FIG. 1.

Step S1: After the movement of the application AP1 described in FIG. 1, the application AP1 transmits the transfer request notification M to the transfer apparatus at the lowermost stream, which is directly connected to the second server SVR2 that executes the application AP1. The transfer apparatus at the lowermost stream is the sixth transfer apparatus GW6.

That is, the application AP1, whose operation is started by the second server SVR2, generates the transfer request notification M and transmits the transfer request notification M to the sixth transfer apparatus GW6. Regarding the transmission of the transfer request notification M, the application AP1 provides the IP address H22 of the transmission source of the transfer request notification M with the IP address "192. 1. 2. 15" set in the second server SVR2 and provides an IP address H21 of the transmission destination with the IP address "10. 10. 10. 6" set in the sixth transfer apparatus GW6 of the transmission destination. Then, the application AP1 provides the payload PY2 described in FIG. 14 with the data DT2.

Step S2: The sixth transfer apparatus GW6 receives the transfer request notification M transmitted from the application AP1 and changes the transfer table TF6 based on the transfer request notification M.

Step S3: The sixth transfer apparatus GW6 transfers the transfer request notification M received to the fourth transfer apparatus GW4. It is noted that the processing at the Step S2 and Step S3 will be described in detail in FIG. 16.

Step S4: The fourth transfer apparatus GW4 receives the transfer request notification M transferred from the sixth transfer apparatus GW6 and changes the transfer table TF4 based on the transfer request notification M.

Step S5: The fourth transfer apparatus GW4 transfers the transfer request notification M received to the first transfer apparatus GW1.

Step S6: The first transfer apparatus GW1 receives the transfer request notification M transferred from the fourth transfer apparatus GW4 and changes the transfer table TF1 based on the transfer request notification M. The processing at the Step S4 to Step S6 will be described in detail in FIG. 18.

According to the processing at the Step S2, the Step S4, and the Step S6, the transfer path of the communication packet P is changed from the first transfer path to the second transfer path. The first transfer path is a transfer path leading to the first transfer apparatus GW1, the third transfer apparatus GW3, and the fifth transfer apparatus GW5. The second transfer path is a transfer path leading to the first transfer apparatus GW1, the fourth transfer apparatus GW4, and the sixth transfer apparatus GW6.

Step S7: The sensor transmits the communication packet. In the example of FIG. 1, the first sensor SN1 transmits the communication packet P of FIG. 2 to the first transfer apparatus GW1.

Step S8: The first transfer apparatus GW1 receives the communication packet P and transfers the communication packet P to the fourth transfer apparatus GW4 based on the transfer table TF1 after the change.

Step S9: The fourth transfer apparatus GW4 receives the communication packet P and transfers the communication packet P to the sixth transfer apparatus GW6 based on the transfer table TF4 after the change.

Step S10: The sixth transfer apparatus GW6 receives the communication packet P and transfers the communication packet P to the application AP1 of the second server SVR2 based on the transfer table TF6 after the change.

Step S11: When the sixth transfer apparatus GW6 receives the communication packet P, the sixth transfer apparatus GW6 transmits the movement completion notification to the control apparatus GWC of the transfer apparatuses. It is noted that the processing at the Step S11 will be described in detail in FIG. 22.

Step S12: The control apparatus GWC of the transfer apparatuses changes the exit transfer apparatus administration table TO in FIG. 11 based on the movement completion notification received. It is noted that the processing at the Step S12 will be described in detail in FIG. 23.

Step S13: When the sixth transfer apparatus GW6 does not receive the communication packet P, the communication packet request notification is transmitted to the control apparatus GWC of the transfer apparatuses.

Step S14: The control apparatus GWC of the transfer apparatuses calculates the shortest transfer path based on the communication packet request notification, generates the transfer table, and transmits the transfer table to the transfer apparatuses on the shortest transfer path.

It is noted that the processing at the Step S13 and Step S14 will be described in detail in the description of the present embodiment at the last part of the specification.

(Flow of Processing of Sixth Transfer Apparatus GW6)

Figure 16:
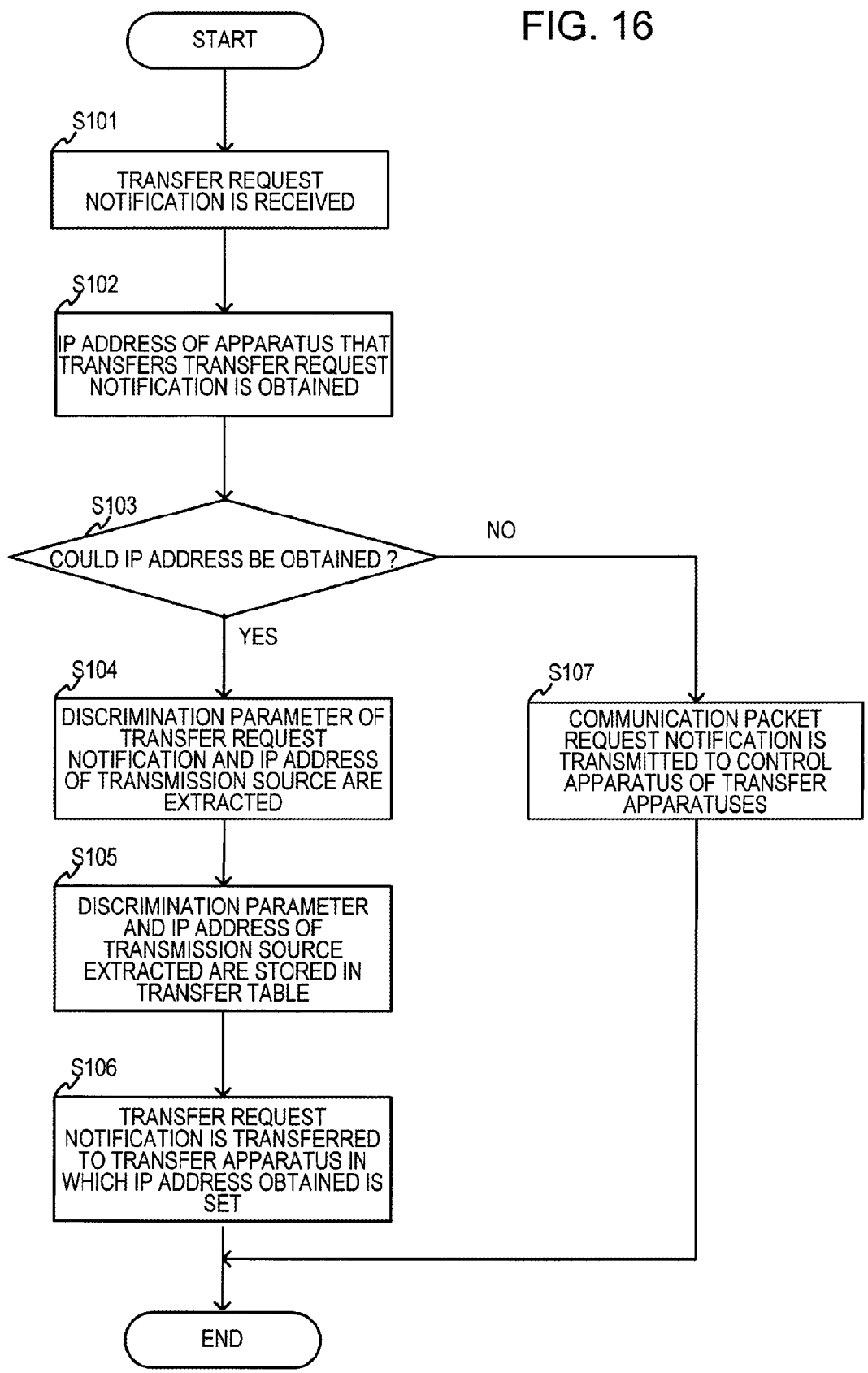
FIG. 16 is a flowchart illustrating one example to describe the flow of the processing of the sixth transfer apparatus GW6 in FIG. 1.
Figure 17:
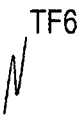
FIG. 17 is a diagram illustrating one example of the transfer table TF6 stored in the sixth transfer apparatus GW6 in FIG. 1.

The flow of the processing of the sixth transfer apparatus GW6 will be described referring to FIGS. 14, 16, and 17. FIG. 16 is a flowchart illustrating one example to describe the flow of the processing of the sixth transfer apparatus GW6 in FIG. 1. In other words, FIG. 16 is a flowchart to describe the flow of the processing of the transfer apparatus at the lowermost stream, which is connected to the server that executes the application after movement. FIG. 17 is a diagram illustrating one example of the transfer table TF6 stored in the sixth transfer apparatus GW6 in FIG. 1.

Herein, the application AP1 of the second server SVR2 executes the processing of Step S1 in FIG. 15 and transmits the transfer request notification M to the sixth transfer apparatus GW6. After the aforementioned transmission, Step S101 in FIG. 16 is executed.

Step S101: The reception unit 125 of the sixth transfer apparatus GW6 receives the transfer request notification M transmitted by the application AP1 and outputs the transfer request notification M to the table administration unit 122 and the transfer destination determination unit 124.

Step S102: The transfer destination determination unit 124 of the sixth transfer apparatus GW6 searches the connection table TC6 and obtains the IP address of the apparatus that transfers the transfer request notification M.

Step S103: The transfer destination determination unit 124 of the sixth transfer apparatus GW6 determines whether to obtain the IP address of the apparatus that transfers the transfer request notification M. When the transfer destination determination unit 124 obtains the aforementioned IP address (Step S103, YES), the processing proceeds to Step S104. In the example of FIG. 1, the connection table TC6 stores the IP address "10. 10. 10. 4" of the fourth transfer apparatus GW4. Accordingly, the transfer destination determination unit 124 of the sixth transfer apparatus GW6 can obtain the IP address of the apparatus that transfers the transfer request notification M, so that the processing proceeds to the Step S104.

Step S104: The table administration unit 122 of the sixth transfer apparatus GW6 extracts the discrimination parameter and the IP address of the transmission source from the transfer request notification M. In the example of FIG. 14, the table administration unit 122 of the sixth transfer apparatus GW6 extracts the type "electric power" and the user "A company" as the discrimination parameter from the payload PY2 of the transfer request notification M. Furthermore, the table administration unit 122 of the sixth transfer apparatus GW6 extracts the IP address "192. 1. 2. 15", which the IP address H22 of the transmission source of the transfer request notification M.

Step S105: The table administration unit 122 of the sixth transfer apparatus GW6 stores the discrimination parameters and the IP address H22 of the transmission source extracted, in the transfer table TF6 of its own apparatus. Specifically, the table administration unit 122 of the sixth transfer apparatus GW6 generates a new line (also referred to as addition of entry) in the transfer table TF6 and stores the discrimination parameters and the IP address of the transmission source extracted respectively in the discrimination parameter column and the IP address column of the following transfer destination in the new line generated.

In the example of FIG. 17, the table administration unit 122 of the sixth transfer apparatus GW6 stores the type "electric power" in the type column and the user "A company" in the user column of the transfer table TF6. Then, the table administration unit 122 of the sixth transfer apparatus GW6 stores the IP address "192. 1. 2. 15" in the IP address column of the following transfer destination.

Step S106: The transmission unit 126 of the sixth transfer apparatus GW6 transfers the transfer request notification M to the transfer apparatus in which the IP address obtained by the transfer destination determination unit 124 at the Step S102 is set. In the example of FIG. 1, the transfer apparatus, which is the transfer destination of the transfer request notification M, is the fourth transfer apparatus GW4. Prior to this transfer, the transmission unit 126 of the sixth transfer apparatus GW6 provides the IP address H22 of the transmission source of the transfer request notification M with the IP address "10. 10. 10. 6" of its own apparatus and further provides the IP address H21 of the transmission destination with the IP address "10. 10. 10. 4" of the fourth transfer apparatus GW4.

At the Step S102, when the transfer destination determination unit 124 of the sixth transfer apparatus GW6 fails to obtain the IP address of the apparatus that transfers the transfer request notification M for some reason (Step S103, NO), the processing proceeds to Step S107. For example, when the sixth transfer apparatus GW6 connects to only the second server SVR2 and the control apparatus GWC of the transfer apparatuses, there is a possibility that the IP address is not stored in the connection table TC6. In this case, the transfer destination determination unit 124 of the sixth transfer apparatus GW6 fails to obtain the IP address of the apparatus that transfers the transfer request notification M, the processing proceeds to the Step S107.

Step S107: The transmission unit 126 of the sixth transfer apparatus GW6 transmits the communication packet request notification to the control apparatus GWC of the transfer apparatuses. The Step S107 is described later.

In FIG. 17, it is noted that "humidity" in the type column, "B company" in the user column, and the IP address "192. 1. 2. 15" in the IP address column of the following transfer destination are stored in an anther line, but not related to the transfer processing described in the embodiment of the present invention, and the content of these descriptions is omitted.

As is described at the Step S106, the transmission units 126 of the first transfer apparatus GW1 to the sixth transfer apparatus GW6 change the transfer destination of the communication packet included in the transfer request notification M to its own apparatus and transfers the transfer request notification M after the change to other transfer apparatuses. Specifically, the transmission units 126 of the first transfer apparatus GW1 to the sixth transfer apparatus GW6 change the IP address H22 of the transmission source, which indicates the transfer source of the communication packet P included in the transfer request notification M, to the IP address of its own apparatus. Then, the transmission units 126 of the first transfer apparatus GW1 to the sixth transfer apparatus GW6 transfer the transfer request notification M after the change to the aforementioned other transfer apparatuses in which the IP address stored in the connection table TC of its own apparatus is set.

(Fourth Transfer Apparatus GW4)

Figure 18:
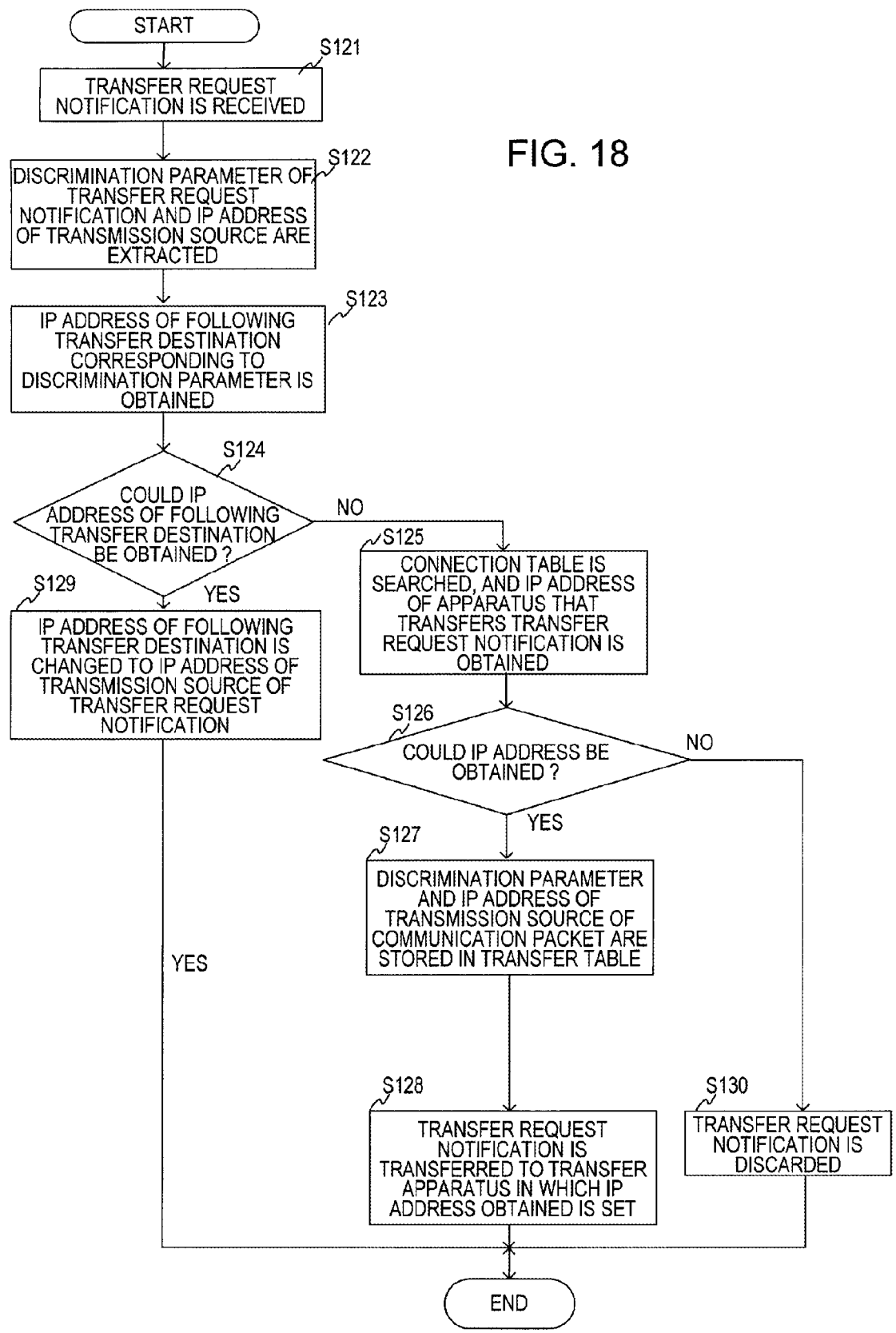
FIG. 18 is a flowchart illustrating one example to describe the flow of the processing of the transfer apparatus in the uppermost stream and the transfer apparatus in the midstream.
Figure 19:
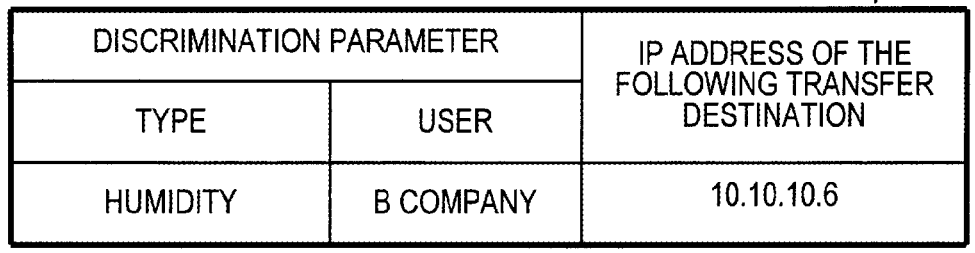
FIG. 19 is a diagram illustrating one example of the transfer table TF4 stored in the fourth transfer apparatus GW4 in FIG. 1.
Figure 20:
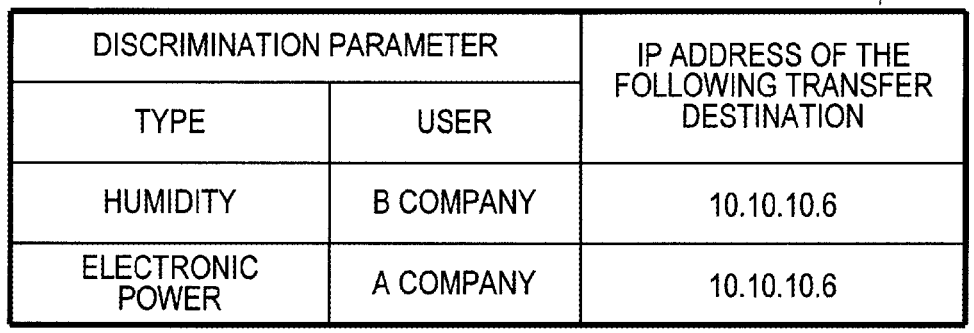
FIG. 20 is a diagram illustrating one example of a state where the transfer table TF4 in FIG. 19 is changed.

The flow of the processing of the fourth transfer apparatus GW4 will be described referring to FIGS. 14, 18, 19, and 20. FIG. 18 is a flowchart illustrating one example to describe the flow of the processing of the fourth transfer apparatus GW4 and the first transfer apparatus GW1 in FIG. 1. In other words, FIG. 18 is a flowchart illustrating one example to describe the flow of the processing of the transfer apparatus in the upper-most stream and the transfer apparatus in the midstream. FIG. 19 is a diagram illustrating one example of the transfer table TF4 stored in the fourth transfer apparatus GW4 in FIG. 1. FIG. 20 is a diagram illustrating one example of a state where the transfer table TF4 in FIG. 19 is changed.

Herein, the sixth transfer apparatus GW6 executes the processing at the Step S106 in FIG. 16 and transfers the transfer request notification M to the fourth transfer apparatus GW4. After the transmission, Step S121 in FIG. 18 is executed.

Step S121: The reception unit 125 of the fourth transfer apparatus GW4 receives the transfer request notification M transferred from the sixth transfer apparatus GW6, which corresponds to the other transfer apparatus, and outputs the transfer request notification M to the table administration unit 122 and the transfer destination determination unit 124.

Step S122: The table administration unit 122 of the fourth transfer apparatus GW4 extracts the discrimination parameter and the IP address of the transmission source from the transfer request notification M. In the example of FIG. 14, the table administration unit 122 of the fourth transfer apparatus GW4 extracts the type "electric power" and the user "A company" as the discrimination parameter from the payload PY2 of the transfer request notification M. Furthermore, the table administration unit 122 of the fourth transfer apparatus GW4 extracts the IP address "10. 10. 10. 6". The IP address "10. 10. 10. 6" is the IP address H22 of the transmission source of the transfer request notification M.

Step S123: The transfer destination determination unit 124 of the fourth transfer apparatus GW4 searches the transfer table TF4 based on the discrimination parameter extracted at the Step S122 as a key and obtains the IP address of the following transfer destination corresponding to the discrimination parameter.

Step S124: The transfer destination determination unit 124 of the fourth transfer apparatus GW4 determines whether the IP address of the following transfer destination has been obtained. That is, the transfer destination determination unit 124 determines whether the discrimination parameter included in the transfer request notification M corresponds to the discrimination parameter stored in the transfer table TF4 of its own apparatus. When the IP address fails to be obtained (Step S124, NO), the processing proceeds to Step S125. When the IP address is successfully obtained (Step S124, YES), the processing proceeds to Step S129.

In the example of FIGS. 14 and 19, the transfer table TF4 stores a type "humidity" and a user "B company" as the discrimination parameter and the IP address "10. 10. 10. 6" of the following transfer destination corresponding to the discrimination parameter. Accordingly, the transfer destination determination unit 124 fails to obtain the IP address of the following transfer destination corresponding to the discrimination parameter (the type "electric power" and the user "A company") extracted at the Step S122. For this reason the processing proceeds to the Step S125.

Step S125: The transfer destination determination unit 124 of the fourth transfer apparatus GW4 searches the connection table TC4 and obtains the IP address of the apparatus that transfers the transfer request notification M.

Step S126: The transfer destination determination unit 124 of the fourth transfer apparatus GW4 determines whether the IP address of the apparatus that transfers the transfer request notification M has been obtained. When the IP address of the apparatus that transfers the transfer request notification M has been obtained (Step S126, YES), the transfer destination determination unit 124 allows the processing to proceed to Step S127.

In the example of FIG. 1, the connection table TC4 stores the IP address "10. 10. 10. 1" of the first transfer apparatus GW1 and the IP address "10. 10. 10. 2" of the second transfer apparatus GW2. Accordingly, the processing proceeds to Step S127.

Step S127: The table administration unit 122 of the fourth transfer apparatus GW4 correlates the discrimination parameter with the IP address of the transmission source, which are extracted at the Step S122, and stores the discrimination parameter and the IP address of the transmission source in the transfer table TF4. The processing at the Step S127 is similar to the processing described at the Step S105.

At the Step S122, as one example, the type "electric power" and the user "A company" are extracted as the discrimination parameter, and the IP address "10. 10. 10. 6" of the sixth transfer apparatus GW6 is extracted as the IP address of the transmission source.

In the example of FIG. 20, the table administration unit 122 of the fourth transfer apparatus GW4 generates a new line as illustrated by the transfer table TF4a and stores the type "electric power" in the type column and the user "A company" in the user column, disposed in the discrimination parameter column in the new line generated. Then, the table administration unit 122 of the fourth transfer apparatus GW4 stores the IP address "10. 10. 10. 6" of the sixth transfer apparatus GW6 in the IP address column of the following transfer destination in the new line generated. This storage processing allows the transfer table TF4 in FIG. 19 to be changed as illustrated in the transfer table TF4a in FIG. 20.

Step S128: The transmission unit 126 of the fourth transfer apparatus GW4 transfers the transfer request notification M to the transfer apparatus in which the IP address obtained by the transfer destination determination unit 124 at the Step S125 is set. In the example of FIG. 1, the IP addresses obtained by the transfer destination determination unit 124 at the Step S125 are "10. 10. 10. 1" and "10. 10. 10. 2".

Prior to this transfer, the transmission unit 126 of the fourth transfer apparatus GW4 provides the IP address H22 of the transmission source of the transfer request notification M with the IP address "10. 10. 10. 4" of its own apparatus and further provides the IP address H21 of the transmission destination with the IP address "10. 10. 10. 1" of the aforementioned apparatus of the transfer destination. Then, the transmission unit 126 transmits the transfer request notification M after the change to the first transfer apparatus GW1. Similarly, prior to this transfer, the transmission unit 126 of the fourth transfer apparatus GW4 provides the IP address H22 of the transmission source of the transfer request notification M with the IP address "10. 10. 10. 4" of its own apparatus and further provides the IP address H21 of the transmission destination with the IP address "10. 10. 10. 2" of the aforementioned apparatus of the transfer destination. Then, the transfer destination determination unit 124 transmits the transfer request notification M after the change to the second transfer apparatus GW2.

At the Step S124, when the transfer destination determination unit 124 of the fourth transfer apparatus GW4 obtains the IP address of the following transfer destination (Step S124, YES), the processing proceeds to Step S129.

Step S129: The table administration unit 122 of the fourth transfer apparatus GW4 changes the IP address of the following transfer destination, which is obtained by the transfer destination determination unit 124 at the Step S123, to the IP address H22 of the transmission source of the transfer request notification M in the transfer table TF4.

At the Step S126, when the IP address fails to be obtained (Step S126, NO), that is, when there is no apparatus to which the transfer request notification M is transferred, the entire administration unit 121 discards the transfer request notification M received (Step S130).

(First Transfer Apparatus GW1)

Figure 21:
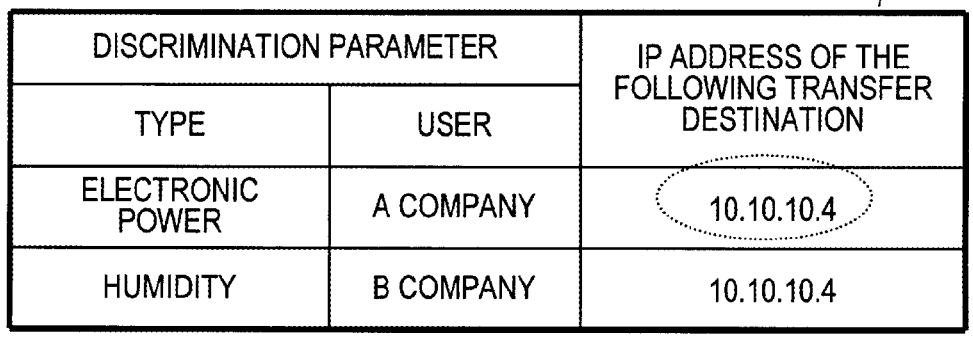
FIG. 21 is a diagram illustrating one example of a state where the transfer table TF1 in FIG. 3 is changed.

The flow of the processing of the first transfer apparatus GW1 will be described referring to FIGS. 3, 14, 18, and 21. FIG. 21 is a diagram illustrating one example of a state where the transfer table TF1 in FIG. 3 is changed.

Herein, the fourth transfer apparatus GW4 executes the processing at the Step S128 in FIG. 18 and transfers the transfer request notification M to the first transfer apparatus GW1.

The reception unit 125 of the first transfer apparatus GW1 receives the transfer request notification M transferred from the fourth transfer apparatus GW4, which corresponds to the other transfer apparatus, and outputs the transfer request notification M to the table administration unit 122 and the transfer destination determination unit 124 (Step S121).

The table administration unit 122 of the first transfer apparatus GW1 extracts the discrimination parameter and the IP address of the transmission source from the transfer request notification M (Step S122). In the example of FIG. 14, the table administration unit 122 of the first transfer apparatus GW1 extracts the type "electric power" and the user "A company" as the discrimination parameter from the payload PY2 of the transfer request notification M. Furthermore, the table administration unit 122 of the first transfer apparatus GW1 extracts the IP address "10. 10. 10. 4", which the IP address H22 of the transmission source of the transfer request notification M.

The transfer destination determination unit 124 of the first transfer apparatus GW1 searches the transfer table TF1 based on the discrimination parameter extracted at the Step S122 as a key and obtains the IP address of the following transfer destination corresponding to the discrimination parameter (Step S123).

In the example of FIG. 3, the transfer table TF1 stores the type "electric power" and the user "A company" as the discrimination parameter and the IP address "10. 10. 10. 3" of the following transfer destination corresponding to the discrimination parameter.

Accordingly, the transfer destination determination unit 124 can obtain the IP address "10. 10. 10. 3" of the following transfer destination corresponding to the discrimination parameter (the type "electric power" and the user "A company") extracted at the Step S122 (Step S124, YES).

The table administration unit 122 of the first transfer apparatus GW1 changes the IP address of the following transfer destination, which is obtained by the transfer destination determination unit 124 at the Step S123, to the IP address H22 of the transmission source of the transfer request notification M in the transfer table TF1 (Step S129).

In the example of FIGS. 3 and 21, the table administration unit 122 of the first transfer apparatus GW1 changes the IP address "10. 10. 10. 3" of the following transfer destination corresponding to the type "electric power" and the user "A company", which are the discrimination parameter in the transfer table TF1 in FIG. 3, to the IP address "10. 10. 10. 4" of the transmission source of the transfer request notification M. This change is represented in a dotted circle in FIG. 21. Finally, the processing of the first transfer apparatus GW1 is completed.

(Second Transfer Apparatus GW2)

Next, the processing of the second transfer apparatus GW2 will be described. It is assumed that the transfer table TF2 of the second transfer apparatus GW2 stores "humidity" in the type column, "C company" in the user column, and the IP address "10. 10. 10. 4" in the IP address column of the following transfer destination. Also, the second transfer apparatus GW2 is the transfer apparatus in the uppermost stream, so that an IP address is not stored in the connection table TC2. Accordingly, when the second transfer apparatus GW2, which is the transfer apparatus in the uppermost stream, executes the processing in FIG. 18, "NO" is determined at the Step S124, and further, "NO" is determined at the Step S126, and the transfer request notification M received is discarded (Step S130).

(Transfer Processing After Path Change)

As is described above, the transfer apparatus changes the transfer table of its own based on the transfer request notification M transferred from other transfer apparatuses. In other words, the transmission and reception of the transfer request notification M are performed between the transfer apparatuses, whereby the transfer apparatus changes the transfer table of its own in cooperation with other transfer apparatuses, and the transfer path is changed. Accordingly, the transfer apparatus can change the transfer table of its own without the control of the control apparatus GWC of the transfer apparatuses.

Incidentally, the transfer path of the communication packet has been changed according to the aforementioned cooperation between the transfer apparatuses. As a result, the communication packet P (see FIG. 2) that the first sensor SN1 transmits to the first transfer apparatus GW1 is transferred to the sixth transfer apparatus GW6 via the first transfer apparatus GW1 and the fourth transfer apparatus GW4. Hereinafter, the transfer processing of the communication packet P based on transfer path change will be described. In the description below, the processing that the first transfer apparatus GW1 transfers the communication packet P to the fourth transfer apparatus GW4 corresponds to the Step S8 in FIG. 15, and the processing that the fourth transfer apparatus GW4 transfers the communication packet P to the sixth transfer apparatus GW6 corresponds to the Step S9.

As is described in FIG. 1, the first sensor SN1 transmits the communication packet P to the first transfer apparatus GW1. The reception unit 125 of the first transfer apparatus GW1 receives the communication packet P. The transfer destination determination unit 124 of the first transfer apparatus GW1 extracts a type and a user, which is the discrimination parameter, from the payload PY1 of the communication packet P. The transfer destination determination unit 124 of the first transfer apparatus GW1 searches the transfer table TF1a in FIG. 21 based on the type ("electric power" in the example of FIG. 2) and the user ("A company" in the example of FIG. 2) extracted as a search key and obtains "10. 10. 10. 4" as the IP address of the following transfer destination corresponding to the type and the user extracted. The IP address of the following transfer destination is the IP address set in the fourth transfer apparatus GW4.

The transmission unit 126 of the first transfer apparatus GW1 provides the IP address H12 of the transmission source of the communication packet P received with the IP address (10. 10. 10. 1) of its own apparatus and further provides the IP address H11 of the transmission destination of the communication packet P received with the IP address (10. 10. 10. 4) obtained. Then, the transmission unit 126 of the first transfer apparatus GW1 transfers the communication packet P, in which the IP addresses are replaced, to the fourth transfer apparatus GW4.

The reception unit 125 of the fourth transfer apparatus GW4 receives the communication packet P. The transfer destination determination unit 124 of the fourth transfer apparatus GW4 extracts the type and the user, which are the discrimination parameters, from the payload PY1 of the communication packet P. The transfer destination determination unit 124 of the fourth transfer apparatus GW4 searches the transfer table TF4a in FIG. 20 based on the type ("electric power" in the example of FIG. 2) and the user ("A company" in the example of FIG. 2) extracted as a search key and obtains "10. 10. 10. 6" as the IP address of the following transfer destination corresponding to the type and the user extracted. The IP address of the following transfer destination is the IP address set in the sixth transfer apparatus GW6.

The transmission unit 126 of the fourth transfer apparatus GW4 provides the IP address H12 of the transmission source of the communication packet P received with the IP address (10. 10. 10. 4) of its own apparatus and further provides the IP address H11 of the transmission destination of the communication packet P received with the IP address (10. 10. 10. 6) obtained. Then, the transmission unit 126 of the fourth transfer apparatus GW4 transfers the communication packet P, in which the IP addresses are replaced, to the sixth transfer apparatus GW6.

(Sixth Transfer Apparatus GW6)

Figure 22:
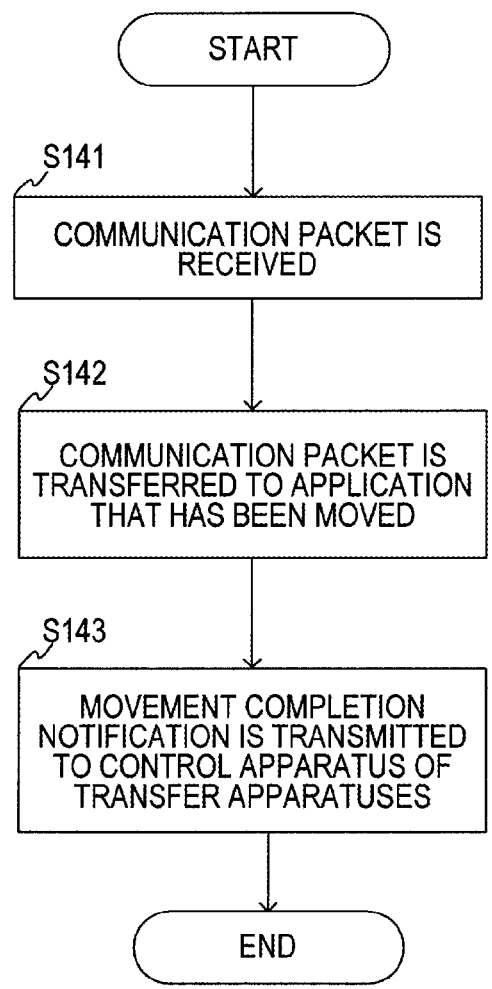
FIG. 22 is a flowchart illustrating one example to describe the flow of the processing in the case where the sixth transfer apparatus GW6 receives the communication packet.

The processing in a case where the sixth transfer apparatus GW6 receives the communication packet will be described referring to FIGS. 2, 14, 17, and 22. FIG. 22 is a flowchart illustrating one example to describe the flow of the processing in the case where the sixth transfer apparatus GW6 receives the communication packet. The processing in FIG. 22 corresponds to the processing at the Step S10 and the Step S11 in FIG. 15.

Step S141: The reception unit 125 of the sixth transfer apparatus GW6 receives the communication packet from the transfer apparatus on the upper stream. Specifically, the reception unit 125 of the sixth transfer apparatus GW6 receives the communication packet P transferred from the fourth transfer apparatus GW4.

Step S142: The transmission unit 126 of the sixth transfer apparatus GW6 transfers the communication packet P received to the application AP1 that has moved. Specifically, the transfer destination determination unit 124 of the sixth transfer apparatus GW6 extracts the type and the user, which are the discrimination parameters, from the payload PY1 of the communication packet P. The transfer destination determination unit 124 of the sixth transfer apparatus GW6 searches the transfer table TF6 in FIG. 17 based on the type ("electric power" in the example of FIG. 2) and the user ("A company" in the example of FIG. 2) extracted as a search key and obtains "192. 1. 2. 15" as the IP address of the following transfer destination corresponding to the type and the user extracted. The IP address of the following transfer destination is the IP address set in the second server SVR2.

The transmission unit 126 of the sixth transfer apparatus GW6 provides the IP address H12 of the transmission source of the communication packet P received with the IP address (10. 10. 10. 6) of its own apparatus and further provides the IP address H11 of the transmission destination of the communication packet P with the IP address (192. 1. 2. 15) obtained. Then, the transmission unit 126 of the sixth transfer apparatus GW6 transfers the communication packet P, in which the IP addresses are replaced, to the second server SVR2.

Step S143: The control apparatus communication unit 123 of the sixth transfer apparatus GW6 transmits the movement completion notification to the control apparatus GWC of the transfer apparatuses. For example, the movement completion notification has a structure similar to that of the transfer request notification M described in FIG. 14. The entire administration unit 121 of the sixth transfer apparatus GW6 generates the movement completion notification in which the IP address of the transmission source is the IP address "10. 10. 10. 6" set in the sixth transfer apparatus GW6, and the IP address of the transmission destination is the IP address "10. 10. 1. 1" set in the control apparatus GWC of the transfer apparatuses. Then, the entire administration unit 121 sets the payload of the movement completion notification as follows.

```
<msg>finish</msg>
<data>
    <user>A company</user>
    <type>electric power</type>
</data>
```

The payload of the movement completion notification is represented such that the identifier "req" caught between the tag <msg> and the tag </msg> in the data DT2 in FIG. 14 is replaced with an identifier "finish" that indicates the completion of movement. The control apparatus communication unit 123 transmits the movement completion notification to the control apparatus GWC of the transfer apparatuses.

(Control Apparatus GWC of Transfer Apparatuses)

The flow of the processing executed by the control apparatus GWC of the transfer apparatuses (see FIG. 12) that receives the movement completion notification will be described referring to FIGS. 11, 12, 23, and 24.

FIG. 23 is a flowchart illustrating one example to describe the flow of the processing executed by the control apparatus GWC of the transfer apparatuses that receives the movement completion notification. The processing in FIG. 23 corresponds to the processing at the Step S12 in FIG. 15. FIG. 24 is a diagram illustrating a state where the exit transfer apparatus administration table TO in FIG. 11 is changed.

Step S151: The movement completion notification receiving unit 225 of the control apparatus GWC of the transfer apparatuses receives the movement completion notification transmitted from the sixth transfer apparatus GW6.

Step S152: The table administration unit 222 extracts the discrimination parameter and the IP address of the transmission source from the movement completion notification. In the example of FIG. 22, the table administration unit 222 extracts the type "electric power" and the user "A company" as the discrimination parameter and extracts "10. 10. 10. 6" as the IP address of the transmission source.

Step S153: The table administration unit 222 changes the IP address set in the transfer apparatus at an exit in the exit transfer apparatus administration table TO in FIG. 11 to the IP address of the transmission source extracted. In the example of FIGS. 11 and 24, the table administration unit 222 changes the IP address "10. 10. 10. 5" (see FIG. 11), corresponding to the type "electric power" and the user "A company" which are the discrimination parameters, to the IP address "10. 10. 10. 6" of the transmission source. This change is represented in a dotted circle in FIG. 24.

According to the processing described above, the control apparatus GWC of the transfer apparatuses administrates the transfer path of the communication packet P that has been changed based on the cooperation between the transfer apparatuses.

The processing executed by the control apparatus GWC of the transfer apparatuses that receives the communication packet request notification will be described referring to FIGS. 9, 10, 14, and 16. As is described at the Steps S103 and S107 in FIG. 16, for example, when the sixth transfer apparatus GW6 connects to only the second server SVR2 and the control apparatus GWC of the transfer apparatuses, the transfer destination determination unit 124 of the sixth transfer apparatus GW6 fails to obtain the IP address of the apparatus that transfers the transfer request notification M. Accordingly, the processing proceeds to the Step S107 in FIG. 16. Then, at the Step S107, the transmission unit 126 of the sixth transfer apparatus GW6 transmits the communication packet request notification (also referred to as data transmission request notification) to the control apparatus GWC of the transfer apparatuses. The transmission of the communication packet request notification corresponds to the Step S13 in FIG. 15.

For example, the communication packet request notification has a structure similar to that of the transfer request notification M described in FIG. 14. The entire administration unit 121 generates the communication packet request notification in which the IP address of the transmission source is the IP address "10. 10. 10. 6" set in the sixth transfer apparatus GW6, and the IP address of the transmission destination is the IP address "10. 10. 1. 1" set in the control apparatus GWC of the transfer apparatuses.

Then, the entire administration unit 121 applies the data DT2 in FIG. 14, which is the payload of the transfer request notification M, to the payload of the communication packet request notification. In this time, the entire administration unit 121 replaces the identifier "req" caught between the tag <msg> and the tag </msg> in the data DT2 with an identifier "req_p" that indicates the request of the communication packet. The control apparatus communication unit 123 transmits the communication packet request notification to the control apparatus GWC of the transfer apparatuses.

The communication packet request notification receiving unit 226 of the control apparatus GWC of the transfer apparatuses receives the communication packet request notification. When the communication packet request notification receiving unit 226 receives the communication packet request notification, the transfer path determination unit 223 calculates the transfer path of the communication packet regarding the discrimination parameter included in the communication packet request notification. The calculation of the transfer path will be described.

First, the transfer path determination unit 223 extracts the discrimination parameter and the IP address of the transmission source from the communication packet request notification. Then, the transfer path determination unit 223 extracts the IP address corresponding to the discrimination parameter extracted from the entry transfer apparatus administration table TI in FIG. 10 in order to specify the transfer apparatus on the uppermost stream that transfers the communication packet P. The transfer path determination unit 223 extracts the type "electric power" and the user "A company" as the discrimination parameter, so that the IP address "10. 10. 10. 1" set in the first transfer apparatus GW1 is extracted from the entry transfer apparatus administration table TI in FIG. 10. Accordingly, the transfer path determination unit 223 specifies that the transfer apparatus on the uppermost stream that transfers the communication packet P is the first transfer apparatus GW1.

Subsequently, the transfer path determination unit 223 specifies that the transfer apparatus on the lowermost stream that transfers the communication packet P is the transfer apparatus in which the IP address of the transmission source extracted is set. In the aforementioned example, the transfer path determination unit 223 extracts the IP address "10. 10. 10. 6" set in the sixth transfer apparatus GW6 as the IP address of the transmission source. Accordingly, the transfer path determination unit 223 specifies that the transfer apparatus on the lowermost stream that transfers the communication packet P is the sixth transfer apparatus GW6.

Subsequently, the table administration unit 222 changes the IP address set in the transfer apparatus at an exit in the exit transfer apparatus administration table TO in FIG. 11 to the IP address of the transmission source extracted (see Step S153).

In the example of FIGS. 11 and 24, the table administration unit 222 changes the IP address "10. 10. 10. 5" (see FIG. 11) corresponding to the type "electric power" and the user "A company", which are the discrimination parameters, to the IP address "10. 10. 10. 6" of the transmission source.

Finally, the transfer path determination unit 223 calculates (also referred to as "determines") the shortest transfer path leading from the first transfer apparatus GW1 to the sixth transfer apparatus GW6 based on the cell in which the reference number "1" in the topology table TT in FIG. 9 is stored, with the first transfer apparatus GW1 as a starting point and the sixth transfer apparatus GW6 as an end point.

In the example of FIG. 9, "1" is stored in the cell where the column of the sixth transfer apparatus GW6 in the uppermost line and the column of the fourth transfer apparatus GW4 in the leftmost line are intersected, and "1" is stored in the cell where the column of the fourth transfer apparatus GW4 in the uppermost line and the column of the first transfer apparatus GW1 in the leftmost line are intersected. Accordingly, the transfer path determination unit 223 determines a path leading to the first transfer apparatus GW1, the fourth transfer apparatus GW4, and the sixth transfer apparatus GW6 as the shortest transfer path.

The transfer path determination unit 223 generates the transfer table inclusive of information regarding the shortest transfer path determined and transmits the transfer table generated to the first transfer apparatus GW1, the fourth transfer apparatus GW4, and the sixth transfer apparatus GW6. In the aforementioned example, the transfer path determination unit 223 generates the transfer table TF1a in FIG. 21 and transmits the transfer table TF1a to the first transfer apparatus GW1. The transfer path determination unit 223 generates the transfer table TF4a in FIG. 20 and transmits the transfer table TF4a to the fourth transfer apparatus GW4. The transfer path determination unit 223 generates the transfer table TF6 in FIG. 17 and transmits the transfer table TF6 to the sixth transfer apparatus GW6.

Summary of First Embodiment

The processing of the transfer apparatuses in the first embodiment will be summarized referring to FIGS. 3, 7, 14, 16, and 18.

The table administration unit 122 of the transfer apparatus GW correlates a first attribute regarding measurement data with a transfer destination of the communication packet inclusive of the first attribute and stores the first attribute and the transfer destination in the storage device 16. With regard to the aforementioned storage, the table administration unit 122 of the transfer apparatus GW stores the first attribute and the transfer destination of the communication packet inclusive of the first attribute as the transfer table described in FIG. 3. In the transfer table, for example, the attribute is stored in the discrimination parameter column, and the transfer destination of the communication packet inclusive of the attribute is stored in the IP address column of the following transfer destination. When the second attribute included in the transfer request notification M corresponds to the first attribute stored in the storage device 16 (see Step S124, in FIG. 18), the table administration unit 122 changes the transfer destination corresponding to the first attribute in the storage device 16 to the transfer destination included in the transfer request notification M (see Step S129, in FIG. 18). For example, the transfer destination included in the transfer request notification M is the IP address H22 of the transmission source.

When the second attribute included in the transfer request notification M does not correspond to the first attribute stored in the storage device 16, the table administration unit 122 correlates the second attribute with the transfer destination of the communication packet inclusive of the second attribute and stores the second attribute and the transfer destination in the storage device 16 (see Step S127, in FIG. 18).

Then, when the transmission unit 126 receives the communication packet inclusive of the second attribute, the transmission unit 126 transfers the communication packet received to the third apparatus of the transfer destination. The transfer destination and the second attribute which correlates with the transfer destination are stored in the storage device 16. With regards to this transfer, see the transfer processing after the aforementioned path change.

According to the embodiment of the present invention described above, the transmission and reception of the transfer request notification is performed between the transfer apparatuses, whereby the transfer apparatus changes the transfer table of its own in cooperation with other transfer apparatuses, without the control of the control apparatus GWC of the transfer apparatuses. As a result, this can reduce a delay in the start time of the transfer processing of the communication packet based on the transfer table after the change in the transfer apparatus disposed on the shortest transfer path, due to the increase of the processing load of the control apparatus of the transfer apparatuses. Also, the data of the payload of the transfer request notification that is transmitted and received to perform the aforementioned cooperation only includes the header portion and the discrimination parameter. Accordingly, an increase in the amount of communication data can be restrained, whereby the dearth of the network bandwidth can be restrained.

Second Embodiment

In the first embodiment, as is described in FIG. 1, the connection table TC4 of the fourth transfer apparatus GW4 stores the IP addresses of the first transfer apparatus GW1 and the second transfer apparatus GW2. However, for example, when the administrator of the fourth transfer apparatus GW4 erroneously deletes the IP address of the first transfer apparatus GW1 stored in the connection table TC4, it is assumed that the connection table TC4 stores only the IP address of the second transfer apparatus GW2.

Thus, when the connection table TC4 stores only the IP address of the second transfer apparatus GW2, the fourth transfer apparatus GW4 transmits the transfer request notification M, transmitted by the sixth transfer apparatus GW6, only to the second transfer apparatus GW2 (see Step S128 in FIG. 18). In other words, the fourth transfer apparatus GW4 does not transmit the transfer request notification M to the first transfer apparatus GW1. Accordingly, the first transfer apparatus GW1 fails to refer to the transfer request notification M and execute the change of the transfer table TF1 described in FIG. 21.

As a result, the communication packet P is continuously transferred to the first server SVR1 via the first transfer apparatus GW1, the third transfer apparatus GW3, and the fifth transfer apparatus GW5. However, the first server SVR1 has not been operated, so that the communication packet P is discarded. In this case, as is described in the first embodiment, the control apparatus GWC of the transfer apparatuses needs to change the transfer tables that first transfer apparatus GW1, the fourth transfer apparatus GW4, and the sixth transfer apparatus GW6 include, in such a manner that the communication packet P is transmitted to the second server SVR2.

In the second embodiment, the transfer apparatus will be described that generates a trigger that is used by the control apparatus GWC of the transfer apparatuses for the purpose of the calculation of the transfer path of the communication packet P. The transfer apparatus that generates the trigger is the sixth transfer apparatus GW6 in the lowermost stream, which directly connects to the second server SVR2 that executes the application AP1 of the transmission destination.

The control apparatus communication unit 123 of the sixth transfer apparatus GW6 has not received the communication packet inclusive of the second attribute included in the transfer request notification M within a predetermined period of time, in which the time of reception of the transfer request notification M is provided as a reference, the following processing is performed.

That is, the control apparatus communication unit 123 requests the control apparatus GWC of the transfer apparatuses in such a manner that corresponding information, in which the second attribute and the transfer destination of the communication packet are correlated with each other, is transmitted to the transfer apparatus disposed on the transfer path. The transfer destination corresponds to the apparatus, which is arranged on the transfer path of the communication packet inclusive of the second attribute. The control apparatus communication unit 123 transmits the communication packet request notification to the control apparatus GWC of the transfer apparatuses, which has been described in the first embodiment, thereby carrying out this request. The corresponding information, for example, is the transfer table that includes the information regarding the shortest transfer path, which is generated by the control apparatus GWC of the transfer apparatuses in response to the reception of the communication packet request notification, which has been described in the first embodiment.

Then, the transfer apparatus disposed on the shortest transfer path receives the corresponding information (for example, transfer table) and transfers the communication packet that includes the second attribute included in the corresponding information to the third apparatus of the transfer destination, which is correlated with the second attribute.

Figure 25:
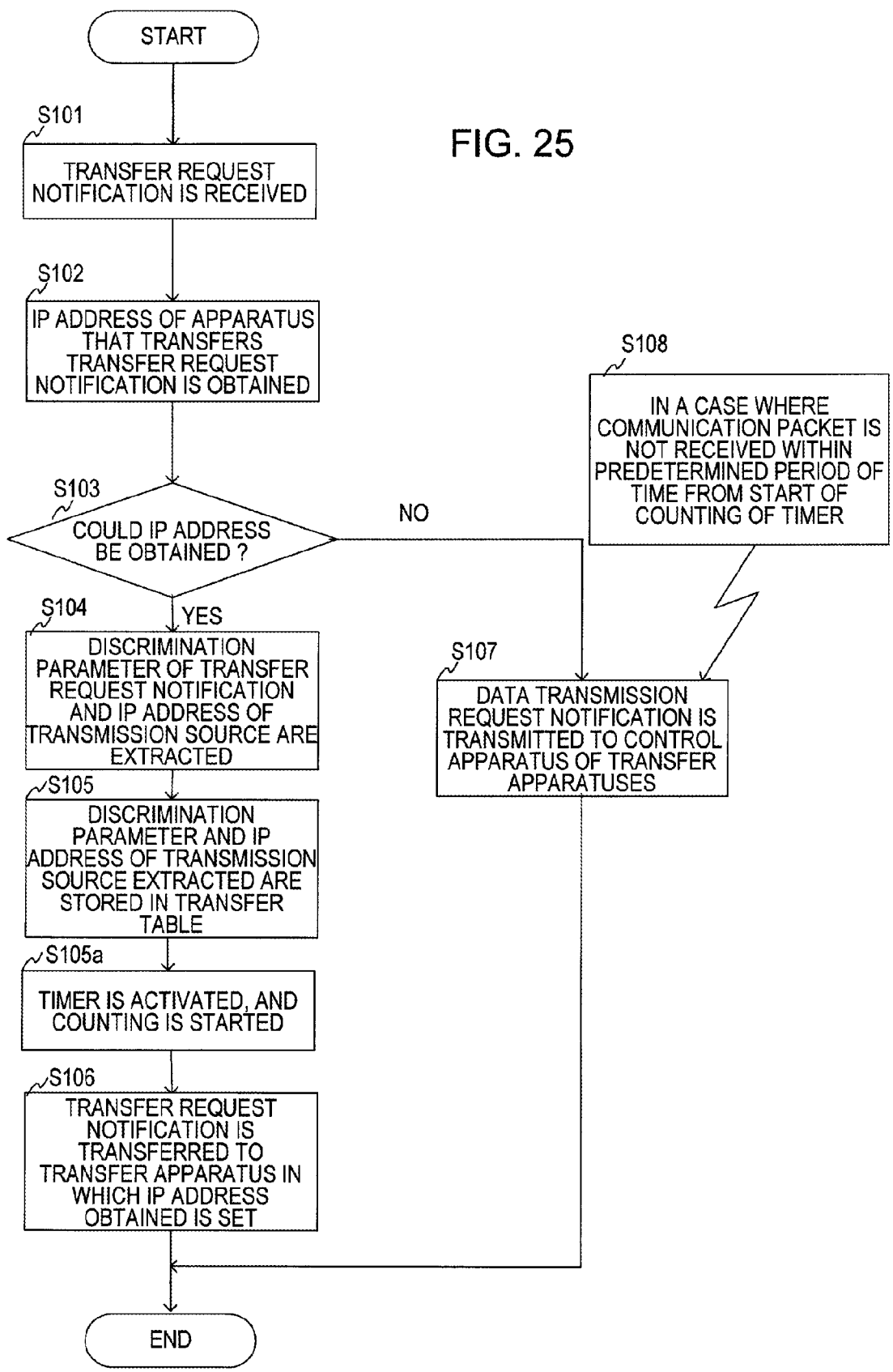
FIG. 25 is a flowchart illustrating another example to describe the flow of the processing executed by the sixth transfer apparatus GW6.

The processing executed by the sixth transfer apparatus GW6 in FIG. 1 will be described referring to FIGS. 25 and 26. FIG. 25 is a flowchart illustrating another example to describe the flow of the processing executed by the sixth transfer apparatus GW6. FIG. 26 is a flowchart illustrating one example of a timer administration table TM that the sixth transfer apparatus GW6 includes. The timer administration table TM in FIG. 26 includes a timer start time column, the discrimination parameter column, and the IP address column of the following transfer destination.

The flowchart in FIG. 25 includes Step S105*a* between the Step S105 and the Step S106 in FIG. 16 and further includes Step S108 prior to the Step S107. Accordingly, the descriptions of the Step S101 to Step S107 are omitted. When the processing at the Step S105 is completed, the processing proceeds to the Step S105*a*.

Regarding the processing at the Step S104, the table administration unit 122 of the sixth transfer apparatus GW6 extracts the type "electric power" and the user "A company", as the discrimination parameters, from the payload PY2 of the transfer request notification M. Furthermore, the table administration unit 122 of the sixth transfer apparatus GW6 extracts the IP address "192. 1. 2. 15" as the IP address H22 of the transmission source, from the transfer request notification M.

Step S105*a*: The entire administration unit 121 of the sixth transfer apparatus GW6 activates a timer and starts counting. Herein, the entire administration unit 121 of the sixth transfer apparatus GW6 executes the activation of the timer, for example, based on the time of reception of the transfer request notification M, as a reference.

Then, the entire administration unit 121 of the sixth transfer apparatus GW6 stores the activation time (for example, "13 hour, 12 minute, 45 second") of the timer activated, the discrimination parameters, and the IP address of the transmission source extracted, in the storage device 16 of its own apparatus. In the example of FIG. 26, in a timer administration table MM, the entire administration unit 121 stores the activation time "13 hour, 12 minute, 45 second" of the timer in the start time column and stores the type "electric power" and the user "A company" in the discrimination parameter column and the IP address "192. 1. 2. 15" in the IP address column of the following transfer destination. It is noted that the storage device 16 stores the timer administration table TM in FIG. 26 (not illustrated). Subsequently, the processing proceeds to the Step S106.

When the sixth transfer apparatus GW6 has not received the communication packet P during the predetermined period of time (for example, 10 seconds) from the start of the counting by means of the timer (Step S108), the control apparatus communication unit 123 transmits the communication packet request notification to the control apparatus GWC of the transfer apparatuses (Step S107). In other words, when the sixth transfer apparatus GW6 does not receive the communication packet P during the predetermined period of time, in which the time of reception of the transfer request notification M is provided as a reference, the control apparatus communication unit 123 transmits the communication packet request notification to the control apparatus GWC of the transfer apparatuses. Then, the entire administration unit 121 of the sixth transfer apparatus GW6 stops the timer activated. Further, the entire administration unit 121 of the sixth transfer apparatus GW6 deletes the entry from the timer administration table TM in FIG. 26. The deletion of the entry means the processing in which the entire administration unit 121 deletes the start of the counting of the timer activated and further deletes the discrimination parameter corresponding to the timer and the IP address column of the following transfer destination. In the example of FIG. 26, the entire administration unit 121 deletes "13 hour, 12 minute, 45 second", "electric power", "A company" and "192. 1. 2. 15".

As is described in the first embodiment, the control apparatus GWC of the transfer apparatuses, which has received the communication packet request notification from the sixth transfer apparatus GW6, generates the transfer table which is referred to in a case where the transfer apparatuses sequentially transfer the communication packet P through the shortest transfer path. Then, the control apparatus GWC of the transfer apparatuses transmits the transfer table generated, to the first transfer apparatus GW1, the fourth transfer apparatus GW4, and the sixth transfer apparatus GW6 on the aforementioned shortest transfer path.

As is described above, for some reason, even when the transfer table of its own apparatus fails to be changed in cooperation with other transfer apparatuses, the control apparatus of the transfer apparatuses can change the transfer table. As a result, the communication packet is transmitted to the application that has moved.

Figure 27:
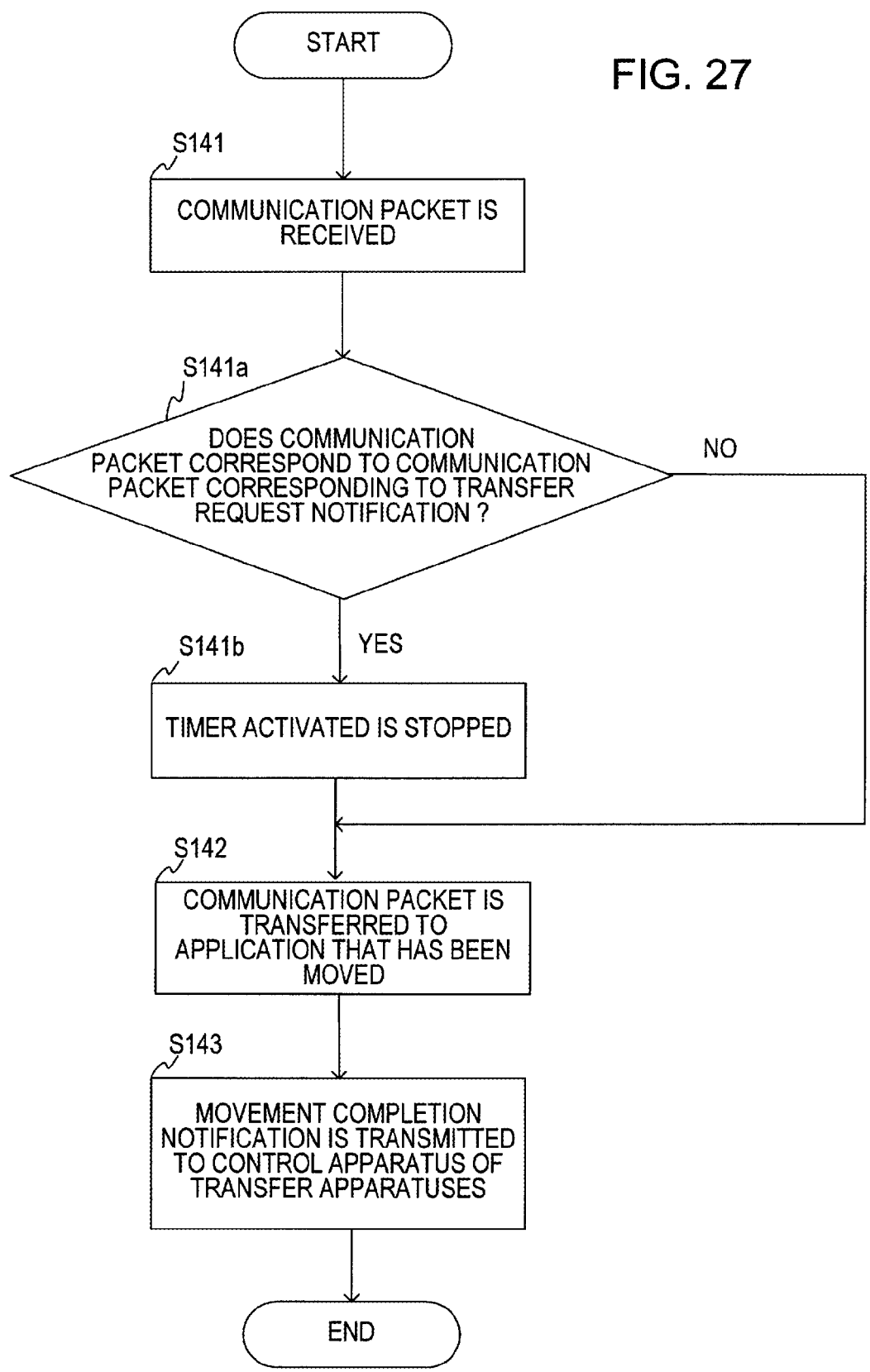
FIG. 27 is a flowchart illustrating one example to describe a case where the sixth transfer apparatus GW6 has received the communication packet P within a predetermined period of time after the activation of the timer at the Step S105a in FIG. 25.

FIG. 27 is a flowchart illustrating one example to describe a case where the sixth transfer apparatus GW6 has received the communication packet P within a predetermined period of time after the activation of the timer at the Step S105a in FIG. 25. The flowchart in FIG. 27 includes Step S141a and Step S141b between the Step S141 and the Step S142 in FIG. 22. Accordingly, the detailed description of the Steps S141 to S143 is omitted.

The reception unit 125 of the sixth transfer apparatus GW6 receives the communication packet P transferred from the fourth transfer apparatus GW4 (Step S141).

Step S141a: The entire administration unit 121 of the sixth transfer apparatus GW6 determines whether the communication packet P received is the communication packet corresponding to the transfer request notification M that is received from the application AP1 of the second server SVR2. When the communication packet P received is the communication packet corresponding to the transfer request notification M that is received from the application AP1 of the second server SVR2 (Step S141a, YES), the processing proceeds to the Step S141b.

Specifically, it is determined whether the discrimination parameter that corresponds to the discrimination parameter of the communication packet P is stored in the timer administration table TM in FIG. 26. In the example of FIGS. 14 and 26, the discrimination parameters of the communication packet P are the type "electric power" and the user "A company". Then, when the discrimination parameter that corresponds to the discrimination parameter of the communication packet P is stored in the timer administration table TM in FIG. 26 (Step S141a, YES), the processing proceeds to the Step S141b.

Step S141b: The entire administration unit 121 of the sixth transfer apparatus GW6 stops the timer activated. Then, the entire administration unit 121 of the sixth transfer apparatus GW6 executes the processing of deleting the aforementioned entry.

In contrast, when the discrimination parameter that corresponds to the discrimination parameter of the communication packet P is not stored in the timer administration table TM in FIG. 26 (Step S141a, NO), the processing proceeds to the Step S142.

Third Embodiment

In the first and second embodiments, a time lag occurs form a first time up to a second time. Herein, in the example of FIG. 1, the first time represents a time at which the application AP1 of the first server SVR1 has stopped activation. Then, as is described in FIG. 21, the second time represents a time at which the first transfer apparatus GW1 connected to the first sensor SN1 has completed the change of the transfer table TF1.

Even during the time lag, the first sensor SN1 transmits the communication packet P to the first transfer apparatus GW1. The communication packet is continuously transmitted to the first server SVR1 via the third transfer apparatus GW3 and the fifth transfer apparatus GW5. However, the first server SVR1 has not been operated, the communication packet is discarded.

Thus, when the communication packet is not transferred to the application AP1 of the second server SVR2 and discarded, the quality of the data processing executed by the application AP1 of the second server SVR2 deteriorates. For example, when the second server SVR2 displays and outputs the change in the measurement data of the communication packet in time series, the measurement data of the communication packet that has been discarded fails to be displayed and outputted in time series.

Accordingly, in the third embodiment, the transfer apparatus and the control apparatus GWC of the transfer apparatuses will be described wherein the number of communication packets discarded can be reduced as much as possible.

(Movement Start Notification of Application)

As is described in FIG. 1, when the application AP1 of the first server SVR1 moves to the second server SVR2, the operation of the application AP1 of the first server SVR1 is stopped. The application AP1 of the first server SVR1 transmits a movement start notification to the fifth transfer apparatus GW5 prior to the stoppage of the operation thereof. The movement start notification is one example of a second notification that includes a second attribute, which is transmitted from the first server SVR1 based on an opportunity for which the final transfer destination of the communication packet P is changed from the first server SVR1 to the second server SVR2.

The movement start notification includes the discrimination parameter that identifies the data processed by the application AP1. The movement start notification, for example, has a structure similar to that of the transfer request notification M described in FIG. 14.

The application AP1 generates the movement start notification in which the IP address of the transmission source is the IP address "192. 1. 1. 10" set in the first server SVR1, and the IP address of the transmission destination is the IP address "10. 10. 10. 5" set in the fifth transfer apparatus GW5. Then, the application AP1 sets the payload of the movement start notification as follows.

```
<msg>start</msg>
<data>
    <user>A company</user>
    <type>electric power</type>
</data>
```

The payload of the movement start notification is represented such that the identifier "req" caught between the tag <msg> and the tag </msg> in the data DT2 in FIG. 14 is replaced with an identifier "start" that indicates the start of movement.

(Fifth Transfer Apparatus GW5 that Receives Movement Start Notification)

The flow of the processing executed by the fifth transfer apparatus GW5 that has received the movement start notification will be described referring to FIGS. 5, 28, and 29.

Figures 28, 29:
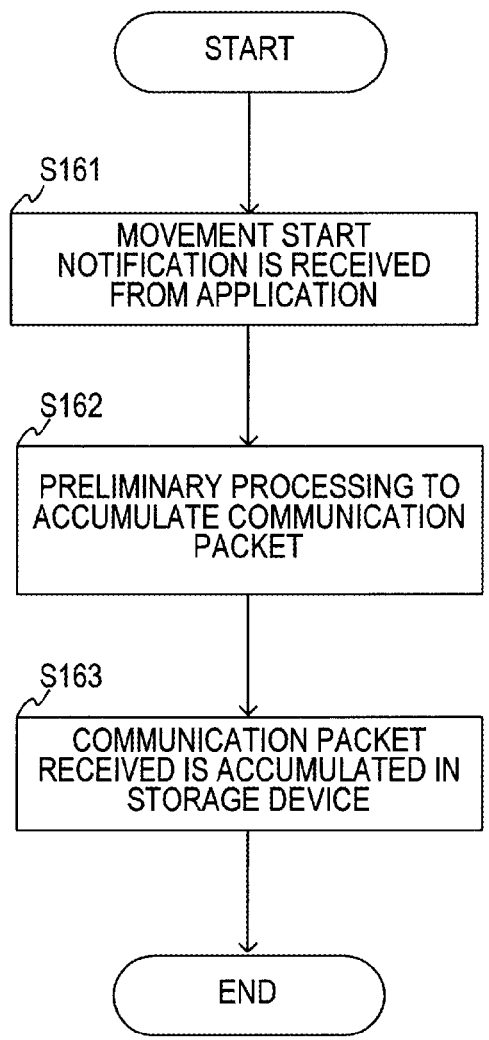
FIG. 28 is a flowchart illustrating one example to describe the flow of the processing executed by the fifth transfer apparatus GW5 that has received the movement start notification.
FIG. 29 is a diagram illustrating a state where the transfer table TF5 in FIG. 5 is changed.

FIG. 28 is a flowchart illustrating one example to describe the flow of the processing executed by the fifth transfer apparatus GW5 that has received the movement start notification. FIG. 29 is a diagram illustrating a state where the transfer table TF5 in FIG. 5 is changed.

Step S161: The reception unit 125 of the fifth transfer apparatus GW5 receives the movement start notification from the application AP1 executed by the first server SVR1. The application AP1 executed by the first server SVR1 stops the execution of the transmission after the movement start notification transmitted to the fifth transfer apparatus GW5.

Step S162: The table administration unit 122 of the fifth transfer apparatus GW5 executes the preliminary processing to accumulate the communication packet that includes the discrimination parameter of the movement start notification received. Specifically, with regards to the transfer table TF5 in FIG. 5, the table administration unit 122 of the fifth transfer apparatus GW5 changes the IP address of the following transfer destination, corresponding to the discrimination parameter of the movement start notification received, to character strings that indicates the start of the processing of accumulating the communication packet, for example, "localhost". In the aforementioned example, the discrimination parameter of the movement start notification is the type "electric power" and the user "A company". Accordingly, in the example of FIG. 5, the table administration unit 122 of the fifth transfer apparatus GW5 changes the IP address "192. 1. 1. 10" to "localhost" as described in FIG. 29.

Step S163: The entire administration unit 121 of the sixth transfer apparatus GW6 accumulates (also referred to as "store") the communication packets received by the reception unit 125 in the storage device 16.

Specifically, when the following requirements are satisfied, the entire administration unit 121 accumulates the communication packet received by the reception unit 125 in the storage device 16. The requirements are represented such that the discrimination parameter of the communication packet received by the reception unit 125 corresponds to the discrimination parameter stored in the discrimination parameter column of the transfer table TF5a in FIG. 29, and further, the IP address of the following transfer destination corresponding to the corresponded discrimination parameter is "localhost".

In the aforementioned example, the communication packet P is transferred to the fifth transfer apparatus GW5 via the first transfer apparatus GW1 and the third transfer apparatus GW3, and the reception unit 125 of the fifth transfer apparatus GW5 receives the communication packet P. Then, the discrimination parameter of the communication packet P corresponds to the discrimination parameter stored in the discrimination parameter column of the transfer table TF5a in FIG. 29, and further, the IP address of the following transfer destination corresponding to the corresponded discrimination parameter is "localhost". Accordingly, the entire administration unit 121 accumulates the communication packet P received by the reception unit 125 in the storage device 16.

(Control Apparatus GWC of Transfer Apparatuses)

The processing of changing the transfer paths (see Steps S1 to S6 in FIG. 15) described in the first embodiment is completed along with the processing described in FIG. 28. Then, the communication packet P transmitted by the first sensor SN1 is transferred to the sixth transfer apparatus GW6 via the first transfer apparatus GW1 and the fourth transfer apparatus GW4. The reception unit 125 of the sixth transfer apparatus GW6 receives the communication packet P transferred from the fourth transfer apparatus GW4. Then, the control apparatus communication unit 123 of the sixth transfer apparatus GW6 transmits the movement completion notification to the control apparatus GWC of the transfer apparatuses (Step S143 in FIG. 22).

In the present embodiments, the processing executed by the control apparatus GWC of the transfer apparatuses that receives the movement completion notification will be described referring to FIGS. 11, 14, 24, 30, and 31.

Figure 30:
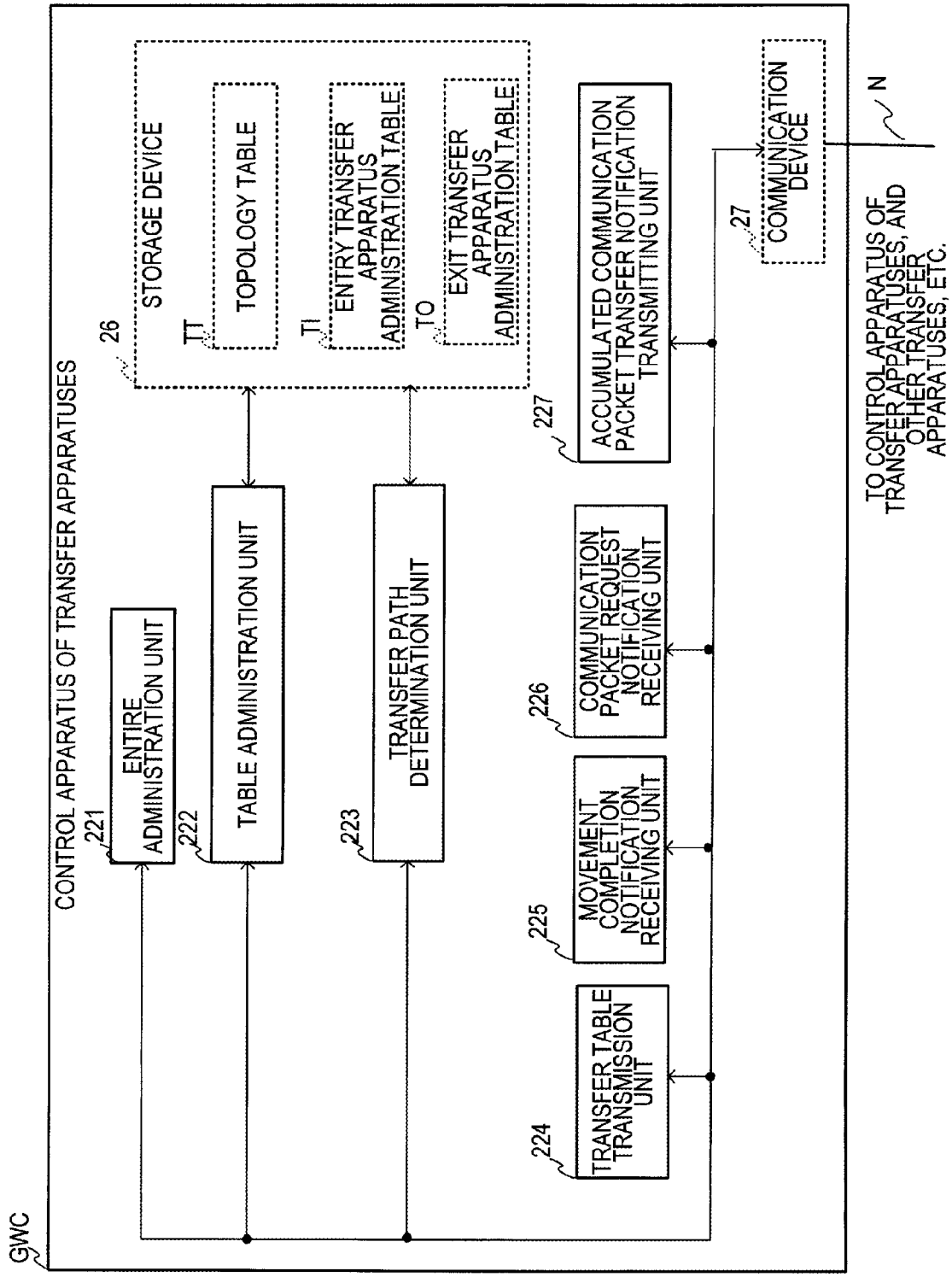
FIG. 30 is a block diagram illustrating another example of the constitution of the software module of the control apparatus of the transfer apparatuses.

FIG. 30 is a block diagram illustrating another example of the constitution of the software module of the control apparatus of the transfer apparatuses. FIG. 30 includes an accumulated communication packet transfer notification transmitting unit 227 in addition to the constitution of FIG. 12. The accumulated communication packet transfer notification transmitting unit 227 transmits an accumulated communication packet transfer notification, which indicates to the effect that the accumulated communication packet P is transferred, to the transfer apparatus that accumulates the communication packet P in response to the reception of the movement completion notification. The accumulated communication packet transfer notification is one example of a third notification that includes the transfer destination of the communication packet accumulated by the fifth transfer apparatus GW5.

Figure 31:
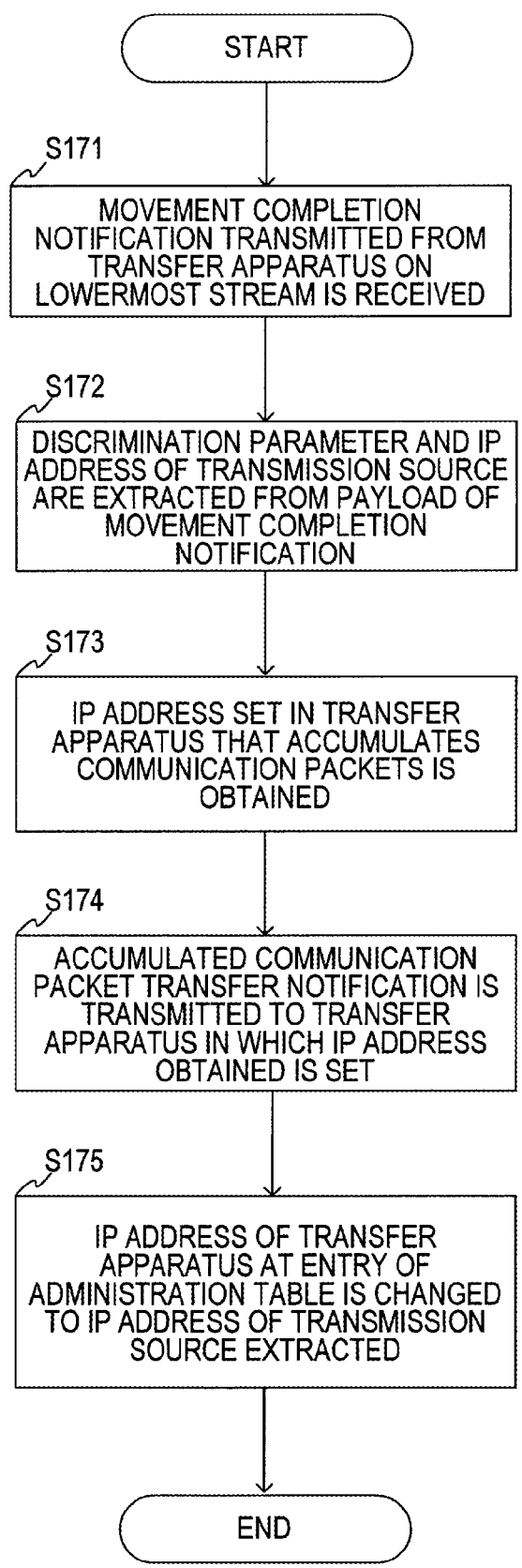
FIG. 31 is a flowchart illustrating another example to describe the flow of the processing executed by the control apparatus GWC of the transfer apparatuses, which receives the movement completion notification.

FIG. 31 is a flowchart illustrating another example to describe the flow of the processing executed by the control apparatus GWC of the transfer apparatuses, which receives the movement completion notification.

Step S171: The movement completion notification receiving unit 225 receives the movement completion notification transmitted from the sixth transfer apparatus GW6, which is the transfer apparatus on the lowermost stream.

Step S172: The table administration unit 222 extracts the discrimination parameter and the IP address of the transmission source from the movement completion notification. In the example of the first embodiment, the table administration unit 222 extracts the type "electric power" and the user "A company", as the discrimination parameter and extracts the IP address "10. 10. 10. 6" as the IP address of the transmission source.

Step S173: The table administration unit 222 searches the exit transfer apparatus administration table TO in FIG. 11 and obtains the IP address set in the transfer apparatus that accumulates the communication packet P. Herein, the transfer apparatus that accumulates the communication packet P is the fifth transfer apparatus GW5. Specifically, the table administration unit 222 searches the IP address corresponding to the discrimination parameter extracted, from the exit transfer apparatus administration table TO in FIG. 11 and obtains the IP address searched. In the example of FIG. 11, the table administration unit 222 obtains the IP address "10. 10. 10. 5" corresponding to the type "electric power" and the user "A company", as the discrimination parameter.

Step S174: The accumulated communication packet transfer notification transmitting unit 227 transmits the accumulated communication packet transfer notification to the transfer apparatus in which the IP address obtained is set. The accumulated communication packet transfer notification, for example, has a structure similar to that of the transfer request notification M described in FIG. 14. The entire administration unit 221 generates the accumulated communication packet transfer notification in which the IP address of the transmission source is the IP address "10. 10. 1. 1" set in the control apparatus GWC of the transfer apparatuses and the IP address of the transmission destination is the IP address "10. 10. 10. 5" extracted at the Step S173. Then, the entire administration unit 221 sets the payload of the accumulated communication packet transfer notification as follows.

```
<msg>send</msg>
<addr>10. 10. 10. 6</addr>
<data>
    <user>A company</user>
    <type>electric power</type>
</data>
```

The payload of the accumulated communication packet transfer notification is represented such that the identifier "req" caught between the tag <msg> and the tag </msg> in the data DT2 in FIG. 14 is replaced with an identifier "send" that indicates the execution of the transfer of the accumulated communication packet. Furthermore, the payload includes the IP address "10. 10. 10. 6", which is set in the transfer apparatus of the transfer destination (sixth transfer apparatus GW6) for the accumulated communication packet and disposed between the tag <addr> and the tag </addr>.

Step S175: The table administration unit 222 changes the IP address, set in the transfer apparatus at the exit of the exit transfer apparatus administration table TO in FIG. 11, to the IP address included in the payload ("10. 10. 10. 6") (see FIG. 24). The Step S175 is similar to the Step S153 in FIG. 23, and accordingly, its description is omitted.

(Fifth Transfer Apparatus GW5)

The reception unit 125 of the fifth transfer apparatus GW5 receives the accumulated communication packet transfer notification transmitted from the control apparatus GWC of the transfer apparatuses. Then, the transmission unit 126 of the fifth transfer apparatus GW5 transmits the communication packet accumulated in the storage device 16 of its own apparatus to the apparatus of the transfer destination included in the accumulated communication packet transfer notification. The apparatus of the transfer destination is an apparatus identified by an IP address disposed between the tag <addr> and the tag </addr> included in the payload of the accumulated communication packet transfer notification.

Figure 32:
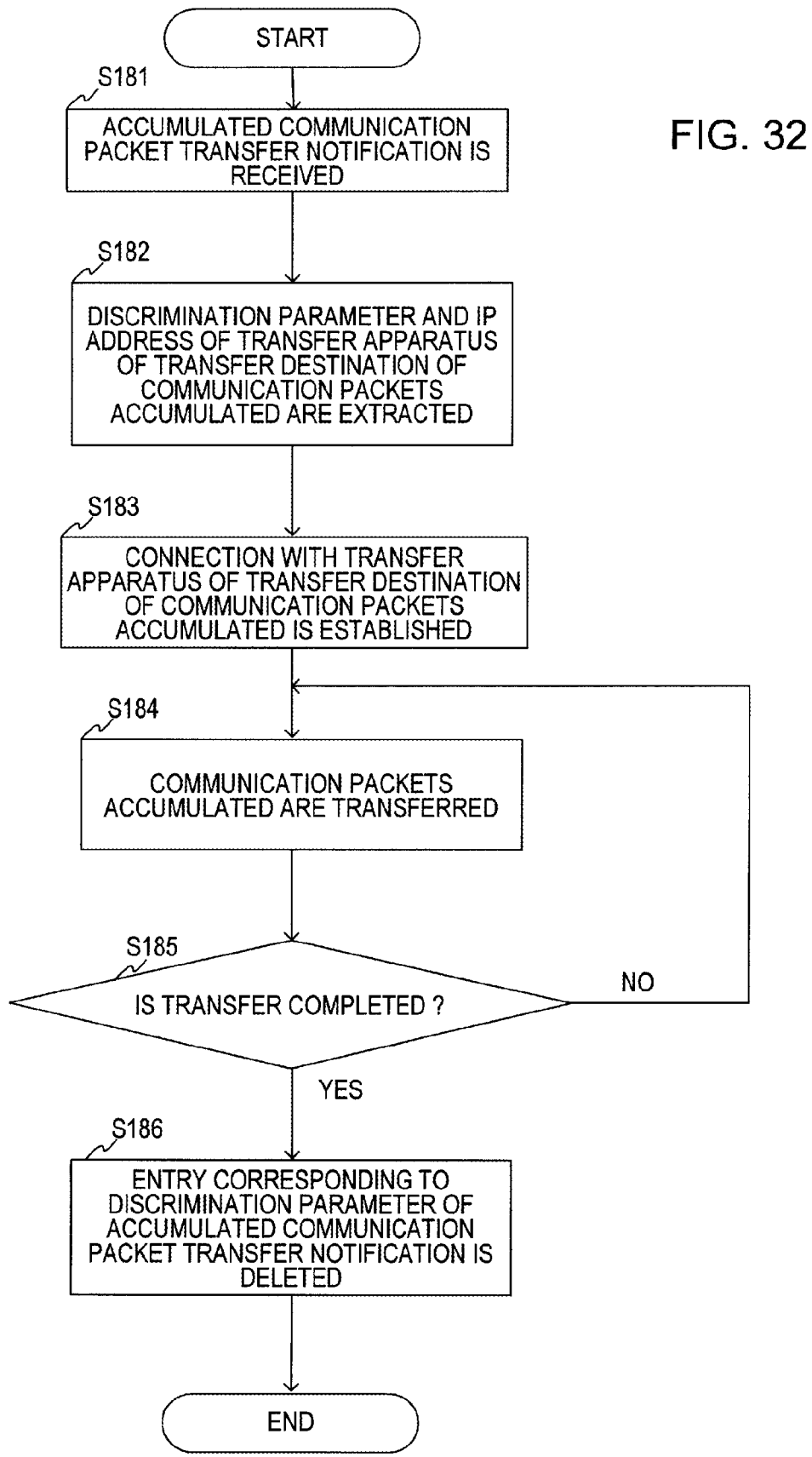
FIG. 32 is a flowchart illustrating one example to describe the flow of the processing executed by the fifth transfer apparatus GW5 that has received the accumulated communication packet transfer notification.

The flow of the processing executed by the fifth transfer apparatus GW5 that has received the accumulated communication packet transfer notification will be described referring to FIGS. 29 and 32. FIG. 32 is a flowchart illustrating one example to describe the flow of the processing executed by the fifth transfer apparatus GW5 that has received the accumulated communication packet transfer notification.

Step S181: The reception unit 125 of the fifth transfer apparatus GW5 receives the accumulated communication packet transfer notification transmitted from the control apparatus GWC of the transfer apparatuses.

Step S182: The table administration unit 122 of the fifth transfer apparatus GW5 extracts the discrimination parameter and the IP address set in the transfer apparatus of the transfer destination of the communication packet accumulated, from the accumulated communication packet transfer notification. In the aforementioned example, the table administration unit 122 extracts the type "electric power" and the user "A company", as the discrimination parameter of the accumulated communication packet transfer notification. Then, the table administration unit 122 extracts the IP address "10. 10. 10. 6" set in the transfer apparatus of the transfer destination of the communication packet accumulated.

Step S183: The entire administration unit 121 of the fifth transfer apparatus GW5 constructs the connection with the transfer apparatus of the transfer destination of the communication packet accumulated. In the aforementioned example, the transfer apparatus of the transfer destination of the communication packet accumulated is the sixth transfer apparatus GW6 in which the IP address "10. 10. 10. 6" is set. Accordingly, the entire administration unit 121 of the fifth transfer apparatus GW5, for example, constructs TCP connection with the entire administration unit 121 of the sixth transfer apparatus GW6.

Step S184: The transmission unit 126 of the fifth transfer apparatus GW5 transfers the accumulated communication packet to the transfer apparatus that constructs the connection. In the aforementioned example, the transmission unit 126 of the fifth transfer apparatus GW5 transfers the communication packet, accumulated in the storage device 16 of its own apparatus, to the sixth transfer apparatus GW6.

At this time, the transmission unit 126 of the fifth transfer apparatus GW5 obtains all the communication packets inclusive of the discrimination parameter that corresponds to the discrimination parameter extracted at the Step S182, from the storage device 16 of its own apparatus and transfers the communication packets to the sixth transfer apparatus GW6.

Step S185: The transmission unit 126 of the fifth transfer apparatus GW5 determines whether the transfer processing of the Step S184 is completed. Until the transmission unit 126 of the fifth transfer apparatus GW5 determines that the transfer processing of the Step S184 is completed (Step S185, NO), the processing of the Step S184 is continuously performed. When the transmission unit 126 of the fifth transfer apparatus GW5 determines that the transfer processing of the Step S184 is completed (Step S185, YES), the processing proceeds to the Step S186.

Step S186: The table administration unit 122 of the fifth transfer apparatus GW5 deletes the entry corresponding to the discrimination parameter of the accumulated communication packet transfer notification, from the transfer table TF5 in FIG. 29. Specifically, the table administration unit 122 deletes the whole lines in which the discrimination parameter of the accumulated communication packet transfer notification is stored, from the transfer table TF5 in FIG. 29. In the example of the transfer table TF5 in FIG. 29, the table administration unit 122 deletes the type "electric power", the user "A company", and "localhost".

According to the present embodiments, even in the aforementioned time lag from the first time to the second time, the transfer apparatus that directly connects to the server prior to the movement of the application accumulates the communication packet in its own apparatus. Then, after the transfer path is changed in cooperation with other transfer apparatuses, the aforementioned transfer apparatus transmits the communication packet stored in its own apparatus to the transfer apparatus that directly connects to the server after the movement of the application. Accordingly, in the aforementioned time lag from the first time to the second time, the communication packet transmitted by the sensors is not discarded. Then, the application can execute the information processing with respect to the measurement data included in the payload of the communication packet. As a result, the reduction of the quality of the data processing with regards to the application can be prevented.

Fourth Embodiment

In the third embodiment, the control apparatus GWC of the transfer apparatuses instructs (controls) that the fifth transfer apparatus GW5, which accumulates the communication packet, transmits the accumulated communication packet to the sixth transfer apparatus GW6 on the lowermost stream, which connects to the second server SVR2 after the movement of the application (see FIG. 31). In this case, the control apparatus GWC of the transfer apparatuses carries out the aforementioned instruction, so that the processing load of the control apparatus GWC of the transfer apparatuses is increased. Accordingly, in the fourth embodiment, the transfer apparatus will be described that transfers the accumulated communication packet to the server after the movement of the application, without the instruction of the control apparatus GWC of the transfer apparatuses.

In the fourth embodiment, the fifth transfer apparatus GW5 that accumulates the communication packet P transfers the communication packet P to the third transfer apparatus GW3 on the upper stream side. Then, the third transfer apparatus GW3 receives the communication packet P transferred by the fifth transfer apparatus GW5 and transfers the communication packet P to the first transfer apparatus GW1. The first transfer apparatus GW1 receives the communication packet P transferred by the third transfer apparatus GW3 and transfers the communication packet P to the fourth transfer apparatus GW4. The fourth transfer apparatus GW4 receives the communication packet P transferred by the first transfer apparatus GW1 and transfers the communication packet P to the sixth transfer apparatus GW6.

In order to realize a series of transfers described above, the IP address of the following transfer destination corresponding to the discrimination parameter of the communication packet P is changed to the IP address of the first transfer apparatus GW1, in the transfer table of the third transfer apparatus GW3. Hereinafter, the flow of the processing of realizing a series of transfers described above will be described referring to FIGS. 33 to 35.

In the description below, it is assumed that first to third processing has been executed. The first processing is the processing of accumulating the communication packet P (see FIG. 28) executed by the fifth transfer apparatus GW5 described in the third embodiment. The second processing is the processing of changing the transfer table (see FIGS. 16 and 17) executed by the sixth transfer apparatus GW6 described in the first embodiment. The third processing is the processing of changing the transfer table (see FIGS. 18 and 20) executed by the fourth transfer apparatus GW4 described in the first embodiment.

Figure 33:
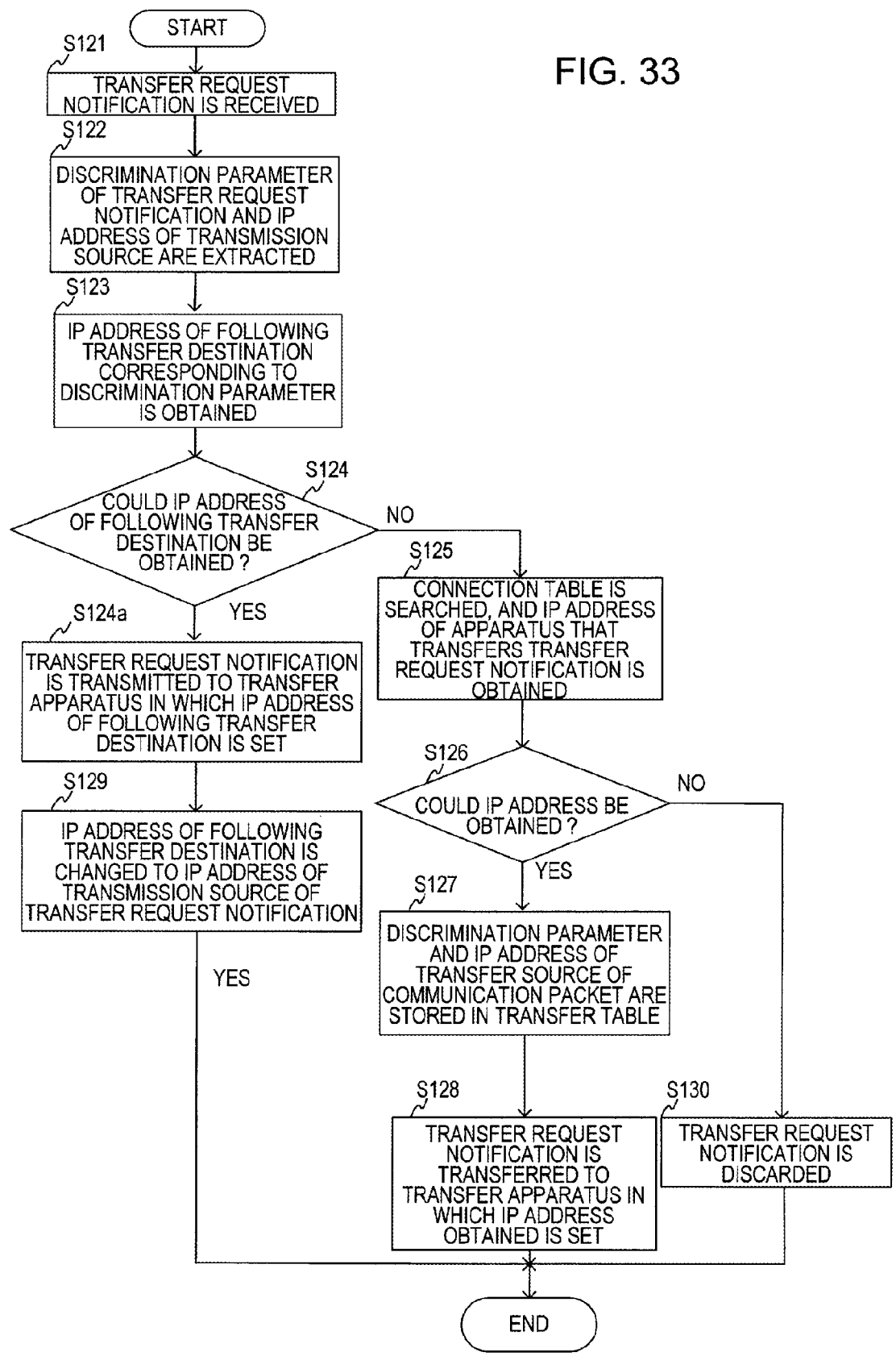
FIG. 33 is a flowchart illustrating another example to describe the flow of the processing executed by the first transfer apparatus GW1 and the third transfer apparatus GW3.

When the third processing is completed, the first transfer apparatus GW1, which is the transfer apparatus on the uppermost stream, executes the processing in FIG. 33.

(First Transfer Apparatus GW1)

FIG. 33 is a flowchart illustrating another example to describe the flow of the processing executed by the first transfer apparatus GW1 and the third transfer apparatus GW3. The flowchart in FIG. 33 includes Step S124a between the Step S124 (YES branch) and the Step S129 in FIG. 33.

As is described in the first embodiment, the reception unit 125 of the first transfer apparatus GW1 receives the transfer request notification M transferred from the fourth transfer apparatus GW4 and outputs the transfer request notification M to the table administration unit 122 and the transfer destination determination unit 124 (Step S121). Furthermore, the table administration unit 122 of the first transfer apparatus GW1 extracts the discrimination parameter and the IP address of the transmission source from the transfer request notification M (Step S122). Then, the transfer destination determination unit 124 of the first transfer apparatus GW1 searches the transfer table stored in the storage device 16 of its own apparatus based on the discrimination parameter extracted at the Step S122 as a key and obtains the IP address of the following transfer destination corresponding to the discrimination parameter (Step S123).

In the example of FIG. 3, the table administration unit 122 of the first transfer apparatus GW1 searches the transfer table TF1 in FIG. 3 and obtains the IP address "10. 10. 10. 3" of the following transfer destination corresponding to the type "electric power" and the user "A company", as the discrimination parameter (Step S123). Accordingly, YES is determined at the Step S124, and the processing proceeds to the Step S124a.

Step S124a: The transmission unit 126 of the first transfer apparatus GW1 transfers the transfer request notification M to the transfer apparatus in which the IP address of the following transfer destination, which is obtained at the Step S123, is set. In the aforementioned example, the transmission unit 126 of the first transfer apparatus GW1 transfers the transfer request notification M to the third transfer apparatus GW3 in which the IP address "10. 10. 10. 3" is set. Prior to this transfer, the transmission unit 126 of the first transfer apparatus GW1 provides the IP address H22 of the transmission source of the transfer request notification M with the IP address "10. 10. 10. 1" of its own apparatus and further provides the IP address H21 of the transmission destination with the IP address "10. 10. 10. 3" of the aforementioned apparatus of the transfer destination. Then, the transmission unit 126 transfers the transfer request notification M after the change to the third transfer apparatus GW3.

The table administration unit 122 of the first transfer apparatus GW1 changes the IP address of the following transfer destination, which is obtained by the transfer destination determination unit 124 at the Step S123, to the IP address H22 of the transmission source of the transfer request notification M received, in the transfer table TF1 (Step S129).

In the example of FIGS. 3 and 21, the table administration unit 122 of the first transfer apparatus GW1 changes the IP address "10. 10. 10. 3" (see FIG. 3) of the following transfer destination corresponding to the type "electric power" and the user "A company", as the discrimination parameter, to the IP address "10. 10. 10. 4" (see a dotted circle in FIG. 21) of the transmission source of the transfer request notification M in the transfer table TF1.

(Third Transfer Apparatus GW3)

Next, the processing executed by the third transfer apparatus GW3 that has received the transfer request notification M from the first transfer apparatus GW1 will be described referring to FIGS. 33 and 34.

Figure 34:
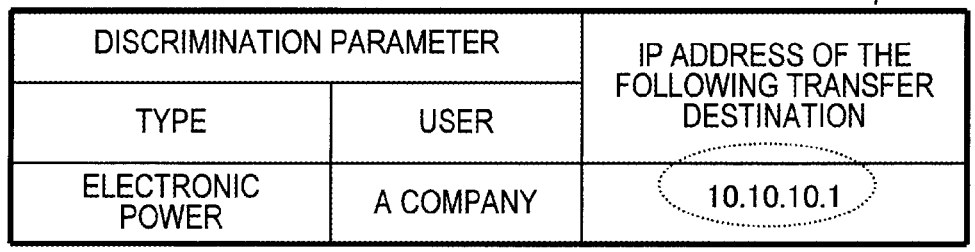
FIG. 34 is a diagram illustrating one example of a state where the transfer table TF3 in FIG. 4 is changed.

FIG. 34 is a diagram illustrating one example of a state where the transfer table TF3 in FIG. 4 is changed.

The reception unit 125 of the third transfer apparatus GW3 receives the transfer request notification M transferred from the first transfer apparatus GW1 and outputs the transfer request notification M to the table administration unit 122 and the transfer destination determination unit 124 (Step S121). Further, after the execution of the processing at the Step S122, the table administration unit 122 of the third transfer apparatus GW3 searches the transfer table TF3 in FIG. 4 based on the discrimination parameter of the transfer request notification M as a key and obtains the IP address of the following transfer destination corresponding to the discrimination parameter (Step S123).

In the example of FIG. 4, the table administration unit 122 of the first transfer apparatus GW1 obtains the IP address "10. 10. 10. 5" of the following transfer destination corresponding to the type "electric power" and the user "A company", as the discrimination parameter (Step S123). Accordingly, YES is determined at the Step S124, and the processing proceeds to the Step S124a.

The transmission unit 126 of the third transfer apparatus GW3 transfers the transfer request notification M to the transfer apparatus in which the IP address obtained by the transfer destination determination unit 124 at the Step S123 is set (Step S124a). In the aforementioned example, the transmission unit 126 of the third transfer apparatus GW3 transfers the transfer request notification M to the fifth transfer apparatus GW5 in which the IP address "10. 10. 10. 5" is set. Prior to this transfer, the transmission unit 126 of the third transfer apparatus GW3 provides the IP address H22 of the transmission source of the transfer request notification M with the IP address "10. 10. 10. 3" of its own apparatus and further provides the IP address H21 of the transmission destination with the IP address "10. 10. 10. 5" of the aforementioned apparatus of the transfer destination. Then, the transmission unit 126 transfers the transfer request notification M after the change to the fifth transfer apparatus GW5.

The table administration unit 122 of the third transfer apparatus GW3 changes the IP address of the following transfer destination, which is obtained by the transfer destination determination unit 124 at the Step S123, to the IP address H22 of the transmission source of the transfer request notification M, in the transfer table TF3 (Step S129). Specifically, the table administration unit 122 of the third transfer apparatus GW3 changes the IP address "10. 10. 10. 5" (see FIG. 4) of the following transfer destination, which is obtained by the transfer destination determination unit 124 at the Step S123, to the IP address "10. 10. 10. 1" of the transmission source of the transfer request notification M in the transfer table TF3 in FIG. 4. This change is represented in a dotted circle in FIG. 34.

(Summary of First Transfer Apparatus GW1 and Third Transfer Apparatus GW3)

As is described above, when the second attribute included in the transfer request notification M corresponds to the first attribute stored in the storage device 16 of its own apparatus, the transmission unit 126 of the first transfer apparatus GW1 executes the following processing. Herein, the correspondence described above is exemplified by a case where the discrimination parameter included in the transfer request notification M corresponds to the discrimination parameter stored in the transfer table TF1 of the first transfer apparatus GW1.

Then, in this case, the transmission unit 126 of the first transfer apparatus GW1 transfers the transfer request notification M to other transfer apparatus of the transfer destination corresponding to the first attribute in the storage device 16 (see the Step S124a in FIG. 33). For example, the transmission unit 126 of the first transfer apparatus GW1 transfers the transfer request notification M to other transfer apparatus in which the IP address corresponding to the discrimination parameter included in the transfer request notification M, that is, the discrimination parameter stored in the transfer table TF1, is set.

Then, the table administration unit 122 changes the transfer destination corresponding to the first attribute in the storage device 16 to the transfer destination included in the transfer request notification M (see the Step S129 in FIG. 33). That is, the table administration unit 122 changes the IP address of the following transfer destination corresponding to the discrimination parameter stored in the transfer table TF1 to the IP address H22 of the transmission source of the transfer request notification M. The third transfer apparatus GW3 also executes the same processing as that of the first transfer apparatus GW1 as described above.

(Fifth Transfer Apparatus GW5)

Next, the processing executed by the fifth transfer apparatus GW5 that has received the transfer request notification M from the third transfer apparatus GW3 will be described referring to FIGS. 29 and 35.

Figure 35:
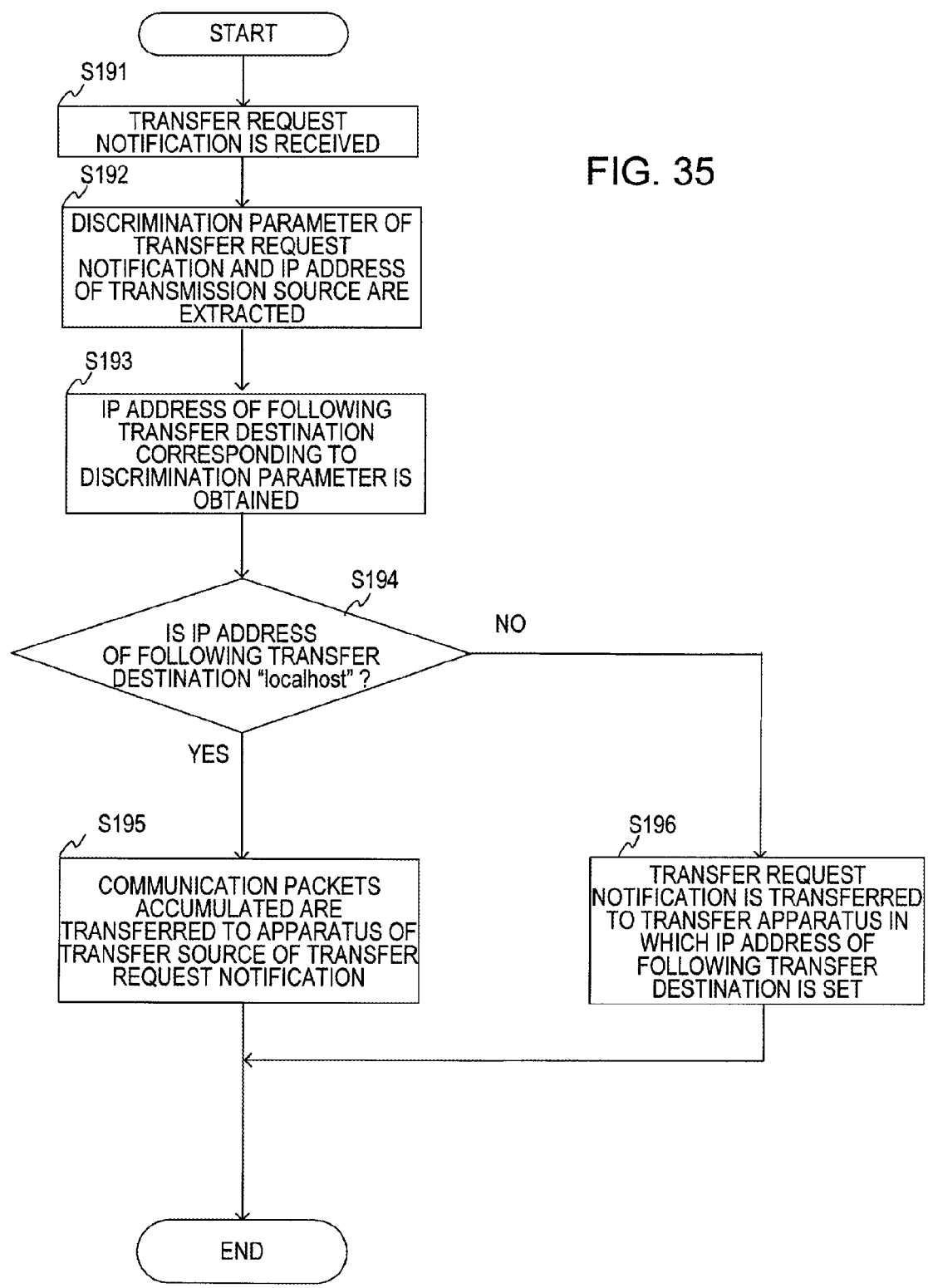
FIG. 35 is a flowchart illustrating another example to describe the flow of the processing executed by the fifth transfer apparatus GW5.

FIG. 35 is a flowchart illustrating another example to describe the flow of the processing executed by the fifth transfer apparatus GW5.

Step S191: The reception unit 125 of the fifth transfer apparatus GW5 receives the transfer request notification M transferred from the third transfer apparatus GW3, which is other transfer apparatus, and outputs the transfer request notification M to the table administration unit 122 and the transfer destination determination unit 124.

Step S192: The table administration unit 122 of the fifth transfer apparatus GW5 extracts the discrimination parameter and the IP address of the transmission source from the transfer request notification M. In the example of FIG. 14, the table administration unit 122 of the fifth transfer apparatus GW5 extracts the type "electric power" and the user "A company", as the discrimination parameter, from the payload PY2 of the transfer request notification M. Furthermore, the table administration unit 122 of the fifth transfer apparatus GW5 extracts the IP address "10. 10. 10. 3" as the IP address H22 of the transmission source of the transfer request notification M.

Step S193: The transfer destination determination unit 124 of the fifth transfer apparatus GW5 searches the transfer table stored in the storage device 16 of its own apparatus based on the discrimination parameter extracted at the Step S192 as a key and obtains the IP address of the following transfer destination corresponding to the discrimination parameter. The transfer table to be searched is the transfer table TF5a in FIG. 29.

Step S194: The transfer destination determination unit 124 of the fifth transfer apparatus GW5 determines whether the IP address of the following transfer destination is "localhost". When the IP address of the following transfer destination is "localhost" (Step S194, YES), the processing proceeds to the Step S195.

In the example of FIGS. 14 and 29, the transfer table TF5a stores the type "electric power" and the user "A company", as the discrimination parameter and stores the IP address "localhost" of the following transfer destination corresponding to the discrimination parameter. Accordingly, the IP address of the following transfer destination corresponding to the discrimination parameter (the type "electric power" and the user "A company") extracted at the Step S192 is "localhost", so that the processing proceeds to the Step S195.

Step S195: The transmission unit 126 of the fifth transfer apparatus GW5 transfers the accumulated communication packet to the transfer apparatus of the transmission source of the transfer request notification M. The transfer apparatus of the transmission source of the transfer request notification M is the transfer apparatus in which the IP address H22 of the transmission source of the transfer request notification M is set. In the aforementioned example, the transmission unit 126 of the fifth transfer apparatus GW5 transfers the communication packet P accumulated in the storage device 16 of its own apparatus, to the third transfer apparatus GW3. In this time, the transmission unit 126 of the fifth transfer apparatus GW5 obtains all the communication packets inclusive of the discrimination parameter that corresponds to the discrimination parameter extracted at the Step S192, from the storage device 16 of its own apparatus and transfers the communication packets to the third transfer apparatus GW3.

When the IP address of the following transfer destination is not "localhost" (Step S194, NO), the processing proceeds to the Step S196.

Step S196: The transmission unit 126 of the fifth transfer apparatus GW5 transfers the transfer request notification M to the transfer apparatus in which the IP address of the following transfer destination, which is obtained at the Step S193, is set.

As is described in FIG. 35, the transmission unit 126 of the fifth transfer apparatus GW5 transfers the communication packet that includes the second attribute included in the transfer request notification M received by the reception unit 125, from among the communication packets accumulated in the storage device 16 of its own apparatus, to the transfer apparatus of the transfer source of the transfer request notification M (Step S195). The second attribute included in the transfer request notification M, for example, is the discrimination parameter, which is represented by the type "electric power" and the user "A company" in the aforementioned example.

(Third Transfer Apparatus GW3)

In the example of FIGS. 14 and 35, the transmission unit 126 of the fifth transfer apparatus GW5 transfers the communication packet P accumulated in the storage device 16 of its own apparatus to the third transfer apparatus GW3 (see the Step S195 in FIG. 35).

The reception unit 125 of the third transfer apparatus GW3 receives the communication packet P. The transfer destination determination unit 124 of the third transfer apparatus GW3 extracts the type and the user as the discrimination parameter from the payload PY1 of the communication packet P. The transfer destination determination unit 124 of the third transfer apparatus GW3 searches a transfer table TF3a in FIG. 34 based on the type ("electric power" in the example of FIG. 2) and the user ("A company" in the example of FIG. 2) extracted as a search key and obtains "10. 10. 10. 1" as the IP address of the following transfer destination corresponding to the type and the user extracted. The IP address of the following transfer destination is the IP address set in the first transfer apparatus GW1.

The transmission unit 126 of the third transfer apparatus GW3 provides the IP address H12 of the transmission source of the communication packet P received with the IP address "10. 10. 10. 3" of its own apparatus and further provides the IP address H11 of the transmission destination of the communication packet P received with the IP address "10. 10. 10. 1" obtained. Then, the transmission unit 126 of the third transfer apparatus GW3 transfers the communication packet P, in which the IP addresses are replaced, to the first transfer apparatus GW1.

The first transfer apparatus GW1 receives the communication packet P and transfers the communication packet P to the fourth transfer apparatus GW4. However, this transfer has been described in the first embodiment, and its description is omitted.

As is described above, the transmission units 126 of the first transfer apparatus GW1 and the third transfer apparatus GW3 transfer the communication packet inclusive of the second attribute to the third apparatus of the transfer destination of the communication packet, which is correlated with the second attribute and stored in the storage device 16.

According to the embodiments of the present invention, the transfer path of the accumulated communication packets is changed based on the cooperation between the transfer apparatuses, and the accumulated communication packets are transmitted to the server, which executes the application, through the transfer path after the change. The application is moved from another server. As a result, this eliminates the instruction of the control apparatus GWC of the transfer apparatuses, whereby preventing the increase in the processing load of the control apparatus GWC of the transfer apparatuses.

Other Embodiment

The processing content of the transfer apparatus described in the first to fourth embodiments may appropriately be combined. For example, the processing of the sixth transfer apparatus GW6 described in the second embodiment may be added to the processing of the sixth transfer apparatus GW6 described in the third and fourth embodiments.

Furthermore, in the first to fourth embodiments, the content of the processing has separately been described with respect to the transfer apparatus on the uppermost stream, the transfer apparatus on the lowermost stream, and the transfer apparatus on the midstream. However, it may be such that the function of executing the content of each processing described in the first to fourth embodiments is mounted on one set of transfer apparatus, and the content of each processing is executed in accordance with the installation place of the transfer apparatus. For example, the fifth transfer apparatus described in the fourth embodiment executes the processing described in FIGS. 36 and 37. The fifth transfer apparatus that executes the processing described in FIGS. 36 and 37 also functions as the transfer apparatus on the lowermost apparatus and the transfer apparatus on the midstream (for example, the third transfer apparatus GW3), which are described in the fourth embodiment.

Figure 36:
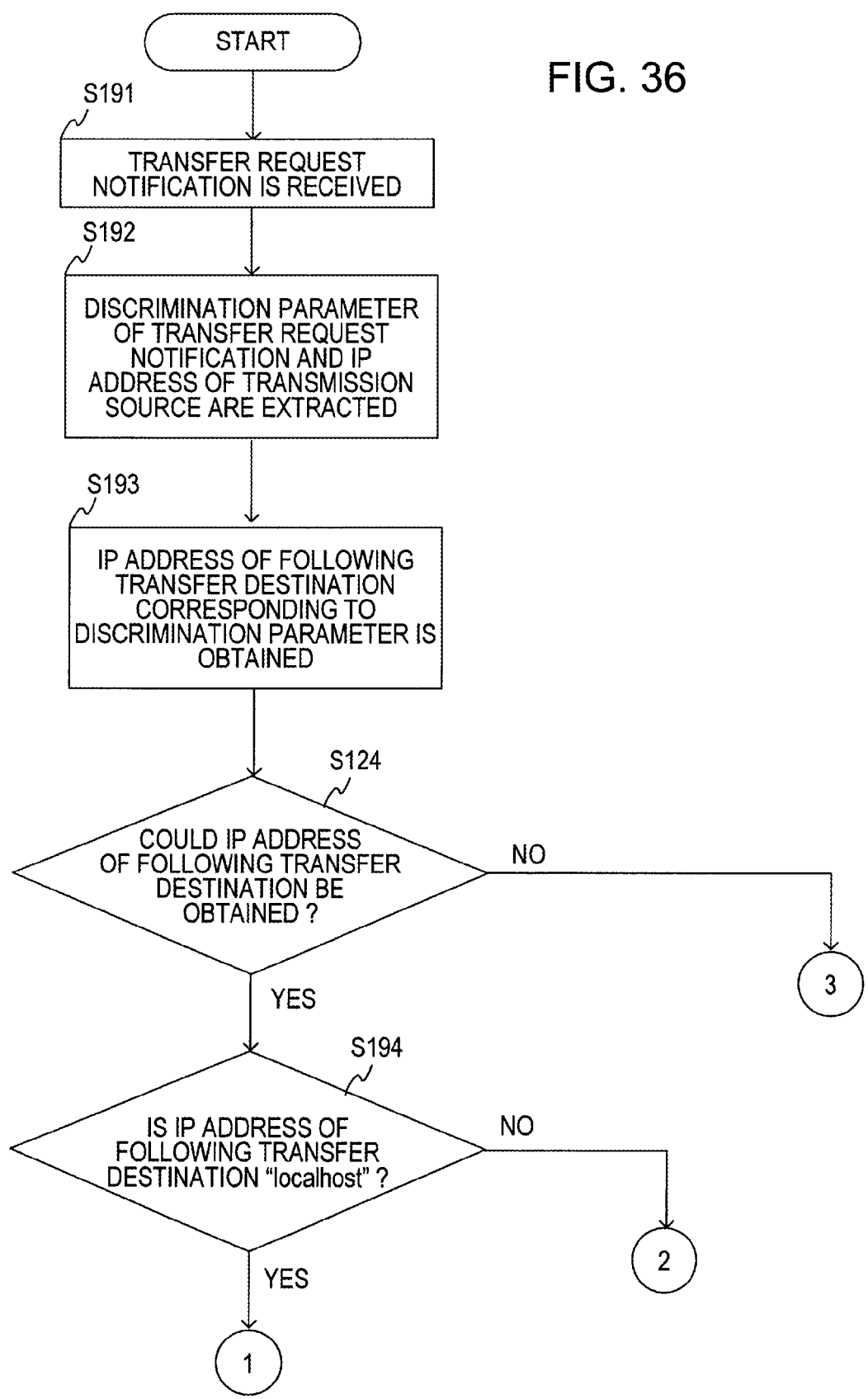
FIG. 36 is a first flowchart illustrating one example to describe the flow of the processing executed by the fifth transfer apparatus GW5.
Figure 37:
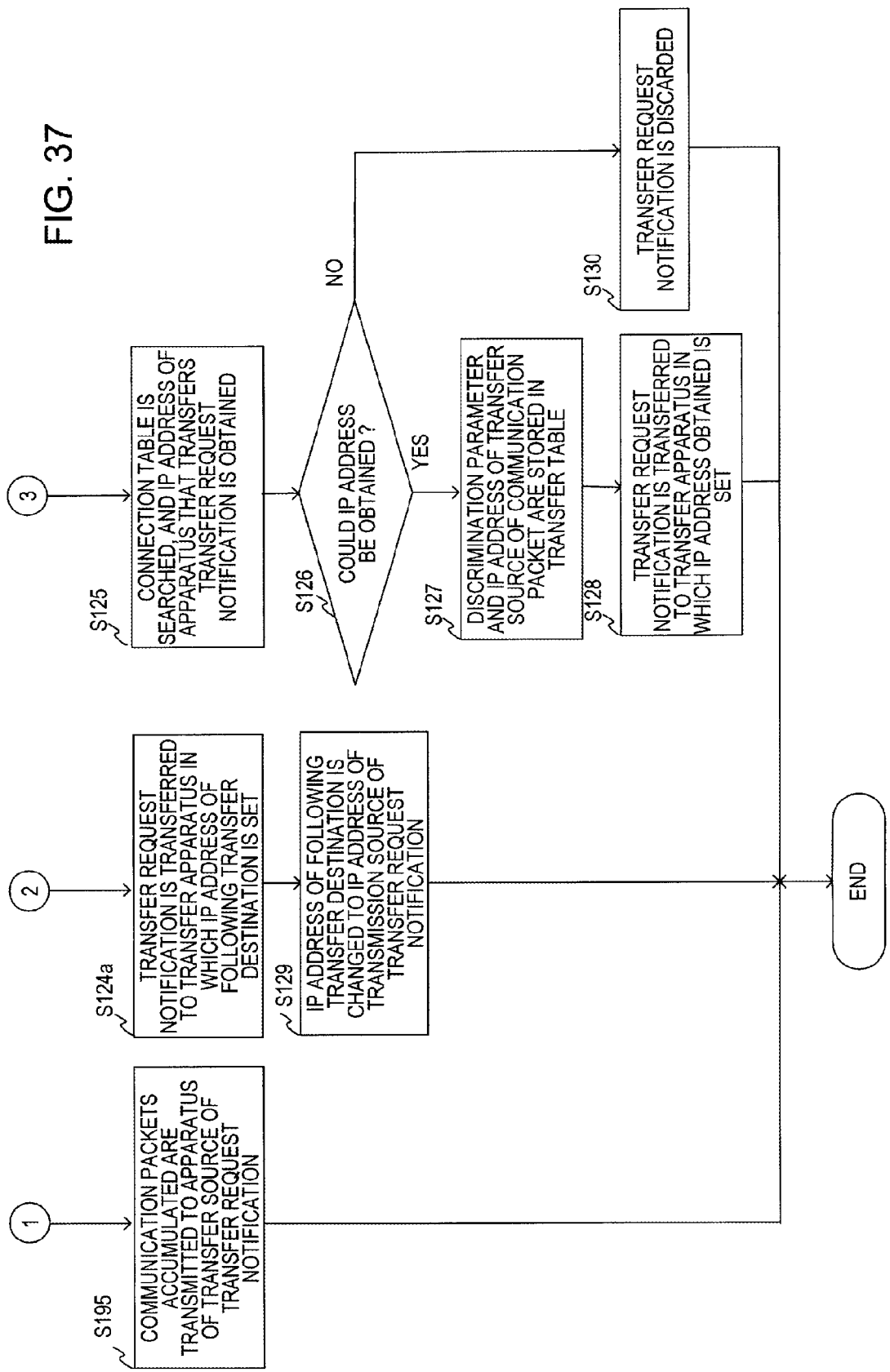
FIG. 37 is a second flowchart illustrated as one example, which is subsequent to the first flowchart in FIG. 36 to describe the flow of the processing executed by the fifth transfer apparatus GW5.

FIG. 36 is a first flowchart illustrating one example to describe the flow of the processing executed by the fifth transfer apparatus GW5. FIG. 37 is a second flowchart illustrated as one example, which is subsequent to the first flowchart in FIG. 36 to describe the flow of the processing executed by the fifth transfer apparatus GW5.

The flowchart in FIG. 36 includes Step S194 after the Step S124 (YES branch) in FIG. 36. The flowchart in FIG. 36 includes Step S195 in FIG. 37 after the Step S194 (YES branch) in FIG. 36. The flowchart in FIG. 36 includes the Step S124a and the Step S129 in FIG. 37 after the Step S194 (NO branch) in FIG. 36. The flowchart in FIG. 37 includes the Steps S125 to S128, and S130 after the Step S124 (NO branch) in FIG. 36.

The Steps S191 to S194 in FIG. 36 and the Step S195 in FIG. 37 are respectively similar to the Steps S191 to S195 in FIG. 35. Accordingly, their descriptions are omitted. Also, the Steps S124a to S130 in FIG. 37 are respectively similar to the Steps S124a to S130 in FIG. 33. Accordingly, their descriptions are omitted.

As is described above, the function of executing the content of each processing described in the first to fourth embodiments is mounted on one set of transfer apparatus, so that the content of each processing can be executed in accordance with the installation place of the transfer apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer of a transmission apparatus transferring to a second apparatus communication data transmitted from a first apparatus, to execute a process, the medium comprising:
    receiving a notification including an attribute to the communication data, transmitted from a third apparatus, when the third apparatus performs a process performed by the second apparatus;
    changing a transmission destination of the communication data corresponding to the attribute in a transmission table stored in a memory to transmission source of the notification;
    transferring the received notification to another transmission apparatus; and
    transferring the communication data corresponding to the attribute, to the changed transmission destination of the transmission table.

2. The non-transitory computer-readable recording medium according to the claim 1,
    wherein the communication data includes a first data and a first attribute data according to the first data, and the notification includes a second data and a second attribute data according to the second data.

3. The non-transitory computer-readable recording medium according to the claim 2,
    the process further comprising:
    correlating the first attribute with the transfer destination of the communication data inclusive of the first attribute and storing the first attribute and the transfer destination in a storage device;
    changing the transfer destination corresponding to the first attribute in the storage device to the transfer destination included in the notification, when the second attribute corresponds to the first attribute; and
    correlating the second attribute with the transfer destination of the communication data inclusive of the second attribute and storing the second attribute and the transfer destination in the storage device, when the second attribute does not correspond to the first attribute;
    wherein the transferring the communication data comprises transferring the communication data inclusive of the second attribute to the third apparatus of the transfer destination, which is correlated with the second attribute and stored in the storage device.

4. The non-transitory computer-readable recording medium according to the claim 3,
    wherein the transfer destination included in the notification is an identifier that identifies the third apparatus of the transfer destination, and
    wherein the communication data inclusive of the second attribute is transferred to the third apparatus based on the identifier.

5. The non-transitory computer-readable recording medium according to the claim 1, the process further comprising:
    changing the transfer destination of the communication data included in the notification to one's own apparatus;
    wherein the transferring the notification comprises transferring the notification, which is changed, to the other transfer apparatus.

6. The non-transitory computer-readable recording medium according to the claim 1, the process further comprising:
    storing an identifier that identifies the another transfer apparatus in the storage device;
    wherein the transferring the notification comprises transferring the notification to the another transfer apparatus based on the identifier.

7. The non-transitory computer-readable recording medium according to the claim 1,
    wherein the notification is transferred from the another transfer apparatus based on an opportunity for which a processing apparatus of a final transfer destination, at which the communication data is finally transferred, is changed to the another processing apparatus.

8. The non-transitory computer-readable recording medium according to claim 1,
    wherein the first apparatus is a generation apparatus which is configured to generate the communication data including a first data and a first attribute data according to the first data,
    wherein the second apparatus is a processing apparatus which is configured to process the data included the communication data, and
    wherein the notification includes a second data and a second attribute data according to the second data, and the notification data is a first notification data.

9. The non-transitory computer-readable recording medium according to the claim 8,
    the program further comprising:
    when the communication data that is inclusive of the second attribute included in the first notification is not received within a predetermined period of time which is provided based on a reception time of the first notification as a reference, transferring a request that a control apparatus that controls the plurality of transfer apparatuses transmits corresponding information, in which the second attribute and the transfer destination of the communication data are correlated with each other, to the transfer apparatus disposed on the transfer path of the communication data inclusive of the second attribute, to the control apparatus;
    receiving the corresponding information, and;
    transferring the communication data inclusive of the second attribute included in the corresponding information to a third apparatus of the transfer destination that is correlated with the second attribute.

10. The non-transitory computer-readable recording medium according to the claim 8, the program further comprising:
    receiving a second notification inclusive of the second attribute, the second notification transmitted from the first processing apparatus based on an opportunity for which a final transfer destination of the communication data is changed from the first processing apparatus to the second processing apparatus;
    receiving the communication data inclusive of the second attribute included in the second notification;
    accumulating the communication data received, in a storage device;
    receiving a third notification that includes a transfer destination of the communication data accumulated and that is transmitted from a control apparatus that controls the plurality of transfer apparatuses; and
    transferring the communication data stored in the storage device to an apparatus of the transfer destination included in the third notification.

11. The non-transitory computer-readable recording medium according to the claim 8, the program further comprising:
- correlating the first attribute with the transfer destination of the communication data inclusive of the first attribute and storing the first attribute and the transfer destination in the storage device;
- transferring the first notification to the other apparatus of the transfer destination corresponding to the first attribute in the storage device when the second attribute corresponds to the first attribute; and
- changing the transfer destination corresponding to the first attribute in the storage device to the transfer destination included in the first notification;
- wherein the transferring the communication data comprises transferring the communication data inclusive of the second attribute to the third apparatus of the transfer destination that is correlated with the second attribute and stored in the storage device.

12. The non-transitory computer-readable recording medium according to the claim 8, the program further comprising:
- receiving a second notification inclusive of the second attribute and a transfer destination of the communication data, the second notification transmitted from the first processing apparatus based on an opportunity for which a final transfer destination of the communication data is changed from the first processing apparatus to the second processing apparatus;
- receiving the communication data inclusive of the second attribute included in the second notification;
- accumulating the communication data received, in a storage device; and
- receiving the first notification and transferring the communication data inclusive of the second attribute included in the first notification, from among the communication data accumulated in the storage device, to the transfer apparatus of the transfer source of the first notification.

13. A transfer apparatus configured to transfer communication data transmitted from a first apparatus, to a second apparatus, the transfer apparatus comprising:
- a storage device configured to store a transfer destination of the communication data; and
- a controller configured to receive a notification including an attribute to the communication data, transmitted from a third apparatus, when the third apparatus performs a process performed by the second apparatus, change a transmission destination of the communication data corresponding to the attribute, stored in the storage device to transmission source of the notification, transfer the received notification to another transmission apparatus, and transfer the communication data corresponding to the attribute, to the changed transmission destination.

14. A transfer method executed in a transfer apparatus configured to transfer communication data transmitted from a first apparatus, to a second apparatus, the method comprising:
- receiving a notification including an attribute to the communication data, transmitted from a third apparatus, when the third apparatus performs a process performed by the second apparatus, by a processor;
- changing a transmission destination of the communication data corresponding to the attribute in a transmission table stored in a memory to transmission source of the notification, by the processor;
- transferring the received notification to another transmission apparatus, by the processor; and
- transferring the communication data corresponding to the attribute, to the changed transmission destination of the transmission table, by the processor.

* * * * *